(12) United States Patent
Carroll et al.

(10) Patent No.: US 12,412,144 B2
(45) Date of Patent: *Sep. 9, 2025

(54) SYSTEMS AND METHODS FOR AUTOMATED FEATURE-BASED RISK ANALYSIS

(71) Applicant: Pearson Education, Inc., Bloomington, MN (US)

(72) Inventors: Stephen Carroll, San Anselmo, CA (US); David Lovejoy, Parker, CO (US); Simcha Knif, Montara, CA (US); Gennadiy Kukartsev, Highland Ranch, CO (US)

(73) Assignee: PEARSON EDUCATION, INC., Bloomington, MN (US)

( * ) Notice: Subject to any disclaimer, the term of this patent is extended or adjusted under 35 U.S.C. 154(b) by 251 days.

This patent is subject to a terminal disclaimer.

(21) Appl. No.: 18/109,999

(22) Filed: Feb. 15, 2023

(65) Prior Publication Data

US 2023/0196255 A1  Jun. 22, 2023

Related U.S. Application Data

(63) Continuation of application No. 17/162,115, filed on Jan. 29, 2021, now Pat. No. 11,621,865, which is a
(Continued)

(51) Int. Cl.
*G06F 3/048* (2013.01)
*G06F 3/0481* (2022.01)
(Continued)

(52) U.S. Cl.
CPC ....... *G06Q 10/06398* (2013.01); *G06F 3/048* (2013.01); *G06F 3/0481* (2013.01); *G06F 3/0482* (2013.01); *G06F 18/211* (2023.01); *G06F 18/2431* (2023.01); *G06F 18/285* (2023.01); *G06F 21/552* (2013.01);
(Continued)

(58) Field of Classification Search
CPC ................ G06N 20/00–20; G06F 3/048–05
See application file for complete search history.

(56) References Cited

U.S. PATENT DOCUMENTS 10,482,391 B1 * 11/2019 Lynch .................... G06Q 10/00
2003/0036046 A1 * 2/2003 Smolover ................ G09B 5/00
434/350
(Continued)

*Primary Examiner* — Daniel Rodriguez
(74) *Attorney, Agent, or Firm* — Quarles & Brady LLP

(57) ABSTRACT

Systems and methods for feature-based alert triggering are disclosed herein. The system can include memory including a model database containing a machine-learning algorithm. The system can include a user device that can receive inputs from a user; and at least one server. The at least one server can: receive electrical signals from the user device, the electrical signals corresponding to a plurality of user inputs provided to the user device; automatically generate input-based features from the received electrical signals; input the input-based features into the machine-learning algorithm; automatically and directly generate a risk prediction with the machine-learning algorithm from the input-based features; and generate and display an alert when the risk prediction exceeds a threshold value.

20 Claims, 34 Drawing Sheets

Related U.S. Application Data continuation of application No. 15/965,547, filed on Apr. 27, 2018, now Pat. No. 10,938,592, which is a continuation of application No. 15/698,304, filed on Sep. 7, 2017, now abandoned.

(60) Provisional application No. 62/535,732, filed on Jul. 21, 2017.

(51) Int. Cl.
| | |
|---|---|
| G06F 3/0482 | (2013.01) |
| G06F 18/20 | (2023.01) |
| G06F 18/211 | (2023.01) |
| G06F 18/2431 | (2023.01) |
| G06F 21/55 | (2013.01) |
| G06F 21/56 | (2013.01) |
| G06F 21/57 | (2013.01) |
| G06N 3/02 | (2006.01) |
| G06N 3/08 | (2023.01) |
| G06N 5/01 | (2023.01) |
| G06N 7/01 | (2023.01) |
| G06N 20/00 | (2019.01) |
| G06N 20/10 | (2019.01) |
| G06N 20/20 | (2019.01) |
| G06Q 10/0635 | (2023.01) |
| G06Q 10/0639 | (2023.01) |
| G06Q 50/20 | (2012.01) |
| G09B 7/02 | (2006.01) |
| H04L 9/40 | (2022.01) |
| H04L 12/18 | (2006.01) |
| H04L 51/18 | (2022.01) |
| H04L 67/306 | (2022.01) |
| H04L 67/50 | (2022.01) |
| G09B 5/06 | (2006.01) |
| H04L 41/0681 | (2022.01) |

(52) U.S. Cl.
CPC ............ *G06F 21/554* (2013.01); *G06F 21/56* (2013.01); *G06F 21/577* (2013.01); *G06N 3/02* (2013.01); *G06N 3/08* (2013.01); *G06N 5/01* (2023.01); *G06N 7/01* (2023.01); *G06N 20/00* (2019.01); *G06N 20/10* (2019.01); *G06N 20/20* (2019.01); *G06Q 10/0635* (2013.01); *G06Q 50/205* (2013.01); *G09B 7/02* (2013.01); *H04L 12/1895* (2013.01); *H04L 51/18* (2013.01); *H04L 63/0227* (2013.01); *H04L 63/0428* (2013.01); *H04L 63/10* (2013.01); *H04L 63/1416* (2013.01); *H04L 63/1433* (2013.01); *H04L 63/1441* (2013.01); *H04L 63/20* (2013.01); *H04L 67/306* (2013.01); *H04L 67/535* (2022.05); *G09B 5/065* (2013.01); *H04L 41/0681* (2013.01)

(56) References Cited

U.S. PATENT DOCUMENTS

| | | | | |
|---|---|---|---|---|
| 2003/0036683 | A1* | 2/2003 | Kehr | G16H 70/20 600/300 |
| 2004/0131999 | A1* | 7/2004 | Dresnick | G09B 7/00 434/350 |
| 2008/0168274 | A1* | 7/2008 | Natanzon | H04L 63/102 713/175 |
| 2008/0208777 | A1* | 8/2008 | Stephens | G06N 20/00 706/12 |
| 2010/0070443 | A1* | 3/2010 | Krebs | G09B 7/00 706/14 |
| 2013/0096892 | A1* | 4/2013 | Essa | G09B 7/00 703/2 |
| 2013/0246317 | A1* | 9/2013 | Martin | G06N 5/048 706/12 |
| 2014/0101068 | A1* | 4/2014 | Gidugu | G06Q 50/205 705/327 |
| 2014/0205990 | A1* | 7/2014 | Wellman | G09B 7/00 434/362 |
| 2015/0100512 | A1* | 4/2015 | Mishra | G06Q 50/205 705/326 |
| 2015/0193699 | A1* | 7/2015 | Kil | G06N 5/022 706/12 |
| 2015/0347937 | A1* | 12/2015 | Arlitt | G06N 5/046 705/7.28 |
| 2016/0127010 | A1* | 5/2016 | Rho | G06N 7/01 375/257 |
| 2017/0139762 | A1* | 5/2017 | Sherlock | G09B 7/00 |
| 2017/0154539 | A1* | 6/2017 | King | G09B 5/12 |

\* cited by examiner

1251

1280

Item Manager  Course Manager  User Manager  Help  Sign Out

My Courses ▾ | Course Settings

| Course Home | Assignments | Roster | Gradebook | Item Library | Instructor Resources | eText | Study Area |

Gradebook

Manage ▾ View Learning Outcomes Summary

Filter ▾

| Score | Time | Difficulty | Early Alerts |

Dynamic Study Modules

Course Summary  Student List            ⓘ  Search 🔍

< Back                                          ✉ Email Student

User's Current Risk: Sep 25 – Oct 9 ⓘ      ⟵ 1284        Feedback

| Homework | Test/Quiz | Correct First Try | Consistent | Avg Part Score | Avg # of Attempts | # Parts Attempted |
| 77% | 0% | 68% | Somewhat | .7 | 3 | 35 |

User's Risk History ⓘ                                Feedback

08/27 09/04 09/11 09/18 09/25 10/02 10/09 10/16 10/23 10/30 11/06 11/13 11/20 11/27 12/05 12/13

1282

FIG. 36

SYSTEMS AND METHODS FOR AUTOMATED FEATURE-BASED RISK ANALYSIS

CROSS-REFERENCES TO RELATED APPLICATIONS

This application is a continuation of U.S. patent application Ser. No. 17/162,115 filed on Jan. 29, 2021, entitled SYSTEMS AND METHODS FOR AUTOMATED PLATFORM-BASED ALGORITHM MONITORING, which is a continuation of U.S. patent application Ser. No. 15/965,547 filed on Apr. 27, 2018, entitled SYSTEMS AND METHODS FOR AUTOMATED PLATFORM-BASED ALGORITHM MONITORING, which is a continuation of U.S. patent application Ser. No. 15/698,304, filed on Sep. 7, 2017, and entitled "SYSTEM AND METHOD FOR AUTOMATED FEATURE-BASED ALERT TRIGGERING", which claims the benefit of U.S. Provisional Application No. 62/535,732, filed on Jul. 21, 2017, and entitled "SYSTEMS AND METHODS FOR AUTOMATED FEATURE-BASED ALERT TRIGGERING", the entirety of each of which is hereby incorporated by reference herein.

BACKGROUND

A computer network or data network is a telecommunications network which allows computers to exchange data. In computer networks, networked computing devices exchange data with each other along network links (data connections). The connections between nodes are established using either cable media or wireless media. The best-known computer network is the Internet.

Network computer devices that originate, route and terminate the data are called network nodes. Nodes can include hosts such as personal computers, phones, servers as well as networking hardware. Two such devices can be said to be networked together when one device is able to exchange information with the other device, whether or not they have a direct connection to each other.

Computer networks differ in the transmission media used to carry their signals, the communications protocols to organize network traffic, the network's size, topology and organizational intent. In most cases, communications protocols are layered on other more specific or more general communications protocols, except for the physical layer that directly deals with the transmission media.

BRIEF SUMMARY

One aspect of the present disclosure relates to a of triggering an alert with a computing system, the method including: receiving electrical signals corresponding to a plurality user inputs to a computing system; automatically generating input-based features from the received electrical signals; inputting the input-based features into a machine-learning algorithm; automatically and directly generating a risk prediction with the machine-learning algorithm from the input-based features; and generating and displaying an alert when the risk prediction exceeds a threshold value.

In some embodiments, at least some of the input-based features are meaningful features. In some embodiments, the meaningful features are generated from substance identified in the received electrical signals. In some embodiments, at least some of the input-based features are non-meaningful features. In some embodiments, the non-meaningful features are independent of the substance identified in the received electrical signals. In some embodiments, the features include at least two from: a Hurst coefficient; a percent correct on first try; an average score; an average part score; a number of attempted parts; an average number of attempted parts; and an aggregation parameter.

In some embodiments, the method includes: generating a response from the received electrical signals; and automatically evaluating the response according to stored evaluation data. In some embodiments, the meaningful features are generated based on the generated response. In some embodiments, at least some of the meaningful features are generated based on the generated response and the evaluation of the response. In some embodiments, the machine-learning algorithm includes at least one of: a Random Forrest algorithm; an AdaBoost algorithm; a Naïve Bayes algorithm; Boosting Tree, and a Support Vector Machine.

One aspect of the present disclosure relates to a system for triggering an alert. The system includes memory including a model database containing a machine-learning algorithm, which machine-learning algorithm can generate a risk prediction based on inputted features. The system includes a user device that can receive inputs from a user; and at least one server. In some embodiments, the server can: receive electrical signals from the user device, the electrical signals corresponding to a plurality user inputs provided to the user device; automatically generate input-based features from the received electrical signals; input the input-based features into the machine-learning algorithm; automatically and directly generate a risk prediction with the machine-learning algorithm from the input-based features; and generate and display an alert when the risk prediction exceeds a threshold value.

In some embodiments, at least some of the input-based features are meaningful features. In some embodiments, the meaningful features are generated from substance identified in the received electrical signals. In some embodiments, at least some of the input-based features are non-meaningful features. In some embodiments, the non-meaningful features are independent of the substance identified in the received electrical signals. In some embodiments, the features include at least two from: a Hurst coefficient; a percent correct on first try; an average score; an average part score; a number of attempted parts; an average number of attempted parts; and an aggregation parameter.

In some embodiments, the at least one server can: generate a response from the received electrical signals; and automatically evaluate the response according to stored evaluation data, which alert includes a graphical depiction of the risk prediction. In some embodiments, the meaningful features are generated based on the generated response. In some embodiments, at least some of the meaningful features are generated based on the generated response and the evaluation of the response. In some embodiments, the machine-learning algorithm includes at least one of: a Random Forrest algorithm; an AdaBoost algorithm; a Naïve Bayes algorithm; Boosting Tree, and a Support Vector Machine.

One aspect of the present disclosure relates to a system for triggering a pre-emptive alert. The system includes: memory including a machine-learning classifier that can generate a risk prediction based on inputted features; a first user device that can receive inputs from a user; a second user device that can display information to a user; and at least one server. The at least one server can: receive electrical signals corresponding to user inputs to the first user device; generate a set of input-based features from the received electrical signals; select a sub-set of the input-based features from the set of features; input the sub-set of the features into the machine-learning classifier; generate a risk prediction with the machine-learning classifier; and control the second user device to display an alert when the risk prediction exceeds a threshold value.

In some embodiments, the sub-set of features includes at least one meaningful feature. In some embodiments, the at least one meaningful feature is generated from substance identified in the received electrical signals. In some embodiments, the sub-set of features includes at least one non-meaningful features. In some embodiments, the at least one non-meaningful feature is independent of the substance identified in the received electrical signals.

In some embodiments, the classifier includes a linear classifier. In some embodiments, the classifier includes a probabilistic classifier. In some embodiments, the classifier includes a Random forest classifier.

In some embodiments, inputting the sub-set of the features into the machine learning classifier includes: generating a feature vector for each of the features in the sub-set of features; and inputting the feature vectors into the classifier. In some embodiments, the alert includes a graphical depiction of the risk prediction.

One aspect of the present disclosure relates to a method of triggering a pre-emptive alert with a computing system. The method includes: receiving electrical signals corresponding to a plurality user inputs to a computing system; automatically generating a set of input-based features from the received electrical signals; selecting a sub-set of the input-based features from the set of input-based features; inputting the sub-set of the input-based features into a machine-learning algorithm; generating a risk prediction with the machine-learning algorithm from the input-based features; and displaying an alert when the risk prediction exceeds a threshold value.

In some embodiments, the sub-set of features includes at least one meaningful feature. In some embodiments, the at least one meaningful feature is generated from substance identified in the received electrical signals. In some embodiments, the sub-set of features includes at least one non-meaningful features. In some embodiments, the at least one non-meaningful feature is independent of the substance identified in the received electrical signals.

In some embodiments, the machine-learning algorithm can be a classifier, which classifier can be a linear classifier. In some embodiments, the machine-learning algorithm can be a classifier, which classifier can be a probabilistic classifier. In some embodiments, the machine-learning algorithm can be a classifier, which classifier can be a Random forest classifier.

In some embodiments, inputting the sub-set of the features into the machine-learning algorithm includes: generating a feature vector for each of the features in the sub-set of features; and inputting the feature vectors into the machine-learning algorithm. In some embodiments, the alert includes a graphical depiction of the risk prediction.

One aspect of the present disclosure relates to a system for on-the-fly alert triggering customization. The system includes memory including: a machine-learning classifier that can generate a risk prediction based on inputted features; a user profile database identifying a user and containing metadata associated with the user; and a customization database identifying one or several user attributes and a customization associated with each of those one or several user attributes, which customization identifies a sub-set of potential features for use in generating a risk prediction. The system can include: a first user device that can receive inputs from a user; a second user device that can display information to a user; and at least one server. The at least one server can: receive electrical signals corresponding to user inputs to the first user device; retrieve metadata associated with the user of the first user device; identify a customization for the user of the first user device based on the retrieved metadata; select a sub-set of input-based features from the received electrical signals according to the identified customization; input the sub-set of the features into the machine-learning classifier; and generate a customized risk prediction with the machine-learning classifier.

In some embodiments, the at least one server can modify the machine-learning classifier according to the identified customization. In some embodiments, the machine-learning classifier includes a plurality of classifiers. In some embodiments, each of the plurality of classifiers is associated with a unique set of features. In some embodiments, modifying the machine-learning classifier includes selecting a one of the plurality of classifiers corresponding to the sub-set of features selected according to the customization.

In some embodiments, the at least one server can control the second user device to display an alert when the risk prediction exceeds a threshold value. In some embodiments, the alert includes a graphical depiction of the risk prediction. In some embodiments, the metadata are unique to the user. In some embodiments, the customization is determined according to a portion of the metadata that is non-unique to the user and is unique to a set of users sharing at least one common attribute. In some embodiments, inputting the sub-set of the features into the machine-learning classifier includes: generating a feature vector for each of the features in the sub-set of features; and inputting the feature vectors into the classifier. In some embodiments, the at least one server can generate a set of features, and the sub-set of features is selected from the generated set of features.

One aspect of the present disclosure relates to a method for on-the-fly alert triggering customization. The method includes: receiving electrical signals corresponding to user inputs to a first user device; retrieving metadata associated with a user of the first user device; identifying a customization for the user of the first user device based on the retrieved metadata; selecting a sub-set of input-based features from the received electrical signals according to the identified customization; inputting the sub-set of the features into a machine-learning classifier; and generating a customized risk prediction with the machine-learning classifier.

In some embodiments, the method includes modifying the machine-learning classifier according to the identified customization. In some embodiments, the machine-learning classifier includes a plurality of classifiers. In some embodiments, each of the plurality of classifiers is associated with a unique set of features. In some embodiments, modifying the machine-learning classifier includes selecting a one of the plurality of classifiers corresponding to the sub-set of features selected according to the customization.

In some embodiments, the method includes controlling a second user device to display an alert when the risk prediction exceeds a threshold value. In some embodiments, the alert includes a graphical depiction of the risk prediction. In some embodiments, the metadata are unique to the user. In some embodiments, the customization is determined according to a portion of the metadata that is non-unique to the user and that is unique to a set of users sharing at least one common attribute. In some embodiments, inputting the sub-set of the features into the machine-learning classifier includes: generating a feature vector for each of the features in the sub-set of features; and inputting the feature vectors into the classifier. In some embodiments, the method includes generating a set of features. In some embodiments, the sub-set of features is selected from the generated set of features.

One aspect of the present disclosure relates to a system for user-independent second-level machine-learning alert triggering. The system includes memory including: a machine-learning classifier that can generate a risk prediction based on inputted features; a first-level feature database including instructions for generating first-level features from received digital communications corresponding to user inputs to a first user device; and a second-level feature database including instructions for generating second-level features from the first-level features. The system can include: a first user device that can receive inputs from a user and transmit these inputs as one or more digital communications; and at least one server. The at least one server can: receive the one or more digital communications from the first user device; generate first-level features from the received one or more digital communications according to the instructions in the first-level feature database; generate second-level features from the generated first-level features; and generate and deliver a risk prediction according the generated second-level features via a machine-learning classifier.

In some embodiments, the at least one server can generate second-level features from first-level features generated from digital communications received from additional user devices. In some embodiments, the at least one server can aggregate the first-level features generated from digital communications received from the first user device and from the additional user devices.

In some embodiments, the first-level features are aggregated over sequential predetermined times. In some embodiments, the second-level features are generated at an end of each of the sequential predetermined times. In some embodiments, the first-level features are aggregated until a minimum number of aggregated first-level features is reached. In some embodiments, the second-level features are generated when the minimum number of aggregated first-level features is reached.

In some embodiments, generating and delivering the risk prediction includes: identifying a second-level feature set including second-level features generated from first level features generated from digital communications received from the first user device and some of the additional user devices, which second-level feature set is identified based on a shared attribute of the user of the first user device and users of the some of the additional user devices; identifying similar second-level features sets, which similar second-level feature sets are identified based on a shared attribute of the second-level feature set and the similar second-level feature sets; identifying an anomaly in the second-level feature set; and indicating risk based on the identified anomaly, which indicated risk is non-specific to the user of the first user device. In some embodiments, generating and delivering the risk prediction includes: identifying a second-level feature set including second-level features generated from first level features generated from digital communications received from the first user device and some of the additional user devices, which second-level feature set is identified based on a shared attribute of the user of the first user device and users of the some of the additional user devices; inputting the second-level feature set into a machine-learning classifier; and generating a risk prediction with the machine-learning classifier, which risk prediction is non-specific to the user of the first user device. In some embodiments, the at least one server can control a second user device to display an alert based on the risk prediction, which alert includes a graphical depiction of the risk prediction.

One aspect of the present disclosure relates to a method for user-independent second-level machine-learning alert triggering. The method includes: receiving one or more digital communications from a first user device; generating first-level features from the received one or more digital communications according to instructions in a first-level feature database; generating second-level features from the generated first-level features; and generating and delivering a risk prediction according the generated second-level features via a machine-learning classifier.

In some embodiments, the method includes generating second-level features from first-level features generated from digital communications received from additional user devices. In some embodiments, the method includes aggregating the first-level features generated from digital communications received from the first user device and from the additional user devices. In some embodiments, the first-level features are aggregated over sequential predetermined times. In some embodiments, the second-level features are generated at an end of each of the sequential predetermined times. In some embodiments, the first-level features are aggregated until a minimum number of aggregated first-level features is reached. In some embodiments, the second-level features are generated when the minimum number of aggregated first-level features is reached.

In some embodiments, generating and delivering the risk prediction includes: identifying a second-level feature set including second-level features generated from first level features generated from digital communications received from the first user device and some of the additional user devices, which second-level feature set is identified based on a shared attribute of the user of the first user device and users of the some of the additional user devices; identifying at least one similar second-level feature set, which at least one similar second-level feature set is identified based on a shared attribute of the second-level feature set and the at least one similar second-level feature set; comparing the second-level feature set and the at least one similar second-level feature set; identifying an anomaly in the second-level feature set based on the comparison of the second-level feature set and the at least one similar second-level feature set; and indicating risk based on the identified anomaly, which indicated risk is non-specific to the user of the first user device. In some embodiments, generating and delivering the risk prediction includes: identifying a second-level feature set including second-level features generated from first level features generated from digital communications received from the first user device and some of the additional user devices, which second-level feature set is identified based on a shared attribute of the user of the first user device and users of the some of the additional user devices; inputting the second-level feature set into a machine-learning classifier; and generating a risk prediction with the machine-learning classifier, which risk prediction is non-specific to the user of the first user device. In some embodiments, the method includes controlling a second user device to display an alert based on the risk prediction, wherein the alert includes a graphical depiction of the risk prediction.

One aspect of the present disclosure relates to a system for delivery of a triggered alert. The system includes memory including a model database containing a machine-learning algorithm, which machine-learning algorithm can generate a risk prediction based on inputted features. The system includes: a first user device that can receive inputs from a user; a second user device; and at least one server. The at least one server can: receive communications corresponding to a plurality user inputs provided to the user device; generate a risk prediction with the machine-learning algorithm based on features generated from the received communications; and direct generation of a user interface on the second user device, the user interface including: a cohort view including at least one graphical depiction of the risk prediction for a set of at least some of a plurality of users in a cohort; a sub-cohort view including at least one graphical depiction of the risk prediction for at least one of the users in the cohort; and an individual view including at least one graphical depiction of risk sources for one user.

In some embodiments, the at least one server can switch between the cohort view, the sub-cohort view, and the individual view based on user inputs received from the second user device. In some embodiments, switching between the cohort view and the sub-cohort view includes: receiving an input identifying a display sub-cohort from the second user device; generating the at least one graphical depiction of the risk prediction for the at least one of the users in the display sub-cohort; and directing the second user device to generate the sub-cohort view and display the generated at least one graphical depiction of the risk prediction for the at least one of the users in the display sub-cohort.

In some embodiments, the at least one graphical depiction of the risk prediction for the at least one of the users in the display sub-cohort includes: a graphical depiction of a risk category associated with identified display sub-cohort; an identification window including information identifying the at least one of the users in the sub-cohort; a time-dependent risk window displaying risk status over a period of time; and a risk bar identifying a current risk level. In some embodiments, switching to the individual view includes: receiving an input identifying the one user; generating the at least one graphical depiction of risk sources for the identified one user; and directing the second user device to generate the individual view and display the generated at least one graphical depiction of risk sources for the identified one user.

In some embodiments, the at least one graphical depiction of risk sources for the identified one user includes: a time-dependent risk window that can display risk status over a period of time; and a source window that can identify sources of risk and parameters characterizing those sources of risk. In some embodiments, the at least one graphical depiction of the risk prediction for the set of at least some of the plurality of users in the cohort includes: a cohort window that can identify a current breakdown of user in the cohort into a plurality of risk-based sub-cohorts; and a trend window that can display a depiction of time-dependent change to a size of the risk-based sub-cohorts. In some embodiments, the trend window can display the depiction of the time-dependent change to the size of the risk-based sub-cohorts over a sliding temporal window. In some embodiments, the trend window can automatically update as the size of the risk-based sub-cohorts changes and as the sliding temporal window shifts. In some embodiments, generating a risk prediction with the machine-learning algorithm based on features generated from the received communications includes: generating a feature vector for each of the features; and inputting the feature vectors into the machine-learning algorithm.

One aspect of the present disclosure relates to a method for delivery a triggered alert. The method includes: receiving communications corresponding to a plurality user inputs provided to a user device by a user; generating a risk prediction with a machine-learning algorithm based on features generated from the received communications; and directing generation of a user interface on a second user device, the user interface including: a cohort view including at least one graphical depiction of the risk prediction for a set of at least some of a plurality of users in a cohort; a sub-cohort view including at least one graphical depiction of the risk prediction for at least one of the users in the cohort; and an individual view including at least one graphical depiction of risk sources for one user.

In some embodiments, the method includes switching between the cohort view, the sub-cohort view, and the individual view based on user inputs received from the second user device. In some embodiments, switching between the cohort view and the sub-cohort view includes: receiving an input identifying a display sub-cohort from the second user device; generating the at least one graphical depiction of the risk prediction for the at least one of the users in the display sub-cohort; and directing the second user device to generate the sub-cohort view and display the generated at least one graphical depiction of the risk prediction for the at least one of the users in the display sub-cohort.

In some embodiments, the at least one graphical depiction of the risk prediction for the at least one of the users in the display cohort includes: a graphical depiction of a risk category associated with identified display sub-cohort; an identification window including information identifying the at least one of the users in the sub-cohort; a time-dependent risk window displaying risk status over a period of time; and a risk bar identifying a current risk level. In some embodiments, switching to the individual view includes: receiving an input identifying the one user; generating the at least one graphical depiction of risk sources for the identified one user; and directing the second user device to generate the individual view and display the generated at least one graphical depiction of risk sources for the identified one user.

In some embodiments, the at least one graphical depiction of risk sources for the identified one user includes: a time-dependent risk window that can display risk status over a period of time; and a source window that can identify sources of risk and parameters characterizing those sources of risk. In some embodiments, the at least one graphical depiction of the risk prediction for the set of at least some of the plurality of users in the cohort includes: a cohort window that can identify a current breakdown of user in the cohort into a plurality of risk-based sub-cohorts; and a trend window that can display a depiction of time-dependent change to a size of the risk-based sub-cohorts.

In some embodiments, the trend window can display the depiction of the time-dependent change to the size of the risk-based sub-cohorts over a sliding temporal window. In some embodiments, the trend window can automatically update as the size of the risk-based sub-cohorts changes and as the sliding temporal window shifts. In some embodiments, generating a risk prediction with the machine-learning algorithm based on features generated from the received communications includes: generating a feature vector for each of the features; and inputting the feature vectors into the machine-learning algorithm.

One aspect of the present disclosure relates to a system for automated customized cohort communication. The system includes memory including: a user database including information identifying a plurality of users and communication information associated with each of the plurality of users. In some embodiments, a risk status is associated with each of the plurality of users. The system can include: a first user device that can receive inputs from a first user; a second user device that can receive inputs from a second user; a third user device; and at least one server. The at least one server can: receive communications corresponding to a plurality user inputs provided to the first user device and the second user device; generate a first risk prediction for the first user with a machine-learning algorithm and a second risk prediction for the second user with the machine-learning algorithm, which first and second risk predictions are based on features generated from the received communications; determine inclusion of the first risk prediction in a first cohort associated with a first risk level and a second risk prediction in a second cohort associated with a second risk level; direct generation of a user interface on the third user device, the user interface including a graphical depiction of the first and second cohorts; receive a communication request from the third user device; identify a recipient cohort including at least one user associated with the communication request; automatically retrieve communication information for each of the at least one user of the recipient cohort; and send a communication to each of the at least one user of the recipient cohort according to the communication information.

In some embodiments, the recipient cohort includes the first cohort associated with the first risk level. In some embodiments, the recipient cohort includes the first cohort associated with the first risk level and the second cohort associated with the second risk level. In some embodiments, the communication is sent to at least the first user device and the second user device. In some embodiments, the system include a fourth user device, which fourth user device is linked to the second user in the user database. In some embodiments, the communication is sent to at least the first user device and the fourth user device.

In some embodiments, the at least one server can receive communication content and a recipient cohort modification. In some embodiments, the recipient cohort modification adds at least another user to recipient cohort for receipt of the communication. In some embodiments, the recipient cohort modification removes at least one user from the recipient cohort. In some embodiments, generating the first risk prediction based on features generated from the received communications includes: generating a feature vector for each of the features; and inputting the feature vectors into the machine-learning algorithm.

One aspect of the present disclosure relates to a method for automated customized cohort communication. The method includes: receiving communications corresponding to a plurality user inputs provided to a first user device by a first user and to a second user device by a second user; generating a first risk prediction for the first user with a machine-learning algorithm and a second risk prediction for the second user with the machine-learning algorithm, which first and second risk predictions are based on features generated from the received communications; determining inclusion of the first risk prediction in a first cohort associated with a first risk level and a second risk prediction in a second cohort associated with a second risk level; directing generation of a user interface on a third user device, the user interface including a graphical depiction of the first and second cohorts; receiving a communication request from the third user device; identifying a recipient cohort including at least one user associated with the communication request; automatically retrieving communication information for each of the at least one user of the recipient cohort; and sending a communication to each of the at least one user of the recipient cohort according to the communication information.

In some embodiments, the recipient cohort includes the first cohort associated with the first risk level. In some embodiments, the recipient cohort includes the first cohort associated with the first risk level and the second cohort associated with the second risk level. In some embodiments, the communication is sent to at least the first user device and the second user device. In some embodiments, the communication is sent to at least the first user device and a fourth user device. In some embodiments, the fourth user device is linked to the second user in a user database including information identifying a plurality of users and communication information associated with each of the plurality of users.

In some embodiments, the method includes receiving communication content and a recipient cohort modification. In some embodiments, the recipient cohort modification adds at least another user to recipient cohort for receipt of the communication. In some embodiments, the recipient cohort modification removes at least one user from the recipient cohort. In some embodiments, generating the first risk prediction based on features generated from the received communications includes: generating a feature vector for each of the features; and inputting the feature vectors into the machine-learning algorithm.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

FIG. 36 is an illustration of one embodiment of the individual view of the user interface.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
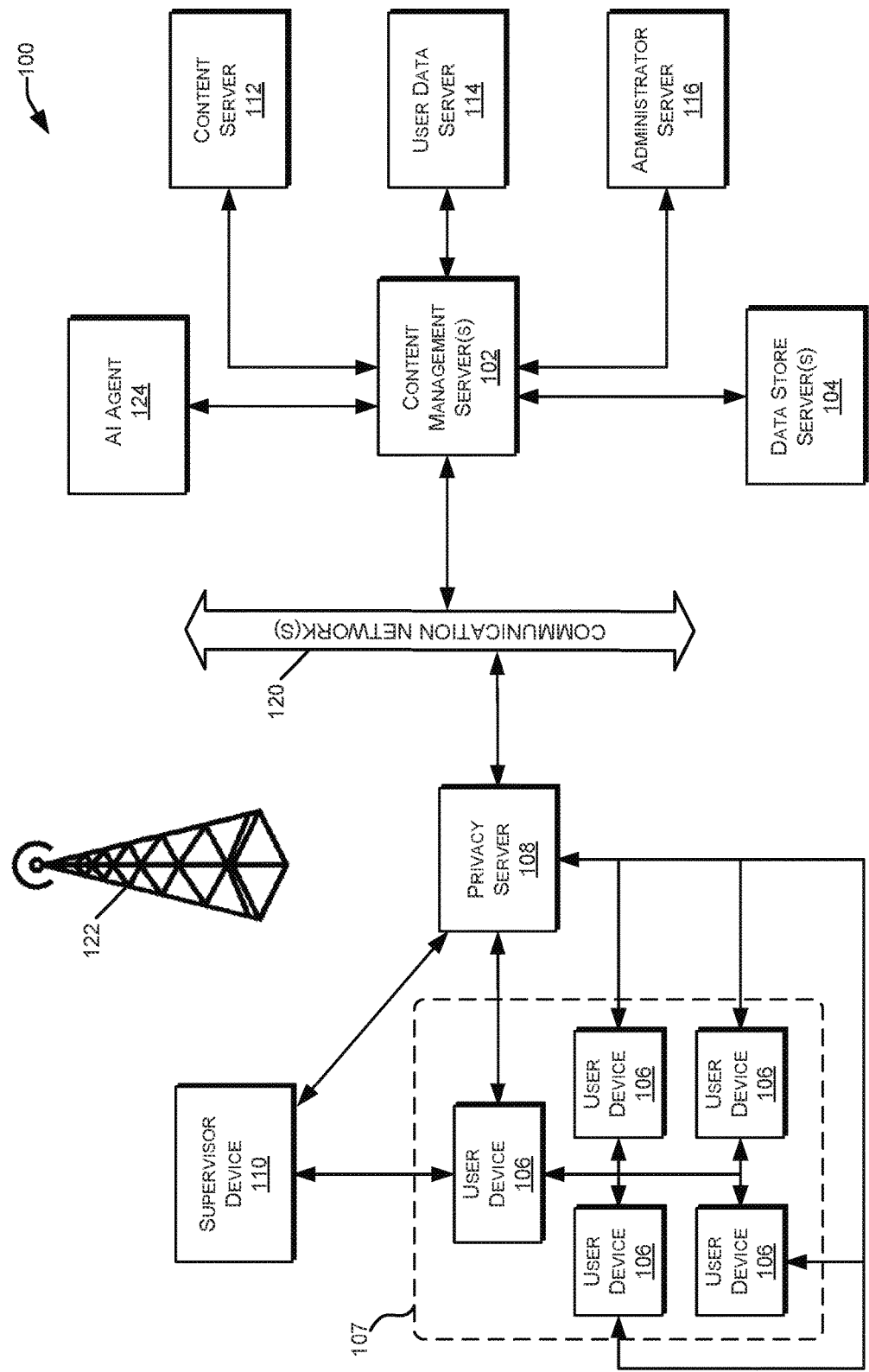
FIG. 1 is a block diagram illustrating an example of a content distribution network.

With reference now to FIG. 1, a block diagram is shown illustrating various components of a content distribution network (CDN) 100 which implements and supports certain embodiments and features described herein. In some embodiments, the content distribution network 100 can comprise one or several physical components and/or one or several virtual components such as, for example, one or several cloud computing components. In some embodiments, the content distribution network 100 can comprise a mixture of physical and cloud computing components.

Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing unit, memory systems, hard drives, network interfaces, power supplies, etc. Content management server 102 may include one or more server farms, clusters, or any other appropriate arrangement and/or combination of computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provide access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more devices including one or more user devices 106 and/or one or more supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as thin-client computers, Internet-enabled gaming systems, business or home appliances, and/or personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including his or her user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

The content distribution network 100 may include one or several navigation systems or features including, for example, the Global Positioning System ("GPS"), GALILEO, or the like, or location systems or features including, for example, one or several transceivers that can determine location of the one or several components of the content distribution network 100 via, for example, triangulation. All of these are depicted as navigation system 122.

In some embodiments, navigation system 122 can include one or several features that can communicate with one or several components of the content distribution network 100 including, for example, with one or several of the user devices 106 and/or with one or several of the supervisor devices 110. In some embodiments, this communication can include the transmission of a signal from the navigation system 122 which signal is received by one or several components of the content distribution network 100 and can be used to determine the location of the one or several components of the content distribution network 100.

Figure 2:
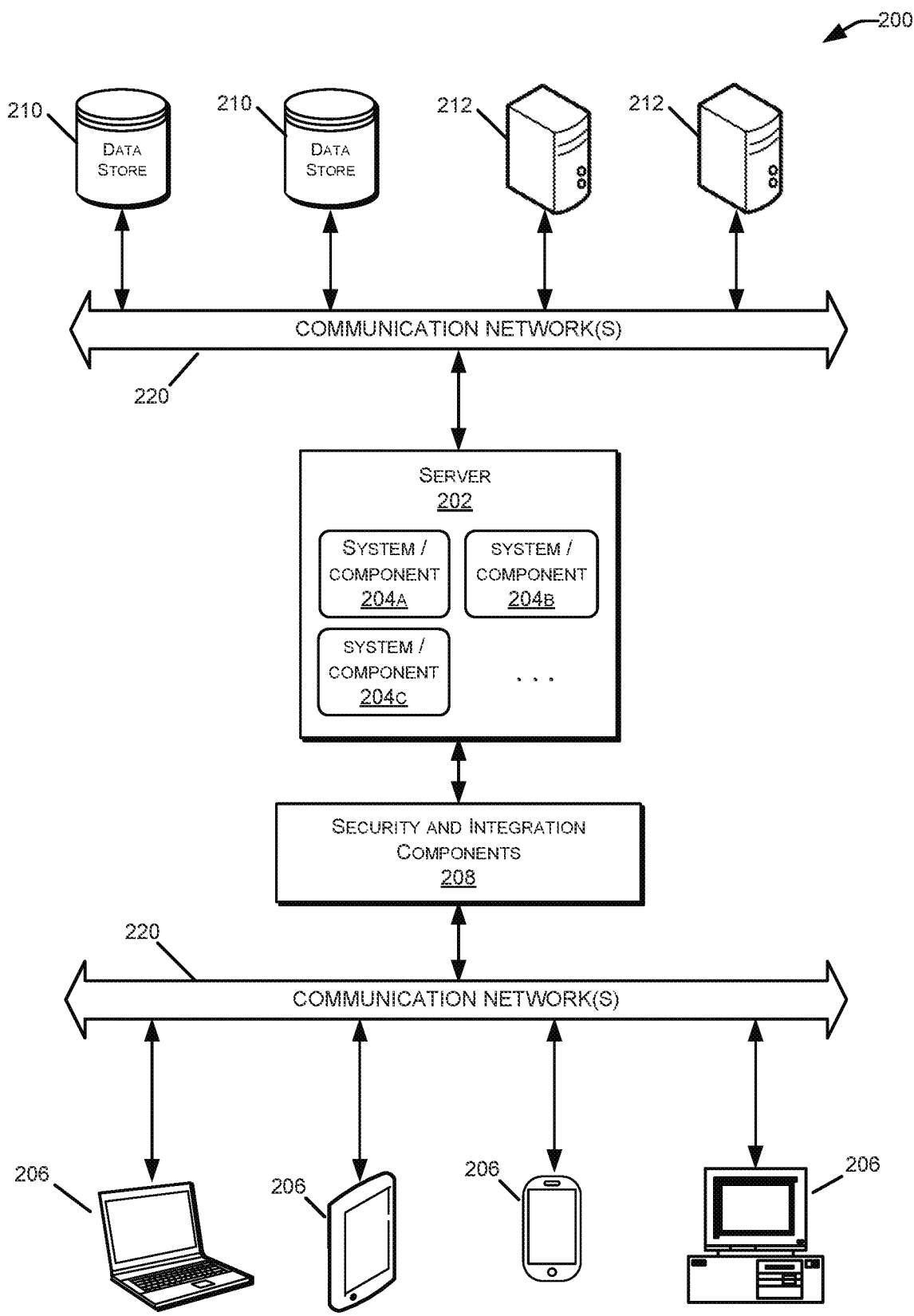
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser-based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
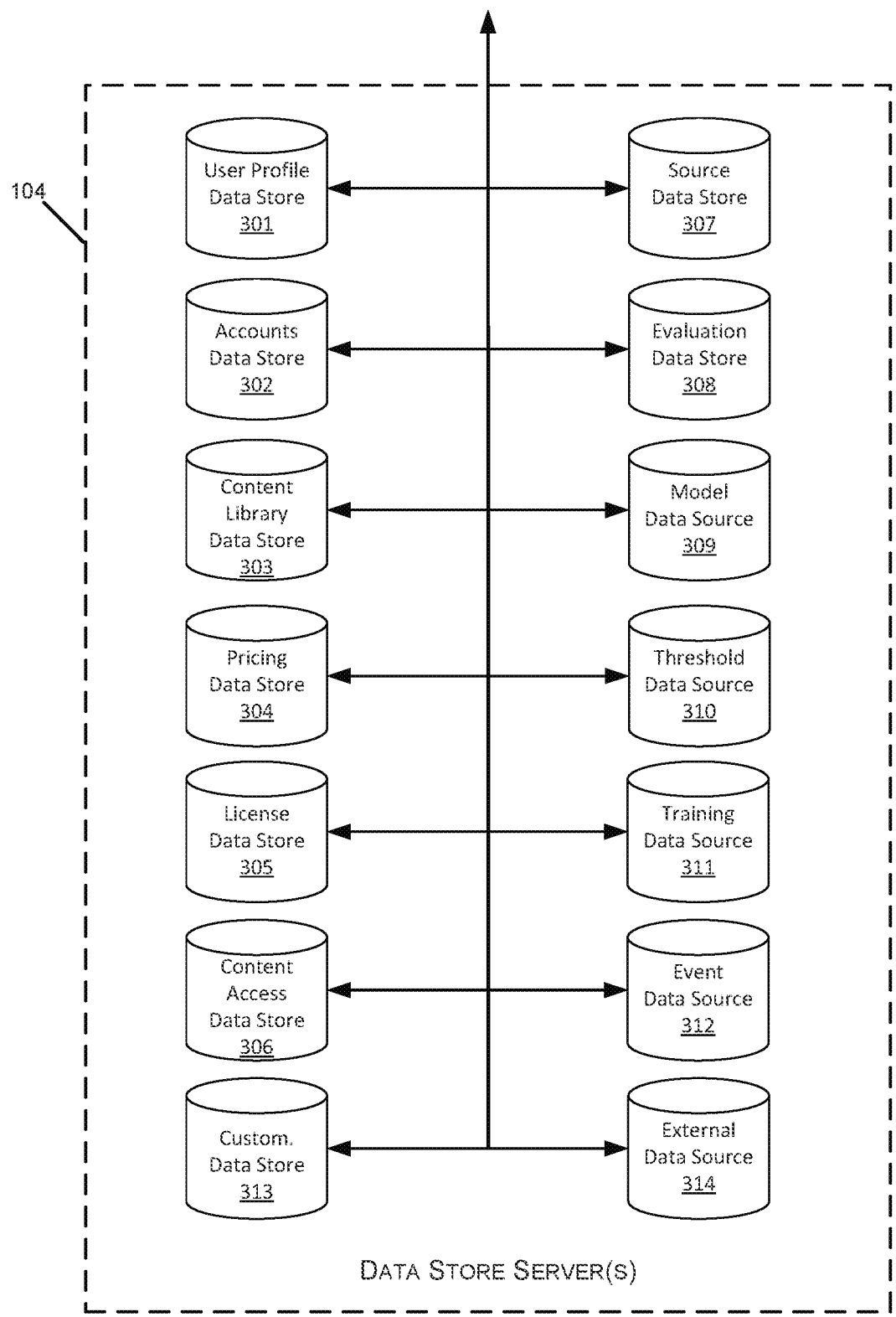
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-314 may reside in storage on a single computer server 104 (or a single server farm or cluster) under the control of a single entity, or may reside on separate servers operated by different entities and/or at remote locations. In some embodiments, data stores 301-314 may be accessed by the content management server 102 and/or other devices and servers within the network 100 (e.g., user devices 106, supervisor devices 110, administrator servers 116, etc.). Access to one or more of the data stores 301-314 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-314, including their functionality and types of data stored therein, are illustrative and non-limiting. Data stores server architecture, design, and the execution of specific data stores 301-314 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information, also referred to herein as user metadata, relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

In some embodiments, the user profile database 301 can include information, such as a risk status, relating to a user's risk level. This risk information can characterize a degree of user risk; a user risk categorization such as, for example, high risk, intermediate risk, and/or low risk; sources of user risk, or the like. In some embodiments, this risk information can be associated with one or several interventions or remedial actions to address the user risk.

The user profile database 301 can include user metadata relating to a user's status, location, or the like. This information can identify, for example, a device a user is using, the location of that device, or the like. In some embodiments, this information can be generated based on any location detection technology including, for example, a navigation system 122, or the like. The user profile database 301 can include user metadata identifying communication information associated with users identified in the user profile database 301. This information can, for example, identify one or several devices used or controlled by the users, user telephone numbers, user email addresses, communication preferences, or the like.

Information relating to the user's status can identify, for example, logged-in status information that can indicate whether the user is presently logged-in to the content distribution network 100 and/or whether the log-in-is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are students, the user profile database 301 can further include user metadata relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100.

The user profile database 301 can include user metadata relating to one or several student learning preferences. In some embodiments, for example, the user, also referred to herein as the student or the student-user may have one or several preferred learning styles, one or several most effective learning styles, and/or the like. In some embodiments, the student's learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

In some embodiments, the user profile data store 301 can further include user metadata identifying one or several user skill levels. In some embodiments, these one or several user skill levels can identify a skill level determined based on past performance by the user interacting with the content delivery network 100, and in some embodiments, these one or several user skill levels can identify a predicted skill level determined based on past performance by the user interacting with the content delivery network 100 and one or several predictive models.

The user profile database 301 can further include user metadata relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual content items (or content resources or data packets) available via the content distribution network 100. In some embodiments, these data packets in the content library database 303 can be linked to form an object network. In some embodiments, these data packets can be linked in the object network according to one or several sequential relationship which can be, in some embodiments, prerequisite relationships that can, for example, identify the relative hierarchy and/or difficulty of the data objects. In some embodiments, this hierarchy of data objects can be generated by the content distribution network 100 according to user experience with the object network, and in some embodiments, this hierarchy of data objects can be generated based on one or several existing and/or external hierarchies such as, for example, a syllabus, a table of contents, or the like. In some embodiments, for example, the object network can correspond to a syllabus such that content for the syllabus is embodied in the object network.

In some embodiments, the content library data store 303 can comprise a syllabus, a schedule, or the like. In some embodiments, the syllabus or schedule can identify one or several tasks and/or events relevant to the user. In some embodiments, for example, when the user is a member of a group such as a section or a class, these tasks and/or events relevant to the user can identify one or several assignments, quizzes, exams, or the like.

In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

In some embodiments, the content library data store 303 can contain information used in evaluating responses received from users. In some embodiments, for example, a user can receive content from the content distribution network 100 and can, subsequent to receiving that content, provide a response to the received content. In some embodiments, for example, the received content can comprise one or several questions, prompts, or the like, and the response to the received content can comprise an answer to those one or several questions, prompts, or the like. In some embodiments, information, referred to herein as "comparative data," from the content library data store 303 can be used to determine whether the responses are the correct and/or desired responses.

In some embodiments, the content library database 303 and/or the user profile database 301 can comprise an aggregation network, also referred to herein as a content network or content aggregation network. The aggregation network can comprise a plurality of content aggregations that can be linked together by, for example: creation by common user; relation to a common subject, topic, skill, or the like; creation from a common set of source material such as source data packets; or the like. In some embodiments, the content aggregation can comprise a grouping of content comprising the presentation portion that can be provided to the user in the form of, for example, a flash card and an extraction portion that can comprise the desired response to the presentation portion such as for example, an answer to a flash card. In some embodiments, one or several content aggregations can be generated by the content distribution network 100 and can be related to one or several data packets that can be, for example, organized in object network. In some embodiments, the one or several content aggregations can be each created from content stored in one or several of the data packets.

In some embodiments, the content aggregations located in the content library database 303 and/or the user profile database 301 can be associated with a user-creator of those content aggregations. In some embodiments, access to content aggregations can vary based on, for example, whether a user created the content aggregations. In some embodiments, the content library database 303 and/or the user profile database 301 can comprise a database of content aggregations associated with a specific user, and in some embodiments, the content library database 303 and/or the user profile database 301 can comprise a plurality of databases of content aggregations that are each associated with a specific user. In some embodiments, these databases of content aggregations can include content aggregations created by their specific user and, in some embodiments, these databases of content aggregations can further include content aggregations selected for inclusion by their specific user and/or a supervisor of that specific user. In some embodiments, these content aggregations can be arranged and/or linked in a hierarchical relationship similar to the data packets in the object network and/or linked to the object network in the object network or the tasks or skills associated with the data packets in the object network or the syllabus or schedule.

In some embodiments, the content aggregation network, and the content aggregations forming the content aggregation network can be organized according to the object network and/or the hierarchical relationships embodied in the object network. In some embodiments, the content aggregation network, and/or the content aggregations forming the content aggregation network can be organized according to one or several tasks identified in the syllabus, schedule or the like.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

A model data store 309, also referred to herein as a model database 309, can store information relating to one or several machine-learning algorithms, classifiers, predictive models which predictive models can be, for example, statistical models and/or the like. In some embodiments, the machine-learning algorithms or processes can include one or several classifiers such as a linear classifier. The machine-learning algorithm can include at least one of: a Random Forrest algorithm; an Artificial Neural Network; an AdaBoost algorithm; a Naïve Bayes algorithm; Boosting Tree, and a Support Vector Machine.

In some embodiments these machine-learning algorithms and/or models can include one or several evidence models, risk models, skill models, or the like. In some embodiments, an evidence model can be a mathematically-based statistical model. The evidence model can be based on, for example, Item Response Theory (IRT), Bayesian Network (Bayes net), Performance Factor Analysis (PFA), or the like. The evidence model can, in some embodiments, be customizable to a user and/or to one or several content items. Specifically, one or several inputs relating to the user and/or to one or several content items can be inserted into the evidence model. These inputs can include, for example, one or several measures of user skill level, one or several measures of content item difficulty and/or skill level, or the like. The customized evidence model can then be used to predict the likelihood of the user providing desired or undesired responses to one or several of the content items.

In some embodiments, the risk models can include one or several models that can be used to calculate one or several model function values. In some embodiments, these one or several model function values can be used to calculate a risk probability, which risk probability can characterize the risk of a user such as a student-user failing to achieve a desired outcome such as, for example, failing to correctly respond to one or several data packets, failure to achieve a desired level of completion of a program, for example in a pre-defined time period, failure to achieve a desired learning outcome, or the like. In some embodiments, the risk probability can identify the risk of the student-user failing to complete 60% of the program.

In some embodiments, these models can include a plurality of model functions including, for example, a first model function, a second model function, a third model function, and a fourth model function. In some embodiments, some or all of the model functions can be associated with a portion of the program such as, for example, a completion stage and/or completion status of the program. In one embodiment, for example, the first model function can be associated with a first completion status, the second model function can be associated with a second completion status, the third model function can be associated with a third completion status, and the fourth model function can be associated with a fourth completion status. In some embodiments, these completion statuses can be selected such that some or all of these completion statuses are less than the desired level of completion of the program. Specifically, in some embodiments, these completion statuses can be selected to all be at less than 60% completion of the program, and more specifically, in some embodiments, the first completion status can be at 20% completion of the program, the second completion status can be at 30% completion of the program, the third completion status can be at 40% completion of the program, and the fourth completion status can be at 50% completion of the program. Similarly, any desired number of model functions can be associated with any desired number of completion statuses.

In some embodiments, a model function can be selected from the plurality of model functions based on a student-user's progress through a program. In some embodiments, the student-user's progress can be compared to one or several status trigger thresholds, each of which status trigger thresholds can be associated with one or more of the model functions. If one of the status triggers is triggered by the student-user's progress, the corresponding one or several model functions can be selected.

The model functions can comprise a variety of types of models and/or functions. In some embodiments, each of the model functions outputs a function value that can be used in calculating a risk probability. This function value can be calculated by performing one or several mathematical operations on one or several values indicative of one or several user attributes and/or user parameters, also referred to herein as program status parameters. In some embodiments, each of the model functions can use the same program status parameters, and in some embodiments, the model functions can use different program status parameters. In some embodiments, the model functions use different program status parameters when at least one of the model functions uses at least one program status parameter that is not used by others of the model functions.

In some embodiments, a skill model can comprise a statistical model identifying a predictive skill level of one or several students. In some embodiments, this model can identify a single skill level of a student and/or a range of possible skill levels of a student. In some embodiments, this statistical model can identify a skill level of a student-user and an error value or error range associated with that skill level. In some embodiments, the error value can be associated with a confidence interval determined based on a confidence level. Thus, in some embodiments, as the number of student interactions with the content distribution network increases, the confidence level can increase and the error value can decrease such that the range identified by the error value about the predicted skill level is smaller.

In some embodiments, the model database 310 can include a plurality of learning algorithms, classifiers, and/or models and can include information identifying features used by the plurality of learning algorithms, classifiers, and/or models in generating one or several predictions such as, for example, a risk prediction. In some embodiments, for example, some or all of the plurality of learning algorithms, classifiers, and/or models can use different features in generating one or several predictions. These features can be identified in the model database 310 in association with the plurality of learning algorithms, classifiers, and/or models. In some embodiments, the model database 310 can further include information identifying a format and/or form for the features to be in to allow inputting into the associated one or several of the plurality of learning algorithms, classifiers, and/or models A threshold database 310, also referred to herein as a threshold database, can store one or several threshold values. These one or several threshold values can delineate between states or conditions. In one exemplary embodiment, for example, a threshold value can delineate between an acceptable user performance and an unacceptable user performance, between content appropriate for a user and content that is inappropriate for a user, between risk levels, or the like.

A training data source 311, also referred to herein as a training database 311 can include training data used in training one or several of the plurality of learning algorithms, classifiers, and/or models. This can include, for example, one or several sets of training data and/or one or several sets of test data.

A event data source 312, also referred to herein as a fact database 312 or a feature database 312 can include information identifying one or several interactions between the user and the content distribution network 100 and any features, including first-level features or second-level features, generated therefrom. In some embodiments, the event data source 312 can include instructions and/or computer code that when executed causes the generation of one or several features including one or several first-level features and/or one or several second-level features. The event database 312 can be organized into a plurality of sub-databases. In some embodiments, these can include an interaction sub-database that can include interactions between one or several users and the CDN 100. In some embodiments, this interaction sub-database can include divisions such that each user's interactions with the CDN 100 are distinctly stored within the interaction sub-database. The event database 312 can include a generated feature sub-database, which can include a generated first-level feature sub-database and/or a generated second-level feature sub-database.

The event database 312 can further include a feature creation sub-database, which can include instructions for the creation of one or several features. These one or several features can include, for example, a Hurst coefficient; average correct on first try percent; an average score which can include an average homework score and/or an average test score; an average part score; a number of attempted parts; an average number of attempted parts; an average number of attempts per part; and an aggregation parameter such as, for example, one or several course level aggregations. In some embodiments, these features can be calculated with data collected within a window, which window can be a temporally bounded window, or a window bounded by a number of received response. In such an embodiment, for example, the window can be a sliding window, also referred to herein as a sliding temporal window that can include information relating to some or all of one or several users' interaction with the CDN 100 during a designated time period such as, for example, a 1 week time period, a ten day time period, a two week time period, a three week time period, a four week time period, a six week time period, a twelve week time period, or any other or intermediate period of time.

In some embodiments, the Hurst coefficient can be a measure of instability in responses received from a user, and specifically a measure of randomness in correct/incorrect responses to one or several questions. The Hurst coefficient can be calculated across a window of data, which window can be limited to a specified time period and/or to a specified number of response.

The average correct on first try percent (CFT %) can be a value indicating the average percent of questions to which the student-user submitted a correct response on a first try. The CFT % can be an indicator of changes to correctness stability. In some embodiments, this feature can be updated with each additional response received from the student-user. In some embodiments, the average correct on first try percent can be calculated by dividing the number of response that were correct on the first try by the number of questions for which responses were received. In some embodiments, the CFT % can be stored as a percent, or as a normalized value between 0 and 1.

The average score which can include an average homework score and/or an average test score can be the average score received by the user on, for example, homework and/or tests within the window. The average part score can identify the average score received by the user on different problem parts. In some embodiments, for example, a problem can include multiple parts, each of which can be independent evaluated. The average part score can be, for example, the average number of points received for a problem part and/or a percent indicating the average percent of points received per problem part. In some embodiments, the number of attempted parts can be a count of the number of total attempted parts of questions, and the average number of attempted parts can be the average number of attempted parts per question. In some embodiments, the average number of attempts per part can be the average number of attempts for each problem part before the user quits further attempts or correctly responds to the problem part. In some embodiments, the aggregation parameter can include a course level average such as, for example, an average percent correct across all students within a course, and the aggregation parameter can include one or several course level aggregations which can be a delta value indicating the difference between a feature calculated for an individual and a similar feature calculated for the course.

A customization data store 313 can include information relating to one or several customizations. The customization database 313 can contain one or several configuration profiles that can identify one or several user attributes and a customization associated with each of those one or several user attributes. In some embodiments, the customization identifies a sub-set of potential features for use in generating a risk prediction, and thus can specify a change to features used in generating a risk prediction. The customization database 313 can include customizations specific to a single user or to a group of users sharing a common attribute. In some embodiments, the customizations within the customization database 313 can modify the machine-learning algorithm used in generating a risk prediction. In some embodiments this can include selecting a specific one or several machine-learning algorithms or classifiers that is associated with a unique set of features specified by the customization. In some embodiments, the identification of a customization for use in generating a risk prediction is determined according to a portion of metadata that is non-unique to a user and is unique to a set of users sharing at least one common attribute.

In addition to the illustrative data stores described above, data store server(s) 104 (e.g., database servers, file-based storage servers, etc.) may include one or more external data aggregators 314. External data aggregators 314 may include third-party data sources accessible to the content management network 100, but not maintained by the content management network 100. External data aggregators 314 may include any electronic information source relating to the users, content resources, or applications of the content distribution network 100. For example, external data aggregators 314 may be third-party data stores containing demographic data, education-related data, consumer sales data, health-related data, and the like. Illustrative external data aggregators 314 may include, for example, social networking web servers, public records data stores, learning management systems, educational institution servers, business servers, consumer sales data stores, medical record data stores, etc. Data retrieved from various external data aggregators 314 may be used to verify and update user account information, suggest user content, and perform user and content evaluations.

Figure 4:
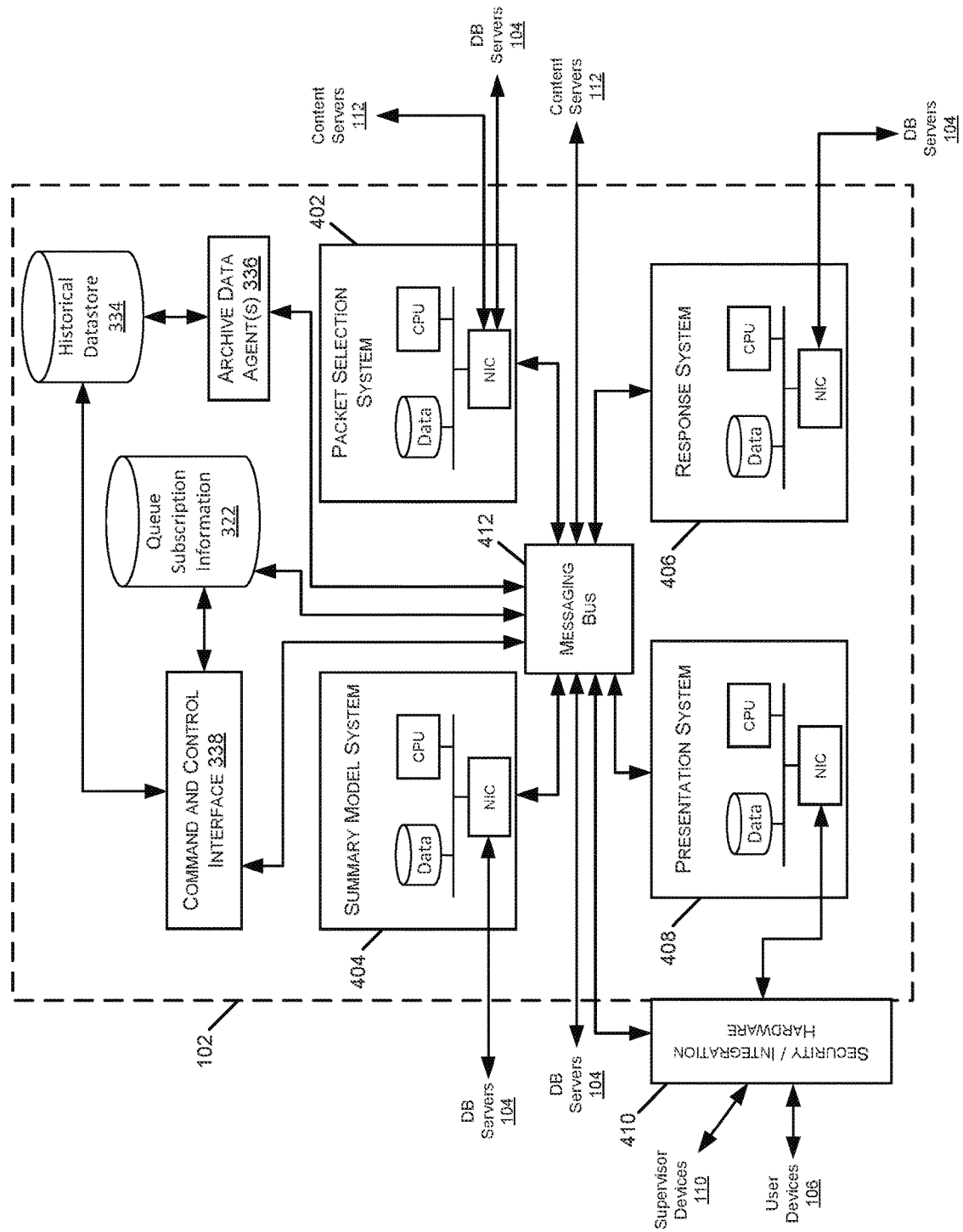
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. In such an embodiment, content management server 102 performs internal data gathering and processing of streamed content along with external data gathering and processing. Other embodiments could have either all external or all internal data gathering. This embodiment allows reporting timely information that might be of interest to the reporting party or other parties. In this embodiment, the content management server 102 can monitor gathered information from several sources to allow it to make timely business and/or processing decisions based upon that information. For example, reports of user actions and/or responses, as well as the status and/or results of one or several processing tasks could be gathered and reported to the content management server 102 from a number of sources.

Internally, the content management server 102 gathers information from one or more internal components 402-408. The internal components 402-408 gather and/or process information relating to such things as: content provided to users; content consumed by users; responses provided by users; user skill levels; content difficulty levels; next content for providing to users; etc. The internal components 402-408 can report the gathered and/or generated information in real-time, near real-time or along another time line. To account for any delay in reporting information, a time stamp or staleness indicator can inform others of how timely the information was sampled. The content management server 102 can opt to allow third parties to use internally or externally gathered information that is aggregated within the server 102 by subscription to the content distribution network 100.

A command and control (CC) interface 338 configures the gathered input information to an output of data streams, also referred to herein as content streams. APIs for accepting gathered information and providing data streams are provided to third parties external to the server 102 who want to subscribe to data streams. The server 102 or a third party can design as yet undefined APIs using the CC interface 338. The server 102 can also define authorization and authentication parameters using the CC interface 338 such as authentication, authorization, login, and/or data encryption. CC information is passed to the internal components 402-408 and/or other components of the content distribution network 100 through a channel separate from the gathered information or data stream in this embodiment, but other embodiments could embed CC information in these communication channels. The CC information allows throttling information reporting frequency, specifying formats for information and data streams, deactivation of one or several internal components 402-408 and/or other components of the content distribution network 100, updating authentication and authorization, etc.

The various data streams that are available can be researched and explored through the CC interface 338. Those data stream selections for a particular subscriber, which can be one or several of the internal components 402-408 and/or other components of the content distribution network 100, are stored in the queue subscription information database 322. The server 102 and/or the CC interface 338 then routes selected data streams to processing subscribers that have selected delivery of a given data stream. Additionally, the server 102 also supports historical queries of the various data streams that are stored in an historical data store 334 as gathered by an archive data agent 336. Through the CC interface 238 various data streams can be selected for archiving into the historical data store 334.

Components of the content distribution network 100 outside of the server 102 can also gather information that is reported to the server 102 in real-time, near real-time or along another time line. There is a defined API between those components and the server 102. Each type of information or variable collected by server 102 falls within a defined API or multiple APIs. In some cases, the CC interface 338 is used to define additional variables to modify an API that might be of use to processing subscribers. The additional variables can be passed to all processing subscribes or just a subset. For example, a component of the content distribution network 100 outside of the server 102 may report a user response but define an identifier of that user as a private variable that would not be passed to processing subscribers lacking access to that user and/or authorization to receive that user data. Processing subscribers having access to that user and/or authorization to receive that user data would receive the subscriber identifier along with response reported that component. Encryption and/or unique addressing of data streams or sub-streams can be used to hide the private variables within the messaging queues.

The user devices 106 and/or supervisor devices 110 communicate with the server 102 through security and/or integration hardware 410. The communication with security and/or integration hardware 410 can be encrypted or not. For example, a socket using a TCP connection could be used. In addition to TCP, other transport layer protocols like SCTP and UDP could be used in some embodiments to intake the gathered information. A protocol such as SSL could be used to protect the information over the TCP connection. Authentication and authorization can be performed to any user devices 106 and/or supervisor device interfacing to the server 102. The security and/or integration hardware 410 receives the information from one or several of the user devices 106 and/or the supervisor devices 110 by providing the API and any encryption, authorization, and/or authentication. In some cases, the security and/or integration hardware 410 reformats or rearranges this received information.

The messaging bus 412, also referred to herein as a messaging queue or a messaging channel, can receive information from the internal components of the server 102 and/or components of the content distribution network 100 outside of the server 102 and distribute the gathered information as a data stream to any processing subscribers that have requested the data stream from the messaging queue 412. As indicate in FIG. 4, processing subscribers are indicated by a connector to the messaging bus 412, the connector having an arrow head pointing away from the messaging bus 412. Only data streams within the messaging queue 412 that a particular processing subscriber has subscribed to may be read by that processing subscriber if received at all. Gathered information sent to the messaging queue 412 is processed and returned in a data stream in a fraction of a second by the messaging queue 412. Various multicasting and routing techniques can be used to distribute a data stream from the messaging queue 412 that a number of processing subscribers have requested. Protocols such as Multicast or multiple Unicast could be used to distribute streams within the messaging queue 412. Additionally, transport layer protocols like TCP, SCTP and UDP could be used in various embodiments.

Through the CC interface 338, an external or internal processing subscriber can be assigned one or more data streams within the messaging queue 412. A data stream is a particular type of message in a particular category. For example, a data stream can comprise all of the data reported to the messaging bus 412 by a designated set of components. One or more processing subscribers could subscribe and receive the data stream to process the information and make a decision and/or feed the output from the processing as gathered information fed back into the messaging queue 412. Through the CC interface 338 a developer can search the available data streams or specify a new data stream and its API. The new data stream might be determined by processing a number of existing data streams with a processing subscriber.

The CDN 110 has internal processing subscribers 402-408 that process assigned data streams to perform functions within the server 102. Internal processing subscribers 402-408 could perform functions such as providing content to a user, receiving a response from a user, determining the correctness of the received response, updating one or several models based on the correctness of the response, recommending new content for providing to one or several users, or the like. The internal processing subscribers 402-408 can decide filtering and weighting of records from the data stream. To the extent that decisions are made based upon analysis of the data stream, each data record is time stamped to reflect when the information was gathered such that additional credibility could be given to more recent results, for example. Other embodiments may filter out records in the data stream that are from an unreliable source or stale. For example, a particular contributor of information may prove to have less than optimal gathered information and that could be weighted very low or removed altogether.

Internal processing subscribers 402-408 may additionally process one or more data streams to provide different information to feed back into the messaging queue 412 to be part of a different data stream. For example, hundreds of user devices 106 could provide responses that are put into a data stream on the messaging queue 412. An internal processing subscriber 402-408 could receive the data stream and process it to determine the difficulty of one or several data packets provided to one or several users, and supply this information back onto the messaging queue 412 for possible use by other internal and external processing subscribers.

As mentioned above, the CC interface 338 allows the CDN 110 to query historical messaging queue 412 information. An archive data agent 336 listens to the messaging queue 412 to store data streams in a historical database 334. The historical database 334 may store data streams for varying amounts of time and may not store all data streams. Different data streams may be stored for different amounts of time.

With regard to the components 402-48, the content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a packet selection system 402. The packet selection system 402 may be implemented using dedicated hardware within the content distribution network 100 (e.g., a packet selection server 402), or using designated hardware and software resources within a shared content management server 102. In some embodiments, the packet selection system 402 may adjust the selection and adaptive capabilities of content resources to match the needs and desires of the users receiving the content. For example, the packet selection system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the packet selection system 402 may modify content resources for individual users.

In some embodiments, the packet selection system 402 can include a recommendation engine, also referred to herein as an adaptive recommendation engine. In some embodiments, the recommendation engine can select one or several pieces of content, also referred to herein as data packets, for providing to a user. These data packets can be selected based on, for example, the information retrieved from the database server 104 including, for example, the user profile database 301, the content library database 303, the model database 309, or the like. In some embodiments, these one or several data packets can be adaptively selected and/or selected according to one or several selection rules. In one embodiment, for example, the recommendation engine can retrieve information from the user profile database 301 identifying, for example, a skill level of the user. The recommendation engine can further retrieve information from the content library database 303 identifying, for example, potential data packets for providing to the user and the difficulty of those data packets and/or the skill level associated with those data packets.

The recommendation engine can identify one or several potential data packets for providing and/or one or several data packets for providing to the user based on, for example, one or several rules, models, predictions, or the like. The recommendation engine can use the skill level of the user to generate a prediction of the likelihood of one or several users providing a desired response to some or all of the potential data packets. In some embodiments, the recommendation engine can pair one or several data packets with selection criteria that may be used to determine which packet should be delivered to a student-user based on one or several received responses from that student-user. In some embodiments, one or several data packets can be eliminated from the pool of potential data packets if the prediction indicates either too high a likelihood of a desired response or too low a likelihood of a desired response. In some embodiments, the recommendation engine can then apply one or several selection criteria to the remaining potential data packets to select a data packet for providing to the user. These one or several selection criteria can be based on, for example, criteria relating to a desired estimated time for receipt of response to the data packet, one or several content parameters, one or several assignment parameters, or the like.

A content management server 102 also may include a summary model system 404. The summary model system 404 may be implemented using dedicated hardware within the content distribution network 100 (e.g., a summary model server 404), or using designated hardware and software resources within a shared content management server 102. In some embodiments, the summary model system 404 may monitor the progress of users through various types of content resources and groups, such as media compilations, courses or curriculums in training or educational contexts, interactive gaming environments, and the like. For example, the summary model system 404 may query one or more databases and/or data store servers 104 to retrieve user data such as associated content compilations or programs, content completion status, user goals, results, and the like.

A content management server 102 also may include a response system 406, which can include, in some embodiments, a response processor. The response system 406 may be implemented using dedicated hardware within the content distribution network 100 (e.g., a response server 406), or using designated hardware and software resources within a shared content management server 102. The response system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the response server 406 may analyze the information to determine the effectiveness or appropriateness of content resources with, for example, a subject matter, an age group, a skill level, or the like. In some embodiments, the response system 406 may provide updates to the packet selection system 402 or the summary model system 404, with the attributes of one or more content resources or groups of resources within the network 100. The response system 406 also may receive and analyze user evaluation data from user devices 106, supervisor devices 110, and administrator servers 116, etc. For instance, response system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

In some embodiments, the response system 406 can be further configured to receive one or several responses from the user and analyze these one or several responses. In some embodiments, for example, the response system 406 can be configured to translate the one or several responses into one or several observables. As used herein, an observable is a characterization of a received response. In some embodiments, the translation of the one or several responses into one or several observables can include determining whether the one or several responses are correct responses, also referred to herein as desired responses, or are incorrect responses, also referred to herein as undesired responses. In some embodiments, the translation of the one or several responses into one or several observables can include characterizing the degree to which one or several responses are desired responses and/or undesired responses. In some embodiments, one or several values can be generated by the response system 406 to reflect user performance in responding to the one or several data packets. In some embodiments, these one or several values can comprise one or several scores for one or several responses and/or data packets.

A content management server 102 also may include a presentation system 408. The presentation system 408 may be implemented using dedicated hardware within the content distribution network 100 (e.g., a presentation server 408), or using designated hardware and software resources within a shared content management server 102. The presentation system 408 can include a presentation engine that can be, for example, a software module running on the content delivery system.

The presentation system 408, also referred to herein as the presentation module or the presentation engine, may control generation of one or several user interfaces and/or the content presented to a user via these one or several user interfaces. In some embodiments, for example, the presentation system 408 of the server 102 can generate and/or provide content to one or several of the user devices 106 and/or supervisor devices 110 for display via a user interface.

The presentation system 408 may receive content resources from the packet selection system 402 and/or from the summary model system 404, and provide the resources to user devices 106. The presentation system 408 may determine the appropriate presentation format for the content resources based on the user characteristics and preferences, and/or the device capabilities of user devices 106. If needed, the presentation system 408 may convert the content resources to the appropriate presentation format and/or compress the content before transmission. In some embodiments, the presentation system 408 may also determine the appropriate transmission media and communication protocols for transmission of the content resources.

In some embodiments, the presentation system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
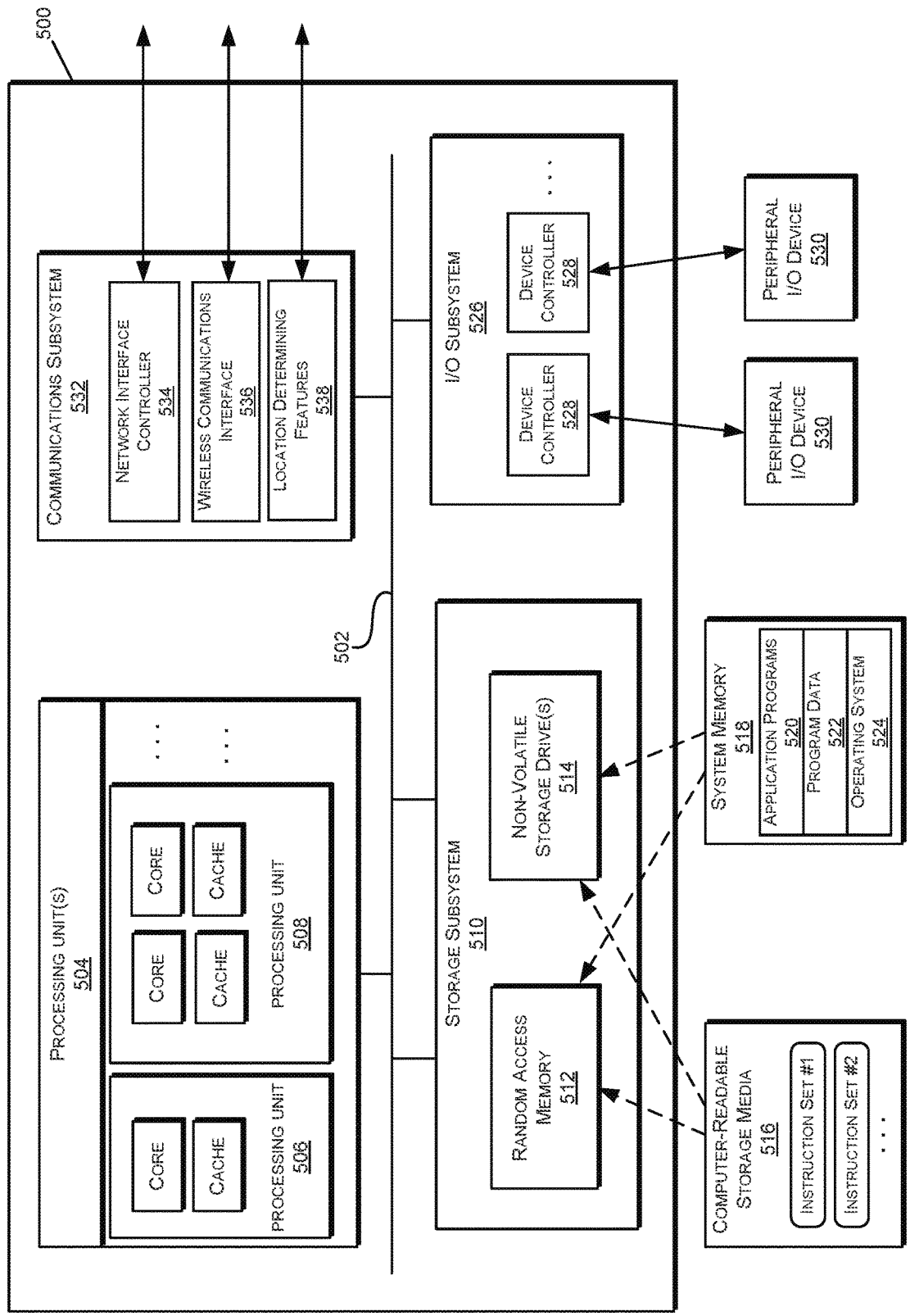
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater).

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to the user in perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.). The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that, when executed by a processor, provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 314). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
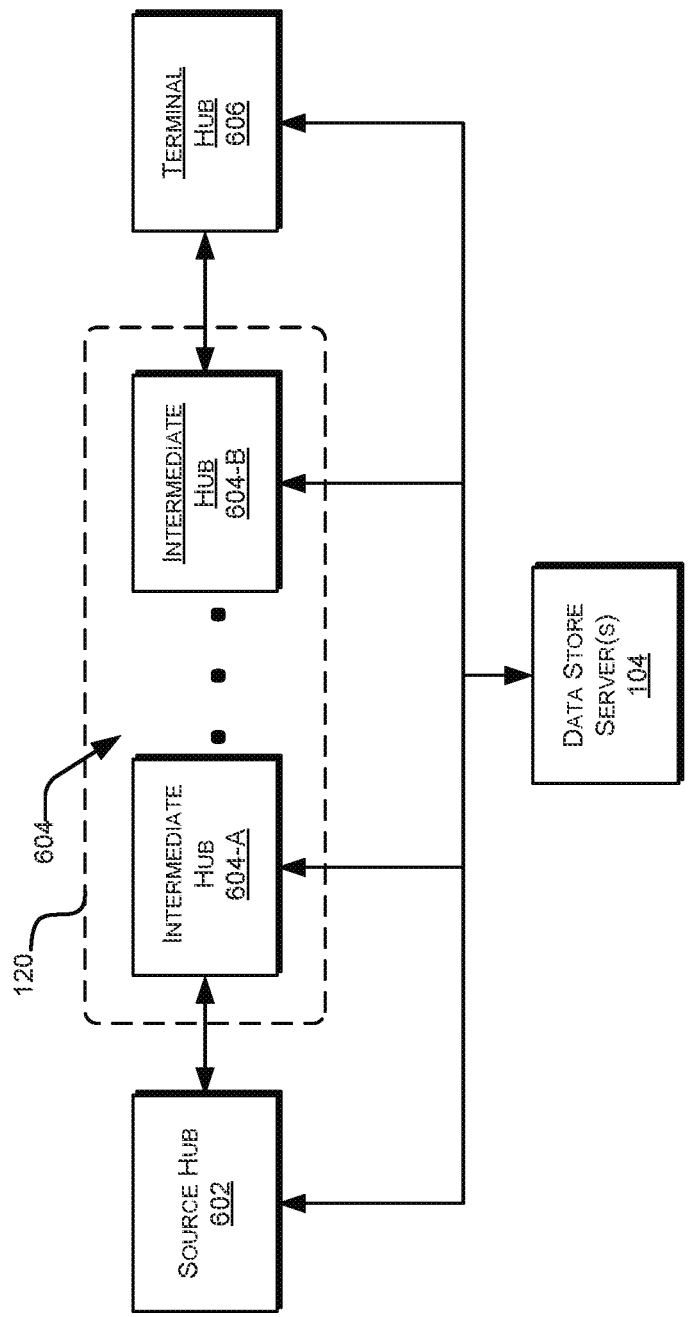
FIG. 6 is a block diagram illustrating one embodiment of the communication network.

With reference now to FIG. 6, a block diagram illustrating one embodiment of the communication network is shown. Specifically, FIG. 6 depicts one hardware configuration in which messages are exchanged between a source hub 602 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatingly connected with the data store 104. In such an embodiments, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7:
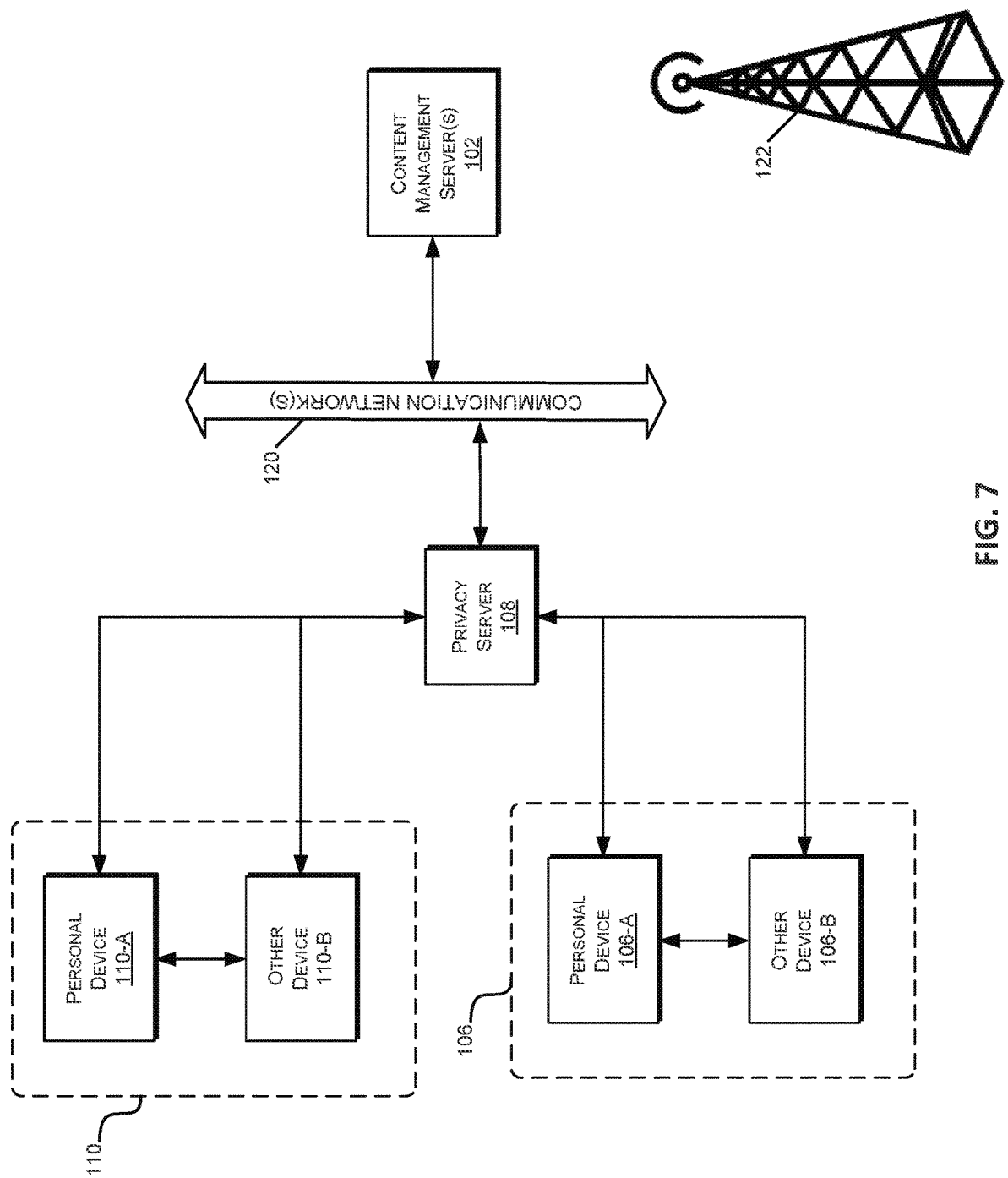
FIG. 7 is a block diagram illustrating one embodiment of user device and supervisor device communication.

With reference now to FIG. 7, a block diagram illustrating one embodiment of user device 106 and supervisor device 110 communication is shown. In some embodiments, for example, a user may have multiple devices that can connect with the content distribution network 100 to send or receive information. In some embodiments, for example, a user may have a personal device such as a mobile device, a Smartphone, a tablet, a Smartwatch, a laptop, a PC, or the like. In some embodiments, the other device can be any computing device in addition to the personal device. This other device can include, for example, a laptop, a PC, a Smartphone, a tablet, a Smartwatch, or the like. In some embodiments, the other device differs from the personal device in that the personal device is registered as such within the content distribution network 100 and the other device is not registered as a personal device within the content distribution network 100.

Specifically with respect to FIG. 7, the user device 106 can include a personal user device 106-A and one or several other user devices 106-B. In some embodiments, one or both of the personal user device 106-A and the one or several other user devices 106-B can be communicatingly connected to the content management server 102 and/or to the navigation system 122. Similarly, the supervisor device 110 can include a personal supervisor device 110-A and one or several other supervisor devices 110-B. In some embodiments, one or both of the personal supervisor device 110-A and the one or several other supervisor devices 110-B can be communicatingly connected to the content management server 102 and/or to the navigation system 122.

In some embodiments, the content distribution network can send one or more alerts to one or more user devices 106 and/or one or more supervisor devices 110 via, for example, the communication network 120. In some embodiments, the receipt of the alert can result in the launching of an application within the receiving device, and in some embodiments, the alert can include a link that, when selected, launches the application or navigates a web-browser of the device of the selector of the link to a page or portal associated with the alert.

In some embodiments, for example, the providing of this alert can include the identification of one or several user devices 106 and/or student-user accounts associated with the student-user and/or one or several supervisor devices 110 and/or supervisor-user accounts associated with the supervisor-user. After these one or several devices 106, 110 and/or accounts have been identified, the providing of this alert can include determining an active device of the devices 106, 110 based on determining which of the devices 106, 110 and/or accounts are actively being used, and then providing the alert to that active device.

Specifically, if the user is actively using one of the devices 106, 110 such as the other user device 106-B and the other supervisor device 110-B, and/or accounts, the alert can be provided to the user via that other device 106-B, 110-B and/or account that is actively being used. If the user is not actively using an other device 106-B, 110-B and/or account, a personal device 106-A, 110-A device, such as a smart phone or tablet, can be identified and the alert can be provided to this personal device 106-A, 110-A. In some embodiments, the alert can include code to direct the default device to provide an indicator of the received alert such as, for example, an aural, tactile, or visual indicator of receipt of the alert.

In some embodiments, the recipient device 106, 110 of the alert can provide an indication of receipt of the alert. In some embodiments, the presentation of the alert can include the control of the I/O subsystem 526 to, for example, provide an aural, tactile, and/or visual indicator of the alert and/or of the receipt of the alert. In some embodiments, this can include controlling a screen of the supervisor device 110 to display the alert, data contained in alert and/or an indicator of the alert.

Figure 8:
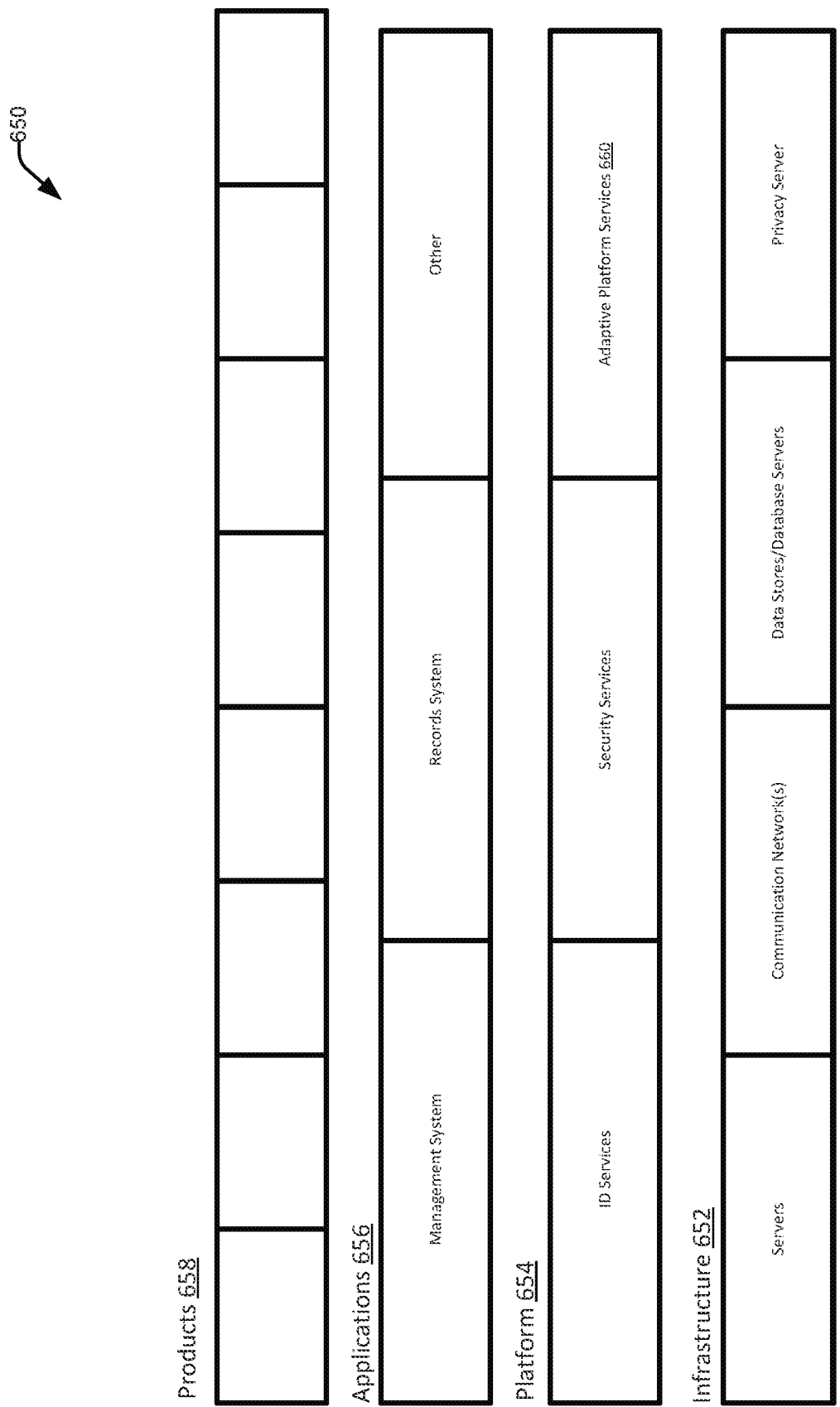
FIG. 8 is a schematic illustration of one embodiment of a computing stack.

With reference now to FIG. 8, a schematic illustration of one embodiment of an application stack, and particularly of a stack 650 is shown. In some embodiments, the content distribution network 100 can comprise a portion of the stack 650 that can include an infrastructure layer 652, a platform layer 654, an applications layer 656, and a products layer 658. In some embodiments, the stack 650 can comprise some or all of the layers, hardware, and/or software to provide one or several desired functionalities and/or productions.

As depicted in FIG. 8, the infrastructure layer 652 can include one or several servers, communication networks, data stores, privacy servers, and the like. In some embodiments, the infrastructure layer can further include one or several user devices 106 and/or supervisor devices 110 connected as part of the content distribution network.

The platform layer can include one or several platform software programs, modules, and/or capabilities. These can include, for example, identification services, security services, and/or adaptive platform services 660. In some embodiments, the identification services can, for example, identify one or several users, components of the content distribution network 100, or the like. The security services can monitor the content distribution network for one or several security threats, breaches, viruses, malware, or the like. The adaptive platform services 660 can receive information from one or several components of the content distribution network 100 and can provide predictions, models, recommendations, or the like based on that received information. The functionality of the adaptive platform services 660 will be discussed in greater detail in FIGS. 9-11, below.

The applications layer 656 can include software or software modules upon or in which one or several product softwares or product software modules can operate. In some embodiments, the applications layer 656 can include, for example, a management system, record system, or the like. In some embodiments, the management system can include, for example, a Learning Management System (LMS), a Content Management System (CMS), or the like. The management system can be configured to control the delivery of one or several resources to a user and/or to receive one or several responses from the user. In some embodiments, the records system can include, for example, a virtual gradebook, a virtual counselor, or the like.

The products layer can include one or several software products and/or software module products. These software products and/or software module products can provide one or several services and/or functionalities to one or several users of the software products and/or software module products.

Figure 9:
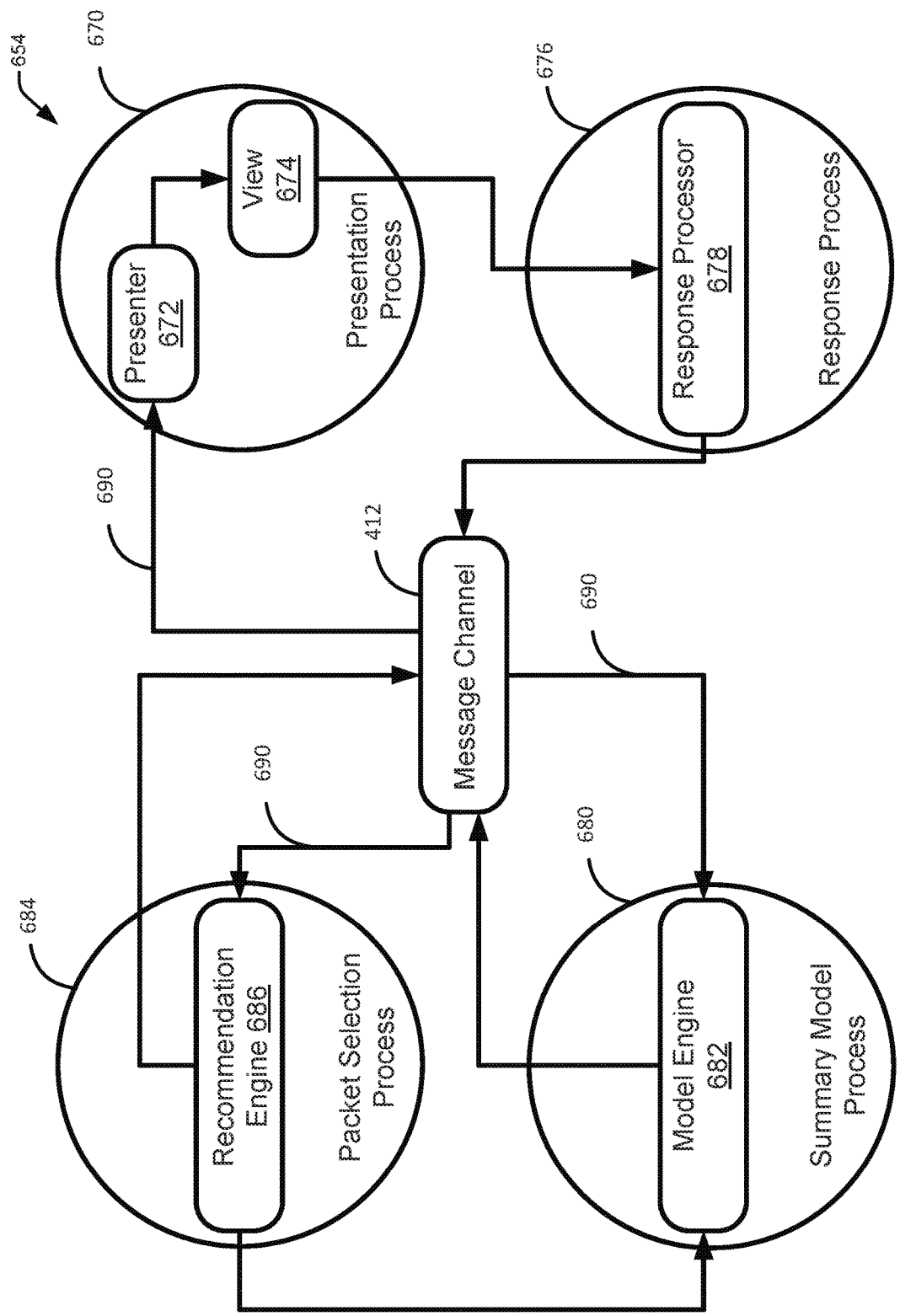
FIG. 9 is a schematic illustration of one embodiment of communication and processing flow of modules within the content distribution network.
Figure 10:
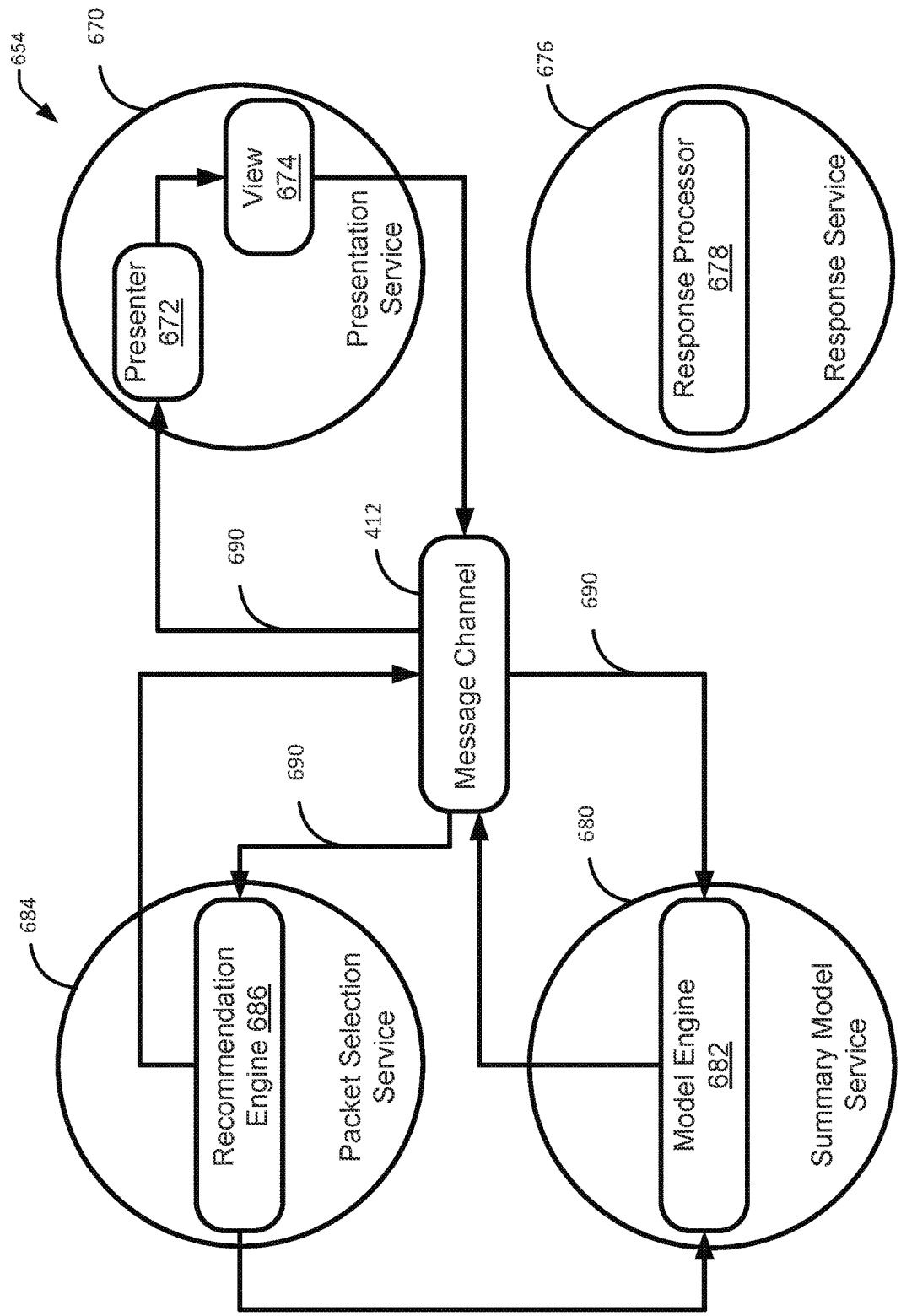
FIG. 10 is a schematic illustration of another embodiment of communication and processing flow of modules within the content distribution network.
Figure 11:
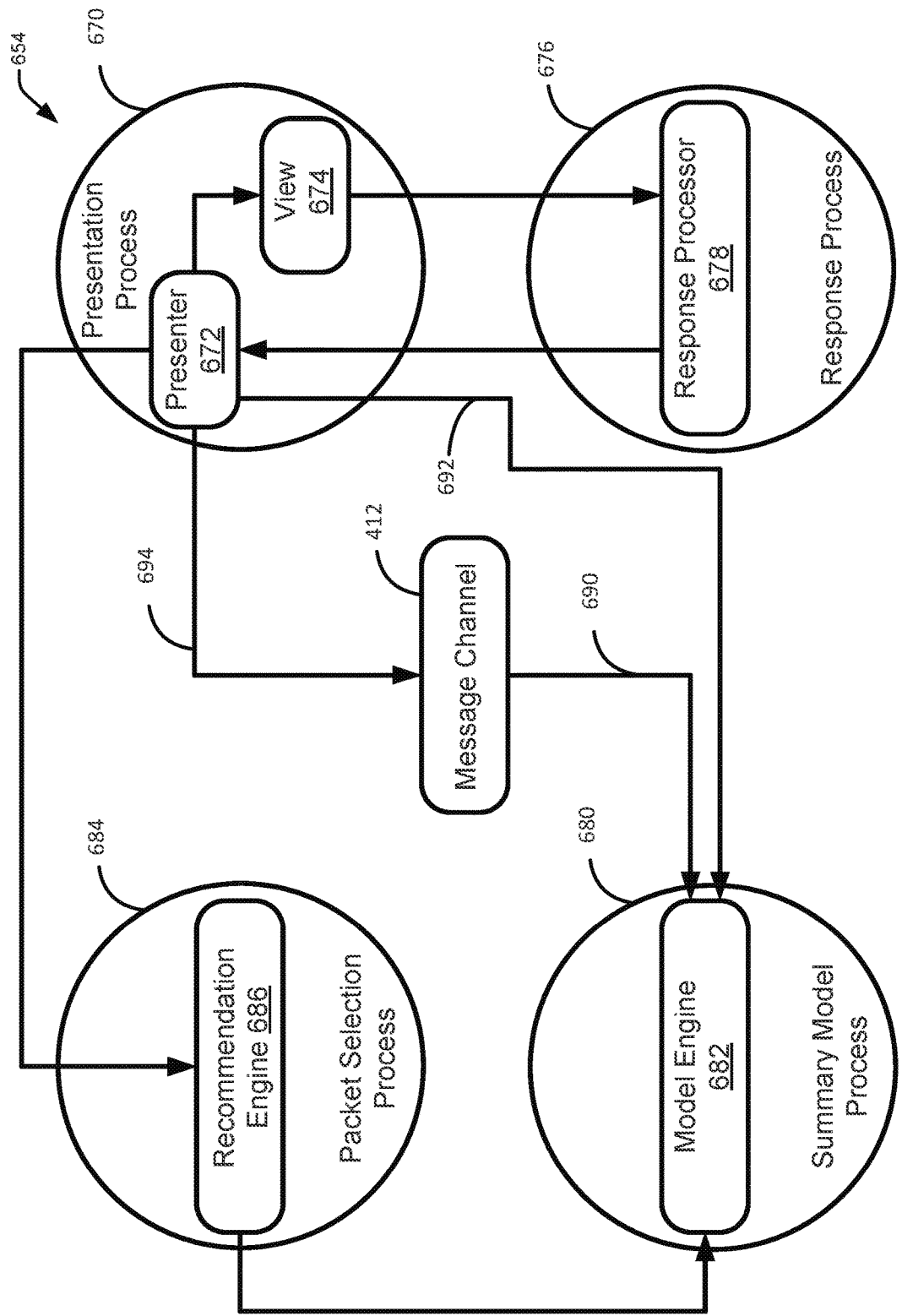
FIG. 11 is a schematic illustration of another embodiment of communication and processing flow of modules within the content distribution network.

With reference now to FIG. 9-11, schematic illustrations of embodiments of communication and processing flow of modules within the content distribution network 100 are shown. In some embodiments, the communication and processing can be performed in portions of the platform layer 654 and/or applications layer 656. FIG. 9 depicts a first embodiment of such communications or processing that can be in the platform layer 654 and/or applications layer 656 via the message channel 412.

The platform layer 654 and/or applications layer 656 can include a plurality of modules that can be embodied in software or hardware. In some embodiments, some or all of the modules can be embodied in hardware and/or software at a single location, and in some embodiments, some or all of these modules can be embodied in hardware and/or software at multiple locations. These modules can perform one or several processes including, for example, a presentation process 670, a response process 676, a summary model process 680, and a packet selection process 684.

The presentation process 670 can, in some embodiments, include one or several methods and/or steps to deliver content to one or several user devices 106 and/or supervisor devices 110. The presentation process 670 can be performed by a presenter module 672 and a view module 674. The presenter module 672 can be a hardware or software module of the content distribution network 100, and specifically of the server 102. In some embodiments, the presenter module 672 can include one or several portions, features, and/or functionalities that are located on the server 102 and/or one or several portions, features, and/or functionalities that are located on the user device 106. In some embodiments, the presenter module 672 can be embodied in the presentation system 408.

The presenter module 672 can control the providing of content to one or several user devices 106 and/or supervisor devices 110. Specifically, the presenter module 672 can control the generation of one or several messages to provide content to one or several desired user devices 106 and/or supervisor devices 110. The presenter module 672 can further control the providing of these one or several messages to the desired one or several desired user devices 106 and/or supervisor devices 110. Thus, in some embodiments, the presenter module 672 can control one or several features of the communications subsystem 532 to generate and send one or several electrical signals comprising content to one or several user devices 106 and/or supervisor devices 110.

In some embodiments, the presenter module 672 can control and/or manage a portion of the presentation functions of the presentation process 670, and can specifically manage an "outer loop" of presentation functions. As used herein, the outer loop refers to tasks relating to the tracking of a user's progress through all or a portion of a group of data packets. In some embodiments, this can include the identification of one or several completed data packets or nodes and/or the non-adaptive selection of one or several next data packets or nodes according to, for example, one or several fixed rules. Such non-adaptive selection does not rely on the use of predictive models, but rather on rules identifying next data packets based on data relating to the completion of one or several previously completed data packets or assessments and/or whether one or several previously completed data packets were successfully completed.

In some embodiments, and due to the management of the outer loop of presentation functions including the non-adaptive selection of one or several next data packets, nodes, or tasks by the presenter module, the presenter module can function as a recommendation engine referred to herein as a first recommendation engine or a rules-based recommendation engine. In some embodiments, the first recommendation engine can be configured to select a next node for a user based on one or all of: the user's current location in the content network; potential next nodes; the user's history including the user's previous responses; and one or several guard conditions associated with the potential next nodes. In some embodiments, a guard condition defines one or several prerequisites for entry into, or exit from, a node.

In some embodiments, the presenter module 672 can include a portion located on the server 102 and/or a portion located on the user device 106. In some embodiments, the portion of the presenter module 672 located on the server 102 can receive data packet information and provide a subset of the received data packet information to the portion of the presenter module 672 located on the user device 106. In some embodiments, this segregation of functions and/or capabilities can prevent solution data from being located on the user device 106 and from being potentially accessible by the user of the user device 106.

In some embodiments, the portion of the presenter module 672 located on the user device 106 can be further configured to receive the subset of the data packet information from the portion of the presenter module 672 located on the server 102 and provide that subset of the data packet information to the view module 674. In some embodiments, the portion of the presenter module 672 located on the user device 106 can be further configured to receive a content request from the view module 674 and to provide that content request to the portion of the presenter module 674 located on the server 102.

The view module 674 can be a hardware or software module of some or all of the user devices 106 and/or supervisor devices 110 of the content distribution network 100. The view module 674 can receive one or several electrical signals and/or communications from the presenter module 672 and can provide the content received in those one or several electrical signals and/or communications to the user of the user device 106 and/or supervisor device 110 via, for example, the I/O subsystem 526.

In some embodiments, the view module 674 can control and/or monitor an "inner loop" of presentation functions. As used herein, the inner loop refers to tasks relating to the tracking and/or management of a user's progress through a data packet. This can specifically relate to the tracking and/or management of a user's progression through one or several pieces of content, questions, assessments, and/or the like of a data packet. In some embodiments, this can further include the selection of one or several next pieces of content, next questions, next assessments, and/or the like of the data packet for presentation and/or providing to the user of the user device 106.

In some embodiments, one or both of the presenter module 672 and the view module 674 can comprise one or several presentation engines. In some embodiments, these one or several presentation engines can comprise different capabilities and/or functions. In some embodiments, one of the presentation engines can be configured to track the progress of a user through a single data packet, task, content item, or the like, and in some embodiments, one of the presentation engines can track the progress of a user through a series of data packets, tasks, content items, or the like.

The response process 676 can comprise one or several methods and/or steps to evaluate a response. In some embodiments, this can include, for example, determining whether the response comprises a desired response and/or an undesired response. In some embodiments, the response process 676 can include one or several methods and/or steps to determine the correctness and/or incorrectness of one or several received responses. In some embodiments, this can include, for example, determining the correctness and/or incorrectness of a multiple choice response, a true/false response, a short answer response, an essay response, or the like. In some embodiments, the response processor can employ, for example, natural language processing, semantic analysis, or the like in determining the correctness or incorrectness of the received responses.

In some embodiments, the response process 676 can be performed by a response processor 678. The response processor 678 can be a hardware or software module of the content distribution network 100, and specifically of the server 102. In some embodiments, the response processor 678 can be embodied in the response system 406. In some embodiments, the response processor 678 can be communicatingly connected to one or more of the modules of the presentation process 760 such as, for example, the presenter module 672 and/or the view module 674. In some embodiments, the response processor 678 can be communicatingly connected with, for example, the message channel 412 and/or other components and/or modules of the content distribution network 100.

The summary model process 680 can comprise one or several methods and/or steps to generate and/or update one or several models. In some embodiments, this can include, for example, implementing information received either directly or indirectly from the response processor 678 to update one or several models. In some embodiments, the summary model process 680 can include the update of a model relating to one or several user attributes such as, for example, a user skill model, a user knowledge model, a learning style model, or the like. In some embodiments, the summary model process 680 can include the update of a model relating to one or several content attributes including attributes relating to a single content item and/or data packet and/or attributes relating to a plurality of content items and/or data packets. In some embodiments, these models can relate to an attribute of the one or several data packets such as, for example, difficulty, discrimination, required time, or the like.

In some embodiments, the summary model process 680 can be performed by the model engine 682. In some embodiments, the model engine 682 can be a hardware or software module of the content distribution network 100, and specifically of the server 102. In some embodiments, the model engine 682 can be embodied in the summary model system 404.

In some embodiments, the model engine 682 can be communicatingly connected to one or more of the modules of the presentation process 760 such as, for example, the presenter module 672 and/or the view module 674, can be connected to the response processor 678 and/or the recommendation. In some embodiment, the model engine 682 can be communicatingly connected to the message channel 412 and/or other components and/or modules of the content distribution network 100.

The packet selection process 684 can comprise one or several steps and/or methods to identify and/or select a data packet for presentation to a user. In some embodiments, this data packet can comprise a plurality of data packets. In some embodiments, this data packet can be selected according to one or several models updated as part of the summary model process 680. In some embodiments, this data packet can be selected according to one or several rules, probabilities, models, or the like. In some embodiments, the one or several data packets can be selected by the combination of a plurality of models updated in the summary model process 680 by the model engine 682. In some embodiments, these one or several data packets can be selected by a recommendation engine 686. The recommendation engine 686 can be a hardware or software module of the content distribution network 100, and specifically of the server 102. In some embodiments, the recommendation engine 686 can be embodied in the packet selection system 402. In some embodiments, the recommendation engine 686 can be communicatingly connected to one or more of the modules of the presentation process 670, the response process 676, and/or the summary model process 680 either directly and/or indirectly via, for example, the message channel.

In some embodiments, and as depicted in FIG. 9, a presenter module 672 can receive a data packet for presentation to a user device 106. This data packet can be received, either directly or indirectly from a recommendation engine 686. In some embodiments, for example, the presenter module 672 can receive a data packet for providing to a user device 106 from the recommendation engine 686, and in some embodiments, the presenter module 672 can receive an identifier of a data packet for providing to a user device 106 via a view module 674. This can be received from the recommendation engine 686 via a message channel 412. Specifically, in some embodiments, the recommendation engine 686 can provide data to the message channel 412 indicating the identification and/or selection of a data packet for providing to a user via a user device 106. In some embodiments, this data indicating the identification and/or selection of the data packet can identify the data packet and/or can identify the intended recipient of the data packet.

The message channel 412 can output this received data in the form of a data stream 690 which can be received by, for example, the presenter module 672, the model engine 682, and/or the recommendation engine 686. In some embodiments, some or all of: the presenter module 672, the model engine 682, and/or the recommendation engine 686 can be configured to parse and/or filter the data stream 690 to identify data and/or events relevant to their operation. Thus, for example, the presenter module 672 can be configured to parse the data stream for information and/or events relevant to the operation of the presenter module 672.

In some embodiments, the presenter module 672 can extract the data packet from the data stream 690 and/or extract data identifying the data packet and/or indicating the selecting of a data packet from the data stream. In the event that data identifying the data packet is extracted from the data stream 690, the presenter module 672 can request and receive the data packet from the database server 104, and specifically from the content library database 303. In embodiments in which data indicating the selection of a data packet is extracted from the data stream 690, the presenter module 672 can request and receive identification of the data packet from the recommendation engine 686 and then request and receive the data packet from the database server 104, and specifically from the content library database 303, and in some embodiments in which data indicating the selection of a data packet is extracted from the data stream 690, the presenter module 672 can request and receive the data packet from the recommendation engine 686.

The presenter module can then provide the data packet and/or portions of the data packet to the view module 674. In some embodiments, for example, the presenter module 672 can retrieve one or several rules and/or conditions that can be, for example, associated with the data packet and/or stored in the database server 104. In some embodiments, these rules and/or conditions can identify portions of a data packet for providing to the view module 674 and/or portions of a data packet to not provide to the view module 674. In some embodiments, for example, sensitive portions of a data packet, such as, for example, solution information to any questions associated with a data packet, is not provided to the view module 674 to prevent the possibility of undesired access to those sensitive portions of the data packet. Thus, in some embodiments, the one or several rules and/or conditions can identify portions of the data packet for providing to the view module 674 and/or portions of the data packet for not providing to the view module.

In some embodiments, the presenter module 672 can, according to the one or more rules and/or conditions, generate and transmit an electronic message containing all or portions of the data packet to the view module 674. The view module 674 can receive these all or portions of the data packet and can provide all or portions of this information to the user of the user device 106 associated with the view module 674 via, for example, the I/O subsystem 526. In some embodiments, as part of the providing of all or portions of the data packet to the user of the view module 674, one or several user responses can be received by the view module 674. In some embodiments, these one or several user responses can be received via the I/O subsystem 526 of the user device 106.

After one or several user responses have been received, the view module 674 can provide the one or several user responses to the response processor 678. In some embodiments, these one or several responses can be directly provided to the response processor 678, and in some embodiments, these one or several responses can be provided indirectly to the response processor 678 via the message channel 412.

After the response processor 678 receives the one or several responses, the response processor 678 can determine whether the responses are desired responses and/or the degree to which the received responses are desired responses. In some embodiments, the response processor can make this determination via, for example, use of one or several techniques, including, for example, natural language processing (NLP), semantic analysis, or the like.

In some embodiments, the response processor can determine whether a response is a desired response and/or the degree to which a response is a desired response with comparative data which can be associated with the data packet. In some embodiments, this comparative data can comprise, for example, an indication of a desired response and/or an indication of one or several undesired responses, a response key, a response rubric comprising one criterion or several criteria for determining the degree to which a response is a desired response, or the like. In some embodiments, the comparative data can be received as a portion of and/or associated with a data packet. In some embodiments, the comparative data can be received by the response processor 678 from the presenter module 672 and/or from the message channel 412. In some embodiments, the response data received from the view module 674 can comprise data identifying the user and/or the data packet or portion of the data packet with which the response is associated. In some embodiments in which the response processor 678 merely receives data identifying the data packet and/or portion of the data packet associated with the one or several responses, the response processor 678 can request and/or receive comparative data from the database server 104, and specifically from the content library database 303 of the database server 104.

After the comparative data has been received, the response processor 678 determines whether the one or several responses comprise desired responses and/or the degree to which the one or several responses comprise desired responses. The response processor can then provide the data characterizing whether the one or several responses comprise desired response and/or the degree to which the one or several responses comprises desired responses to the message channel 412. The message channel can, as discussed above, include the output of the response processor 678 in the data stream 690 which can be constantly output by the message channel 412.

In some embodiments, the model engine 682 can subscribe to the data stream 690 of the message channel 412 and can thus receive the data stream 690 of the message channel 412 as indicated in FIG. 9. The model engine 682 can monitor the data stream 690 to identify data and/or events relevant to the operation of the model engine. In some embodiments, the model engine 682 can monitor the data stream 690 to identify data and/or events relevant to the determination of whether a response is a desired response and/or the degree to which a response is a desired response.

When a relevant event and/or relevant data are identified by the model engine, the model engine 682 can take the identified relevant event and/or relevant data and modify one or several models. In some embodiments, this can include updating and/or modifying one or several models relevant to the user who provided the responses, updating and/or modifying one or several models relevant to the data packet associated with the responses, and/or the like. In some embodiments, these models can be retrieved from the database server 104, and, in some embodiments, can be retrieved from the model data source 309 of the database server 104.

After the models have been updated, the updated models can be stored in the database server 104. In some embodiments, the model engine 682 can send data indicative of the event of the completion of the model update to the message channel 412. The message channel 412 can incorporate this information into the data stream 690 which can be received by the recommendation engine 686. The recommendation engine 686 can monitor the data stream 690 to identify data and/or events relevant to the operation of the recommendation engine 686. In some embodiments, the recommendation engine 686 can monitor the data stream 690 to identify data and/or events relevant to the updating of one or several models by the model engine 682.

When the recommendation engine 686 identifies information in the data stream 690 indicating the completion of the summary model process 680 for models relevant to the user providing the response and/or for models relevant to the data packet provided to the user, the recommendation engine 686 can identify and/or select a next data packet for providing to the user and/or to the presentation process 470. In some embodiments, this selection of the next data packet can be performed according to one or several rules and/or conditions. After the next data packet has been selected, the recommendation engine 686 can provide information to the model engine 682 identifying the next selected data packet and/or to the message channel 412 indicating the event of the selection of the next content item. After the message channel 412 receives information identifying the selection of the next content item and/or receives the next content item, the message channel 412 can include this information in the data stream 690 and the process discussed with respect to FIG. 9 can be repeated.

With reference now to FIG. 10, a schematic illustration of a second embodiment of communication or processing that can be in the platform layer 654 and/or applications layer 656 via the message channel 412 is shown. In the embodiment depicted in FIG. 10, the data packet provided to the presenter module 672 and then to the view module 674 does not include a prompt for a user response and/or does not result in the receipt of a user response. As no response is received, when the data packet is completed, nothing is provided to the response processor 678, but rather data indicating the completion of the data packet is provided from one of the view module 674 and/or the presenter module 672 to the message channel 412. The data is then included in the data stream 690 and is received by the model engine 682 which uses the data to update one or several models. After the model engine 682 has updated the one or several models, the model engine 682 provides data indicating the completion of the model updates to the message channel 412. The message channel 412 then includes the data indicating the completion of the model updates in the data stream 690 and the recommendation engine 686, which can subscribe to the data stream 690, can extract the data indicating the completion of the model updates from the data stream 690. The recommendation engine 686 can then identify a next one or several data packets for providing to the presenter module 672, and the recommendation engine 686 can then, either directly or indirectly, provide the next one or several data packets to the presenter module 672.

With reference now to FIG. 11, a schematic illustration of an embodiment of dual communication, or hybrid communication, in the platform layer 654 and/or applications layer 656 is shown. Specifically, in this embodiment, some communication is synchronous with the completion of one or several tasks and some communication is asynchronous. Thus, in the embodiment depicted in FIG. 11, the presenter module 972 communicates synchronously with the model engine 682 via a direct communication 692 and communicates asynchronously with the model engine 682 via the message channel 412.

Specifically, and with reference to FIG. 11, the presenter module 672 can receive and/or select a data packet for presentation to the user device 106 via the view module 674. In some embodiments, the presenter module 672 can identify all or portions of the data packet that can be provided to the view module 674 and portions of the data packet for retaining from the view module 674. In some embodiments, the presenter module can provide all or portions of the data packet to the view module 674. In some embodiments, and in response to the receipt of all or portions of the data packet, the view module 674 can provide a confirmation of receipt of the all or portions of the data packet and can provide those all or portions of the data packet to the user via the user device 106. In some embodiments, the view module 674 can provide those all or portions of the data packet to the user device 106 while controlling the inner loop of the presentation of the data packet to the user via the user device 106.

After those all or portions of the data packet have been provided to the user device 106, a response indicative of the completion of one or several tasks associated with the data packet can be received by the view module 674 from the user device 106, and specifically from the I/O subsystem 526 of the user device 106. In response to this receive, the view module 674 can provide an indication of this completion status to the presenter module 672 and/or can provide the response to the response processor 678.

After the response has been received by the response processor 678, the response processor 678 can determine whether the received response is a desired response. In some embodiments, this can include, for example, determining whether the response comprises a correct answer and/or the degree to which the response comprises a correct answer.

After the response processor has determined whether the received response is a desired response, the response processor 678 can provide an indicator of the result of the determination of whether the received response is a desired response to the presenter module 672. In response to the receipt of the indicator of whether the result of the determination of whether the received response is a desired response, the presenter module 672 can synchronously communicate with the model engine 682 via a direct communication 692 and can asynchronously communicate with model engine 682 via the message channel 412. In some embodiments, the synchronous communication can advantageously include two-way communication between the model engine 682 and the presenter module 672 such that the model engine 682 can provide an indication to the presenter module 672 when model updating is completed by the model engine.

After the model engine 682 has received one or both of the synchronous and asynchronous communications, the model engine 682 can update one or several models relating to, for example, the user, the data packet, or the like. After the model engine 682 has completed the updating of the one or several models, the model engine 682 can send a communication to the presenter module 672 indicating the completion of the updated one or several modules.

After the presenter module 672 receives the communication indicating the completion of the updating of the one or several models, the presenter module 672 can send a communication to the recommendation engine 686 requesting identification of a next data packet. As discussed above, the recommendation engine 686 can then retrieve the updated model and retrieve the user information. With the updated models and the user information, the recommendation engine can identify a next data packet for providing to the user, and can provide the data packet to the presenter module 672. In some embodiments, the recommendation engine 686 can further provide an indication of the next data packet to the model engine 682, which can use this information relating to the next data packet to update one or several models, either immediately, or after receiving a communication from the presenter module 672 subsequent to the determination of whether a received response for that data packet is a desired response.

Figure 12:
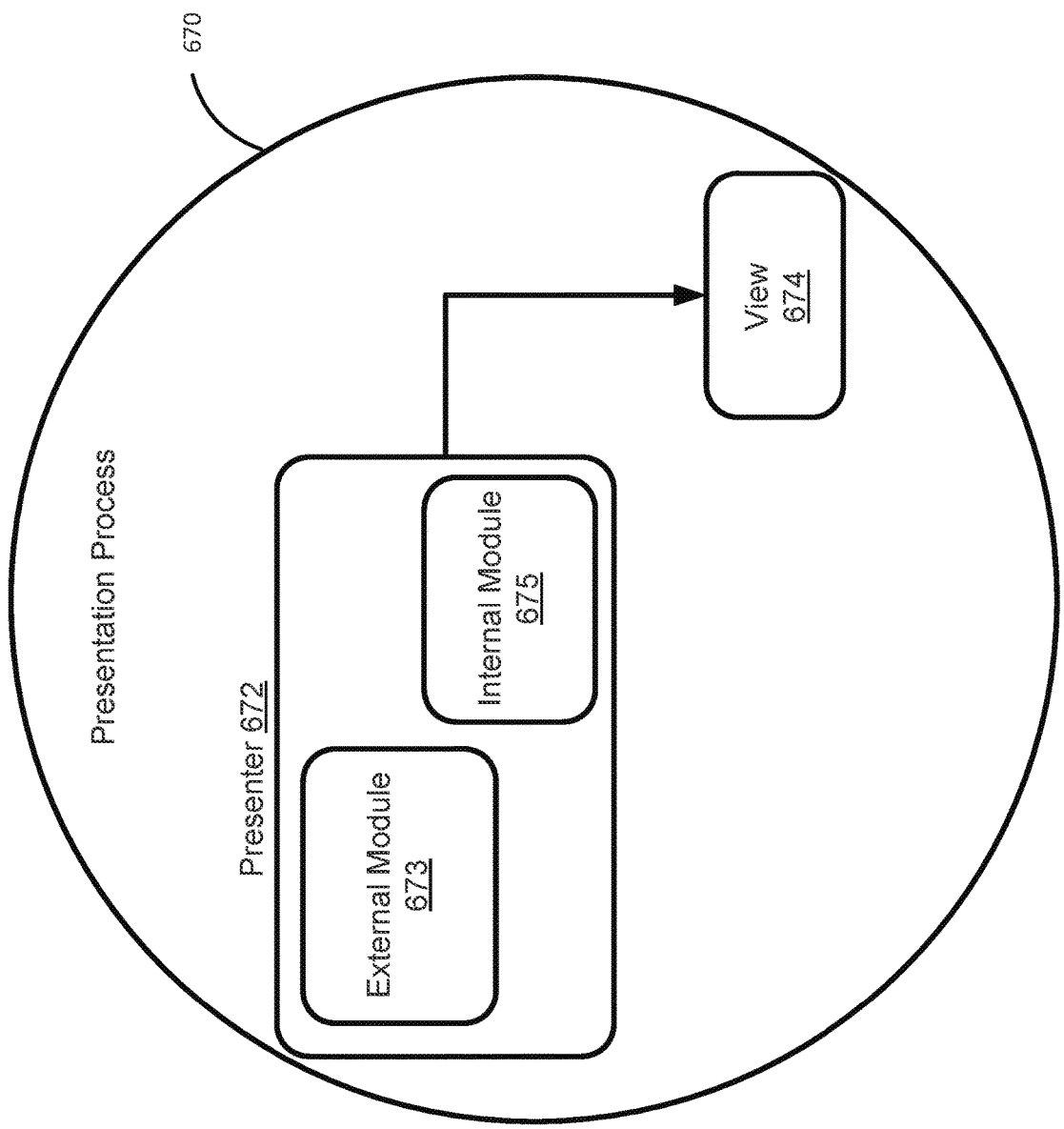
FIG. 12 is a schematic illustration of one embodiment of the presentation process.

With reference now to FIG. 12, a schematic illustration of one embodiment of the presentation process 670 is shown. Specifically, FIG. 12 depicts multiple portions of the presenter module 672, namely, the external portion 673 and the internal portion 675. In some embodiments, the external portion 673 of the presenter module 672 can be located in the server, and in some embodiments, the internal portion 675 of the presenter module 672 can be located in the user device 106. In some embodiments, the external portion 673 of the presenter module can be configured to communicate and/or exchange data with the internal portion 675 of the presenter module 672 as discussed herein. In some embodiments, for example, the external portion 673 of the presenter module 672 can receive a data packet and can parse the data packet into portions for providing to the internal portion 675 of the presenter module 672 and portions for not providing to the internal portion 675 of the presenter module 672. In some embodiments, the external portion 673 of the presenter module 672 can receive a request for additional data and/or an additional data packet from the internal portion 675 of the presenter module 672. In such an embodiment, the external portion 673 of the presenter module 672 can identify and retrieve the requested data and/or the additional data packet from, for example, the database server 104 and more specifically from the content library database 104.

Figure 13:
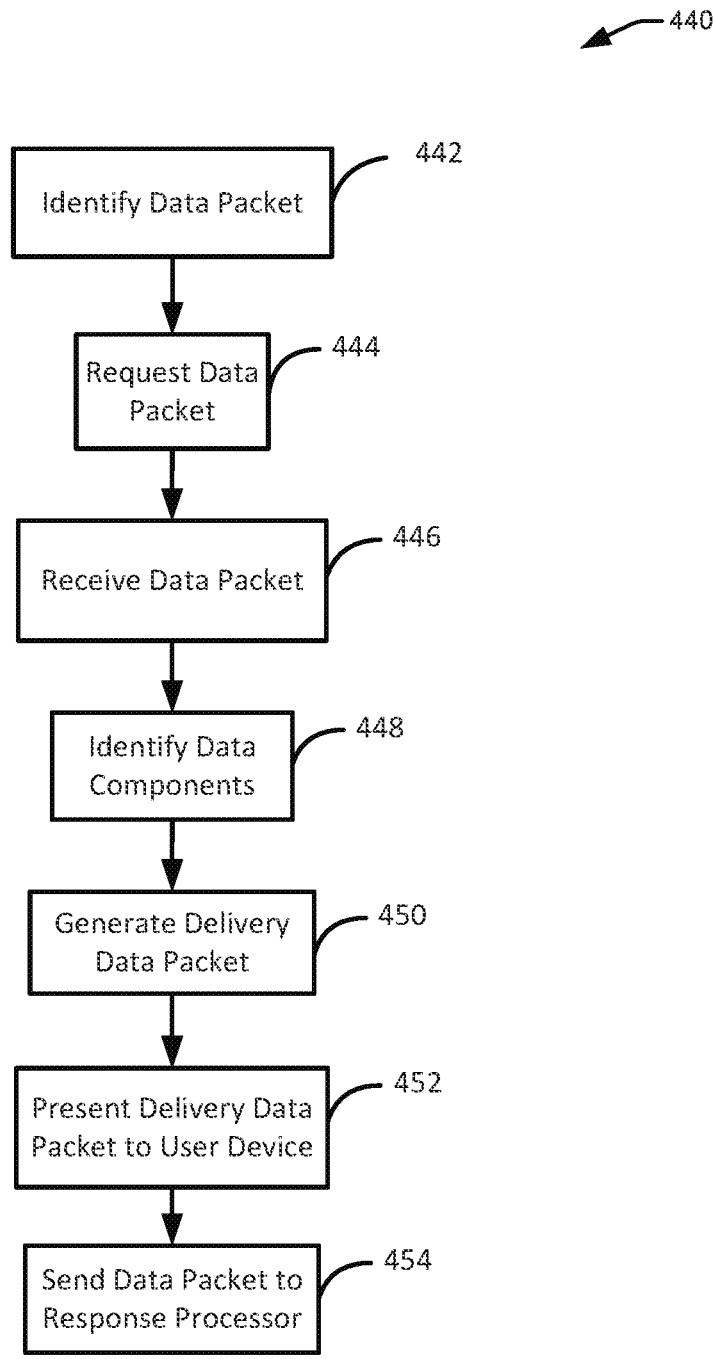
FIG. 13 is a flowchart illustrating one embodiment of a process for data management.

With reference now to FIG. 13, a flowchart illustrating one embodiment of a process 440 for data management is shown. In some embodiments, the process 440 can be performed by the content management server 102, and more specifically by the presentation system 408 and/or by the presentation module or presentation engine. In some embodiments, the process 440 can be performed as part of the presentation process 670.

The process 440 begins at block 442, wherein a data packet is identified. In some embodiments, the data packet can be a data packet for providing to a student-user. In some embodiments, the data packet can be identified based on a communication received either directly or indirectly from the recommendation engine 686.

After the data packet has been identified, the process 440 proceeds to block 444, wherein the data packet is requested. In some embodiments, this can include the requesting of information relating to the data packet such as the data forming the data packet. In some embodiments, this information can be requested from, for example, the content library database 303. After the data packet has been requested, the process 440 proceeds to block 446, wherein the data packet is received. In some embodiments, the data packet can be received by the presentation system 408 from, for example, the content library database 303.

After the data packet has been received, the process 440 proceeds to block 448, wherein one or several data components are identified. In some embodiments, for example, the data packet can include one or several data components which can, for example, contain different data. In some embodiments, one of these data components, referred to herein as a presentation component, can include content for providing to the student user, which content can include one or several requests and/or questions and/or the like. In some embodiments, one of these data components, referred to herein as a response component, can include data used in evaluating one or several responses received from the user device 106 in response to the data packet, and specifically in response to the presentation component and/or the one or several requests and/or questions of the presentation component. Thus, in some embodiments, the response component of the data packet can be used to ascertain whether the user has provided a desired response or an undesired response.

After the data components have been identified, the process 440 proceeds to block 450, wherein a delivery data packet is identified. In some embodiments, the delivery data packet can include the one or several data components of the data packets for delivery to a user such as the student-user via the user device 106. In some embodiments, the delivery packet can include the presentation component, and in some embodiments, the delivery packet can exclude the response packet. After the delivery data packet has been generated, the process 440 proceeds to block 452, wherein the delivery data packet is provided to the user device 106 and more specifically to the view module 674. In some embodiments, this can include providing the delivery data packet to the user device 106 via, for example, the communication network 120.

After the delivery data packet has been provided to the user device 106, the process 440 proceeds to block 454, wherein the data packet and/or one or several components thereof are sent to and/or provided to the response processor 678. In some embodiments, this sending of the data packet and/or one or several components thereof to the response processor can include receiving a response from the student-user, and sending the response to the student-user to the response processor simultaneous with the sending of the data packet and/or one or several components thereof to the response processor. In some embodiments, for example, this can include providing the response component to the response processor. In some embodiments, the response component can be provided to the response processor from the presentation system 408.

Figure 14:
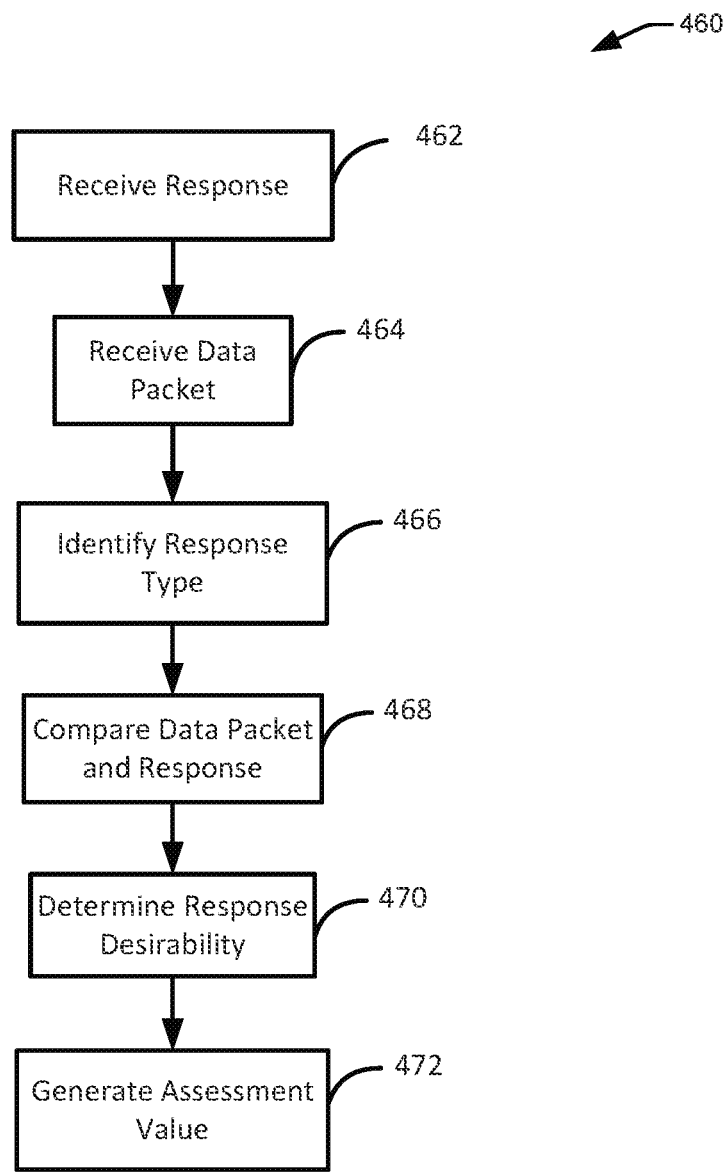
FIG. 14 is a flowchart illustrating one embodiment of a process for evaluating a response.

With reference now to FIG. 14, a flowchart illustrating one embodiment of a process 460 for evaluating a response is shown. In some embodiments, the process can be performed as a part of the response process 676 and can be performed by, for example, the response system 406 and/or by the response processor 678. In some embodiments, the process 460 can be performed by the response system 406 in response to the receipt of a response, either directly or indirectly, from the user device 106 or from the view module 674.

The process 460 begins at block 462, wherein a response is received from, for example, the user device 106 via, for example, the communication network 120. After the response has been received, the process 460 proceeds to block 464, wherein the data packet associated with the response is received. In some embodiments, this can include receiving all or one or several components of the data packet such as, for example, the response component of the data packet. In some embodiments, the data packet can be received by the response processor from the presentation engine.

After the data packet has been received, the process 460 proceeds to block 466, wherein the response type is identified. In some embodiments, this identification can be performed based on data, such as metadata associated with the response. In other embodiments, this identification can be performed based on data packet information such as the response component.

In some embodiments, the response type can identify one or several attributes of the one or several requests and/or questions of the data packet such as, for example, the request and/or question type. In some embodiments, this can include identifying some or all of the one or several requests and/or questions as true/false, multiple choice, short answer, essay, or the like.

After the response type has been identified, the process 460 proceeds to block 468, wherein the data packet and the response are compared to determine whether the response comprises a desired response and/or an undesired response. In some embodiments, this can include comparing the received response and the data packet to determine if the received response matches all or portions of the response component of the data packet, to determine the degree to which the received response matches all or portions of the response component, to determine the degree to which the receive response embodies one or several qualities identified in the response component of the data packet, or the like. In some embodiments, this can include classifying the response according to one or several rules. In some embodiments, these rules can be used to classify the response as either desired or undesired. In some embodiments, these rules can be used to identify one or several errors and/or misconceptions evidenced in the response. In some embodiments, this can include, for example: use of natural language processing software and/or algorithms; use of one or several digital thesauruses; use of lemmatization software, dictionaries, and/or algorithms; or the like.

After the data packet and the response have been compared, the process 460 proceeds to block 470 wherein response desirability is determined. In some embodiments this can include, based on the result of the comparison of the data packet and the response, whether the response is a desired response or is an undesired response. In some embodiments, this can further include quantifying the degree to which the response is a desired response. This determination can include, for example, determining if the response is a correct response, an incorrect response, a partially correct response, or the like. In some embodiments, the determination of response desirability can include the generation of a value characterizing the response desirability and the storing of this value in one of the databases 104 such as, for example, the user profile database 301. After the response desirability has been determined, the process 460 proceeds to block 472, wherein an assessment value is generated. In some embodiments, the assessment value can be an aggregate value characterizing response desirability for one or more a plurality of responses. This assessment value can be stored in one of the databases 104 such as the user profile database 301.

Figure 15:
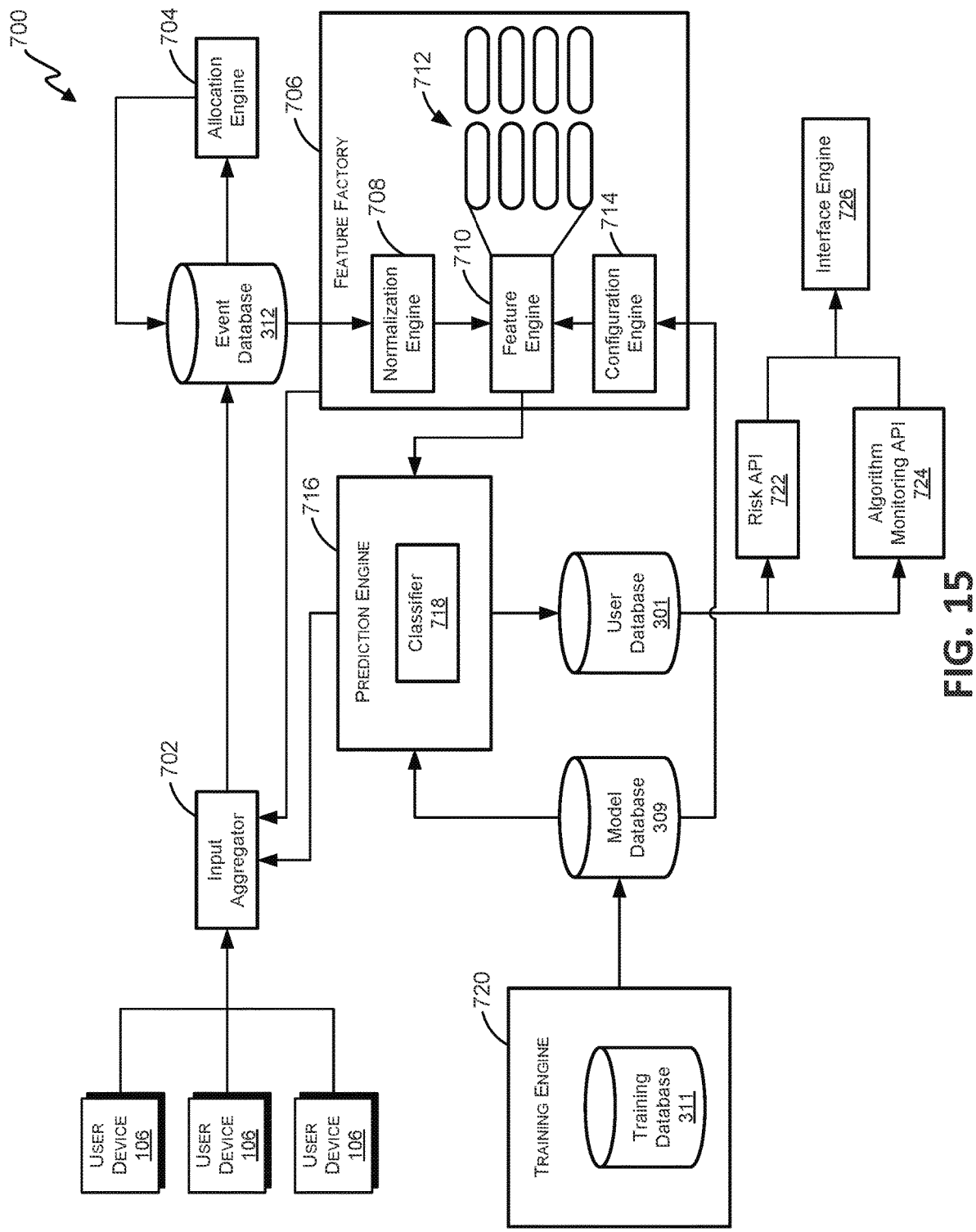
FIG. 15 is a schematic illustration of one embodiment of an early alert system.

With reference now to FIG. 15, a schematic illustration of one embodiment of an early alert system 700, also referred to herein as a pre-emptive alert triggering system 700 is shown. The system 700 can include one or several user devices 106 that can be connected to an input aggregator 702. The input aggregator 702 can comprise any hardware, software, or combination thereof that can receive input from multiple devices operating multiple software programs and generate one or several data streams containing those received inputs. In some embodiments, the input aggregator 702 can format and/or transform the received inputs. In some embodiments, the input aggregator 702 can be located on the server 102.

The input aggregator 702 is connected to the event database 312 such that the outputs of the input aggregator 702 can be stored in the event database 312 as one or several events. The event database 312 can be further connected to an allocation engine 704. The allocation engine can reorganize and/or re-allocate data stored in the event database 312. The re-allocation can be performed on any desired basis including, for example, a date of the activity resulting in the storing of data in the event database 312, user associated with the data in the event database 312, discipline associated with the data stored in the event database 312, or the like. The allocation engine 704 can receive data from the event database 312, re-allocate and/or reorganize that data, and store the re-allocated and/or reorganized data in the event database 312.

The event database 312 can be additionally connected to a feature factory 706. The feature factory 706 can comprise a hardware, software, or combined hardware/software module that is configured to generate one or several features from data identifying events, which data identifying events can be stored in the event database 312. The feature factory 706 can include a normalization engine that can process data entering the feature factory 706 to improve the efficiency and/or operation of the feature factory 706. This processing can include deduping, transforming, formatting, and/or flattening of data received by the feature factory 706. The feature factory 706 can be located in or on the server 102.

After the data has passed the normalization engine, the data can be received by a feature engine 710 within the feature factory 706. The feature engine 710 can generate one or several features 712 from the data received by the normalization engine. These features can be stored in the event database 312 and/or can be outputted to the input aggregator 702 where they can be entered into the event database 312 and used for generating any desired higher-level features. The feature engine 710 can generate features according to feature generating instructions that can be stored in the database server 104, and specifically within the event database 104. In some embodiments, the feature engine 710 can further generate features according to one or several attributes of a configuration profile that can be, for example, stored in the customization database 313 and that can be provided to the feature engine 710 by the configuration engine 714. In some embodiments, the configuration engine 714 can further receive data inputs from the model database 309 which can link the configuration profile to one or several models in the model database 309.

Features generated by the feature factory 706 can be provided to the prediction engine 716 which can include a machine-learning algorithm such as, for example, a classifier 718 that can generate a risk prediction based on inputs received from the feature factory 706 and one or several models received from the model database 309. The machine-learning algorithm can include at least one of: a linear classifier; a Random Forrest algorithm; an Artificial Neural Network; an AdaBoost algorithm; a Naïve Bayes algorithm; Boosting Tree, and a Support Vector Machine. The prediction engine 716 can comprise any hardware, software, or combination thereof that can generate a prediction, and specifically a risk prediction. The prediction engine 716 can be located in or on the server 102.

In some embodiments, the models in the model database can be based and/or trained by a training engine 720 according to data stored in the training database 311. The training engine 720 can comprise any hardware, software, or combination thereof that can train a predictive model. The training engine 720 can be located in or on the server 102.

The prediction generated by the prediction engine 716 can be outputted to the input aggregator 702 and stored in the event database 312 and/or can be outputted to the user database 301 and stored in connection with the user for whom the risk prediction was generated. The risk prediction can then be provided to the risk API 722 which can generate one or several graphical depictions based on the risk prediction generated by the prediction engine 716 and/or aggregate the risk prediction generated by the prediction engine 716 with risk predictions for other students in the same class and generate one or several graphical depictions of the risk for all or portions of the class. In some embodiments, the risk prediction can be provided to the algorithm monitoring API 724, can generate one or several graphical depictions based on second-level risk predictions, discussed below. One or both of the risk API 722 and the algorithm monitoring API 724 can then provide data to the interface engine 726. The interface engine 726 can comprise any hardware, software, or combination thereof that can generate a prediction, and specifically a risk prediction. The interface engine 726 can be located in or on the server 102. In some embodiments, for example, the interface engine 726 can be located within the presentation system 408 of the server 102 and can communication with the I/O subsystem 526 of one or several user devices 106 or supervisor devices 110 to provide content to one or several users or supervisors.

Figure 16:
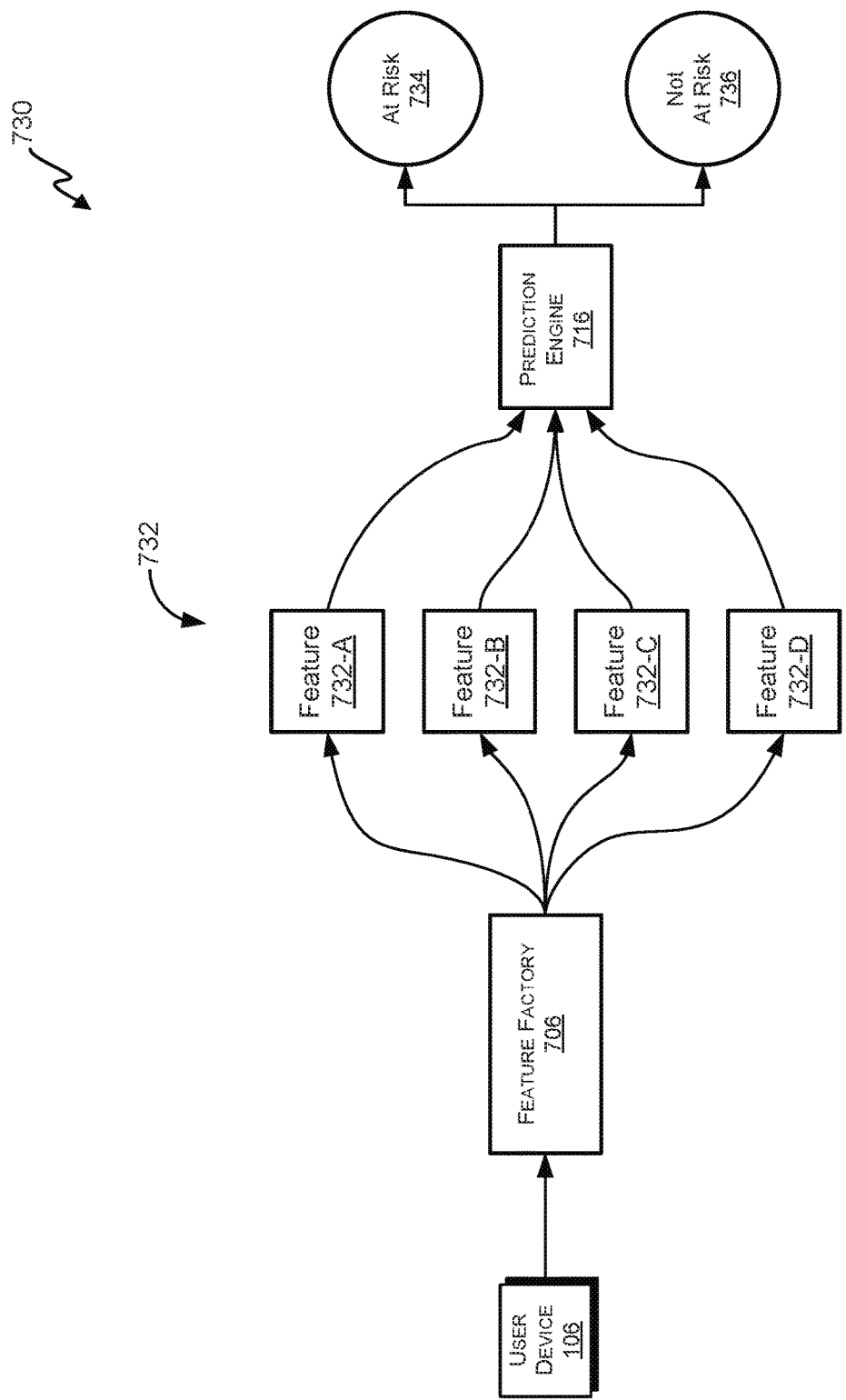
FIG. 16 is a schematic illustration of one embodiment of a process for making a risk determination.

With reference now to FIG. 16, a schematic illustration of one embodiment of a process 730 for making a risk determination is shown. This process 730 is depicted in the form by some of the components of the content distribution network 100. The process 730 begins when one or several electrical signals communications is funding user inputs are sent from the user device 106 to the feature factory 706. In some embodiments, this indication can be direct from the user device 106 to the feature factory 706, and in some embodiments, this communication can pass through the input aggregator 702, the event database 312, and/or the allocation engine 704.

At the feature factory, a plurality of features 732 are generated by, for example, the normalization engine 710. In some embodiments, these features 732 can be generated based on the identification of one or several traits or attributes of the communications of electrical signals received from the user device 106 and the converting of those one or several traits or attributes of the communications electrical signals into one or several numbers, values, character strings, or the like. As depicted in FIG. 16, these features include a first feature 732-A, a second feature 732-B, a third feature 732-C, and a fourth feature 732-D. These features can then be inputted into the prediction engine 716 which can use some or all the feature 732 to generate a risk prediction. In some embodiments, a subset of the feature 732 can be identified by either the feature factory 706 or the prediction engine 716 and the subset can be inputted into the classifier 718 of the prediction engine 716 to generate the risk prediction.

In some embodiments, after the risk prediction is generated, the user can be identified as belonging to one or several categories such as for example belonging to and at risk category 734 or as belonging to a not at risk category 736. In some embodiments, additional categories can exist further dividing users according to risk levels. In some embodiments, the risk prediction and the users grouping in a risk category can be stored in the database server 104, and specifically in the user database 301.

Figure 17:
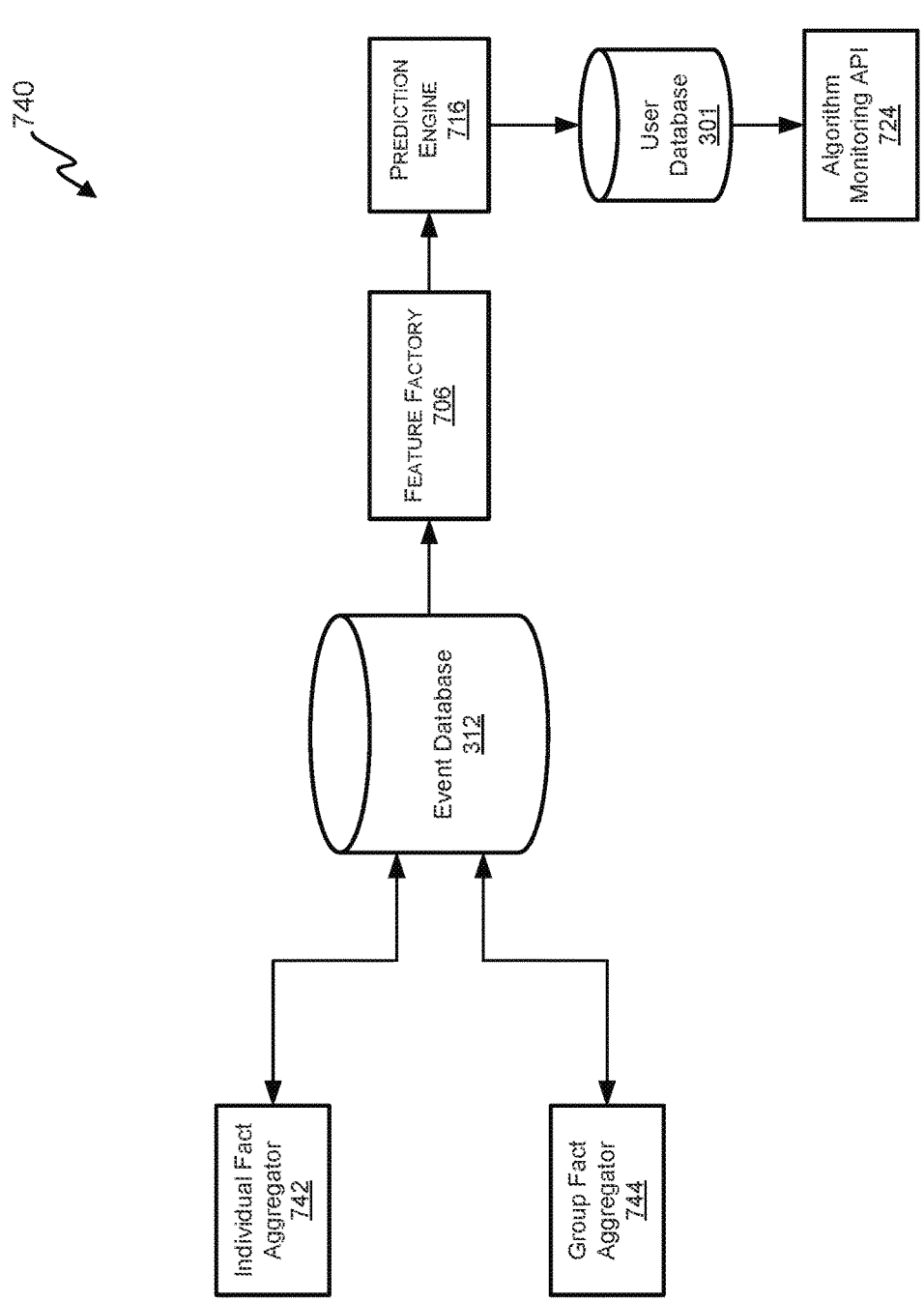
FIG. 17 is a schematic illustration of one embodiment of a process for second-level machine-learning alert triggering.

With reference now to FIG. 17, a schematic illustration of one embodiment of a process 740 for second-level machine-learning alert triggering is shown. In some embodiments, this process 740 can be performed to identify risk or to trigger alerts based on a risk prediction generated for second-level features and/or based on anomalies identified in second-level features. The process 740 can be performed by all or portions of the content distribution network.

In some embodiments, as features are added to the event database from the prediction engine 716 and/or the feature factory 706, these features, also referred to herein as facts, can be aggregated in one or both of an individual fact aggregator 742 and a group fact aggregator 744. In some embodiments, one or both of these fact aggregators 742, 744 can aggregate first-level features generated relevant to the specific individual or a specific group of users over a predetermined time period or until a predetermined number of first-level features have been aggregated. As used herein a first-level feature is generated from one or several received electrical signals or communications from the user device 106 and a second-level feature is generated from one or several first-level features.

After the predetermined time period has passed, or after the predetermined number of first-level features has been aggregated, the aggregated first-level features can be provided to the feature factory 706 which can generate second-level features from the received first-level features. In some embodiments, the feature factory 706 can generate second-level features according to instructions contained in the event database 312. After the second-level features have been generated, the second-level features can be provided to the prediction engine 716 which can, in some embodiments use some or all of the second-level features to generate risk prediction. Alternatively, in some embodiments, the prediction engine 716 can review the second-level features to identify one or several anomalies in the second-level features. In some embodiments, this anomaly detection can be performed by comparing the newly generated second-level features to previously generated second-level features. In some embodiments, this can include identifying a second-level feature set including second-level features generated from first level features generated from digital communications received from the first user device and some of the additional user devices. In some embodiments, the set is identified based on a shared attribute of the user of the first user device and users of the some of the additional user devices. Similar second-level feature sets can be identified, which the similar second-level feature sets can be identified based on a shared attribute of the second-level feature set and the similar second-level feature sets. An anomaly can then be identified by the comparison of the second-level feature set and one or several of the similar second-level feature sets. If an anomaly is identified, than a risk is indicated based on the identified anomaly. In contrast to a risk calculated from first-level features, this indicated risk calculated from second-level features according to the process 740 is non-specific to a single user.

The risk prediction can then be stored in the user database 301 in association with the group for which the risk calculation was generated. The algorithm monitoring API 724 can receive the risk prediction based on the second-level features and can generate one or several graphical depictions of the risk prediction and/or identified anomaly in the second-level features. The algorithm monitoring API 724 can communicate with the interface engine 726 to direct and/or control the user interface of the user device 106 and/or supervisor device 110 to provide the one or several graphical depictions to the user and/or supervisor.

Figure 18:
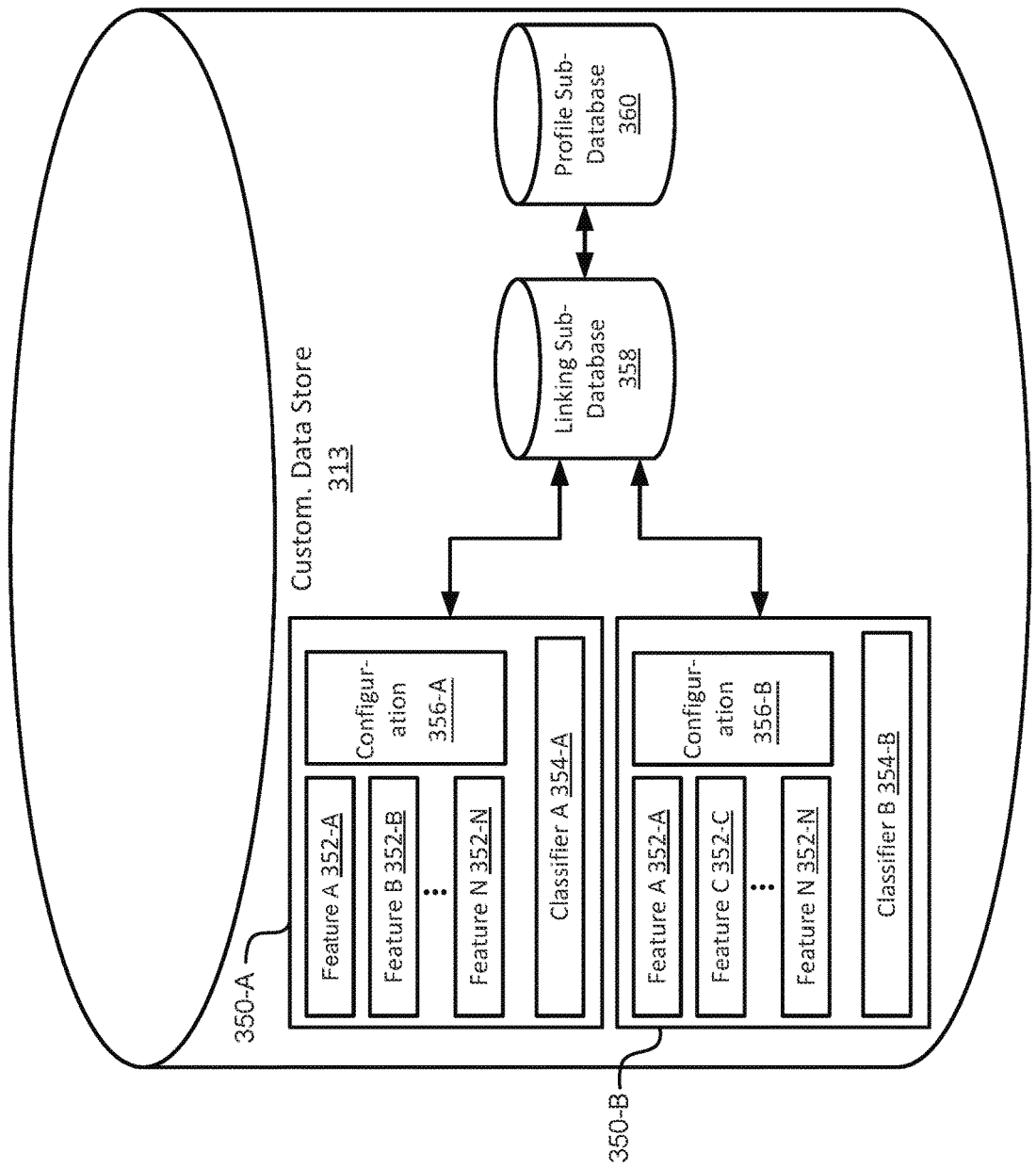
FIG. 18 is a schematic illustration of one embodiment of the customization database.

With reference now to FIG. 18, a schematic illustration of one embodiment of the customization database 313 is shown. In some embodiments, the customization database 313 can include a plurality of configuration profiles 350. These can include, for example, a first configuration profile 350-A and a second configuration profile 350-B. The configuration profiles 350 can include, for example, information specifying a plurality of features 352. In some embodiments, and as shown in FIG. 18, each of the configuration profiles can comprise a different set of features. In some embodiments, some or all of the profiles can further include a machine-learning algorithm which can be, for example, a model or classifier 354 that can be a unique or non-unique. In the embodiment of FIG. 18, the first configuration profile 350-A includes a first classifier 354-A and the second configuration profile 350-B includes a second classifier 354-B. In some embodiments, the machine learning algorithm of the configuration profile 350 can be customized and/or trained to create desired outputs based on the features 352 of that configuration profile. In some embodiments, each configuration profile 350 can further include configuration information 356. This configuration information can identify how to generate the features contained in the configuration profile 350. In some embodiments in which a configuration profile 350 has unique features 352, the configuration profile 350 can further include unique configuration data such that, as shown in FIG. 18, the first configuration profile 350-A has first configuration information 356-A and the second configuration profile 350-B has second configuration information 356-B.

The customization database 313 can further include a linking sub-database 358 and/or a profile sub-database 360. In some embodiments, the profile sub-database 360 can include information for identifying one or several categories of users and/or for identifying one or several users as belonging to one or several categories. These categories can be based on, for example, courses, instructors, disciplines, and/or schools, or can be custom categories. In some embodiments, some or all of these categories can be associated with a configuration profile 350, and in some embodiments, some or all of these categories can be uniquely associated with one of the configuration profiles 350 stored in the customization database 313. In some embodiments, the relations between the categories identified in the profile sub-database 360 and the configuration profiles 350 can be stored in the linking sub-database 358.

Figure 19:
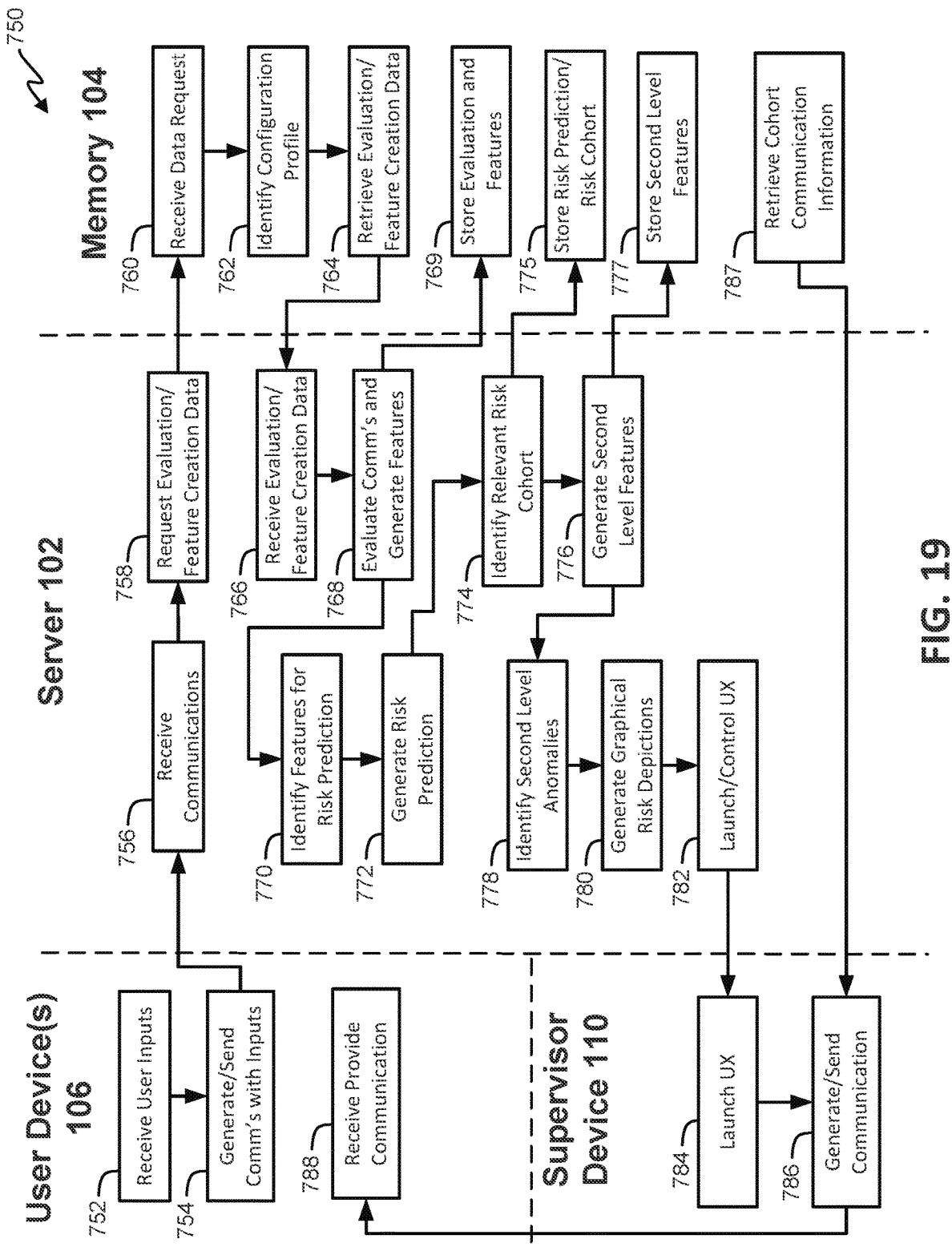
FIG. 19 is a swim-lane diagram of one embodiment of a process for early alerting.

With reference now to FIG. 19, a swim-lane diagram of one embodiment of a process 750 for early alerting is shown. The process 750 can include the aggregation of a plurality of electrical signals and/or communications from one or several user devices 106, the generation of one or several features from those one or several electrical signals and/or communications, and the generation of a risk prediction with a machine-learning algorithm based on those one or several features. The process 750 can be performed with one or more servers 102, memory 104, one or several user devices 106, and one or several supervisor devices 110.

The process 750 begins at block 752, wherein one or several user inputs are received by the one or several user devices 106, and specifically via the I/O subsystems 526 of each of the one or several user devices 106. In some embodiments, the I/O subsystems 526 can convert the user inputs into one or several electrical signals. At block 754, the one or several user devices 106 generate and send one or several communications, which can comprise one or several electrical signals to the server 102. In some embodiments, each of the one or several user devices 106 can send one or several communications to the server 102 via the communication network 120.

At block 756, the communications are received by the server 102. The server 102 can associate each of the received communications with the user device 106 and/or the user associated with the user device 106 from which the communication was received. The server 102 can then identify one of the user devices 106 from which a communication was received, and as indicated in block 758, the server 102 can request evaluation data and/or feature creation data. In some embodiments, the server can make similar requests for each of the user devices 106 from which a communication was received.

At block 760, the data request can be received by the memory 104 from the server 102. With the data request, which can identify the user for whom the data is requested, the memory 104 can identify an appropriate configuration profile that can be, for example, stored within one of the databases of the memory 104 such as, for example, the customization database 313. In some embodiments, the configuration profile can be selected according to information relating to the identified user such as can be contained in the user metadata. This information may be specific to the user for which the data request is received or may be specific to a group to which the user belongs.

And block 764 evaluation and/or feature creation data are retrieved by the memory 104. In some embodiments, for example, the evaluation data can include information useful in evaluating the substance of the communications received by the server 100 to block 756 in the feature creation data can be used by the server 102 to generate one or several features based on the communications received in block 756. In some embodiments, the evaluation data can be retrieved from the evaluation database 308 and the feature creation data can be retrieved from the event database 312. In some embodiments, the feature creation data retrieved from the event database 312 can be specified in the configuration profile and/or limited by the configuration profile.

The retrieved evaluation and/or feature creation data can be provided to the server and can be received by the server 100 to block 766. This data can be then used, as indicated in block 768, to evaluate the received communications and/or to generate one or several features from those received communications. In some embodiments, the evaluation can include determining whether the user inputs correspond to a correct response, an incorrect response, or the degree to which the response was correct. In some embodiments, this evaluation can be generated for one or several questions or problems and/or for one or several question parts or problem parts. The evaluation can come in some embodiments, be performed by the response system 406, and specifically by the response processor 678.

The one or several features that together form a set of features can be generated by the feature factory 706 and specifically by the feature engine 710. In some embodiments, at least some of these generated features, which can be generated based on the communications received in block 756 and thus on the user inputs received in block 752, can be meaningful features and/or can be non-meaningful features. In some embodiments, meaningful features are generated from substance identified and/or contained in the received communications, or more specifically based on the evaluation of the received communications. In contrast, in some embodiments, the non-meaningful features can be generated independent of the substance identified in the received communications and/or can be independent of the evaluation for the received communications.

At block 770 one or several features are selected for use in generation of a risk prediction. In some embodiments these one or several features can comprise the set of features generated in block 768 or a subset of the set of features generated in block 768. In some embodiments, for example, the configuration profile can identify specific features for use in generation of a risk prediction. In spite of this, the set of features generated in block 768 may be larger and include more features than those required for risk prediction according to the configuration profile. These additional features, while not used for generation of the risk prediction, may be useful in creating a comprehensive and rich set of features which can enable further analysis or the generation of additional predictions. In such embodiments in which the set of features created in block 768 includes features unnecessary for the risk prediction, the identification of a subset of features for inputting into the prediction engine 716 as indicated in block 770 can comprise the selection of features identified in the configuration profile from the set of features generated in block 768. The evaluation and/or features generated in block 768 can be stored in the memory 104 as indicated in block 769, and can be specifically stored in the user profile database 301 and/or the event database 312.

After features for use in generating the risk prediction have been identified, the process 750 proceeds to block 772 wherein a risk prediction is generated. This risk prediction can be generated by the server 102 and specifically by the prediction engine 716 encoding the classifier 718. This risk prediction can be generated by inputting the features identified in block 770 into the prediction engine 716 and specifically in the classifier 718 and the execution of code or algorithms associated with the prediction engine 716 and/or the classifier 718. In some embodiments, the feature selected in block 770 can be inputted into a machine-learning algorithm which can output a risk prediction.

At block 774 the user for whom the risk prediction was generated in block 772 is identified as belonging to one or several risk categories and/or one or several relevant risk categories identified as applying to the user for whom the risk prediction was generated. In some embodiments, this can include placing the user in a group identified as at risk, placing the user in a group identified as having an intermediate risk, or placing the user in a group identified as having a low risk. As indicated in block 775, the risk prediction and/or the identified relevant risk cohort can be stored in the memory 104 as indicated in block 775. Specifically, the risk prediction and/or the relevant risk cohort can be stored in the user profile database 301 of the memory 104.

At block 776, one or several second-level features can be generated by the server. The second level features can be derivative features or child features of the first-level features generated in block 768. The second-level features can be generated by the feature factory 706 and specifically by the feature engine 710 according to instructions and/or guidelines retrieved from the memory 104 and specifically from the event database 312. The generated second-level features can be stored in the memory 104 as indicated in block 777, and can be specifically stored in the user profile database 301 and/or the event database 312.

After the second-level features have been generated, the second-level features can be evaluated to determine the presence of one or several anomalies in the second-level features and/or to generate a risk prediction based on the second-level features as indicated in block 778. As discussed above with respect to FIG. 17, these anomalies can be identified via a comparative process and/or the risk prediction can be generated via the input of one or several second-level features into the prediction engine 716. Any identified anomaly or generated risk prediction for the second-level features can be stored in the memory 104.

At block 780 one or several graphical risk depictions are generated based on the one or several anomalies identified in block 778 and/or based on the risk prediction generated in block 778. These graphical risk depictions can be generated by the server and specifically by the algorithm monitoring API 724. As indicated in block 782 the server can direct the launch and/or control the user interface that can be, for example, located on one of the user devices 106 and/or on the supervisor device 110. As indicated in block 784, the user interface can launch and the user, in this case the supervisor, can interact with user-interface to switch between views and/or two received desired information. In some embodiments, the user can interact with the user interface so as to generate and send a communication as indicated in block 786. This can be done based on information, and specifically cohort communication information that can be retrieved from the memory 104 as indicated in block 787. The communication can then be sent to one or several user devices 106 from the supervisor device 110 via the communication network 120 and can be received at the one or several recipient user devices 106 as indicated in block 788.

Figure 20:
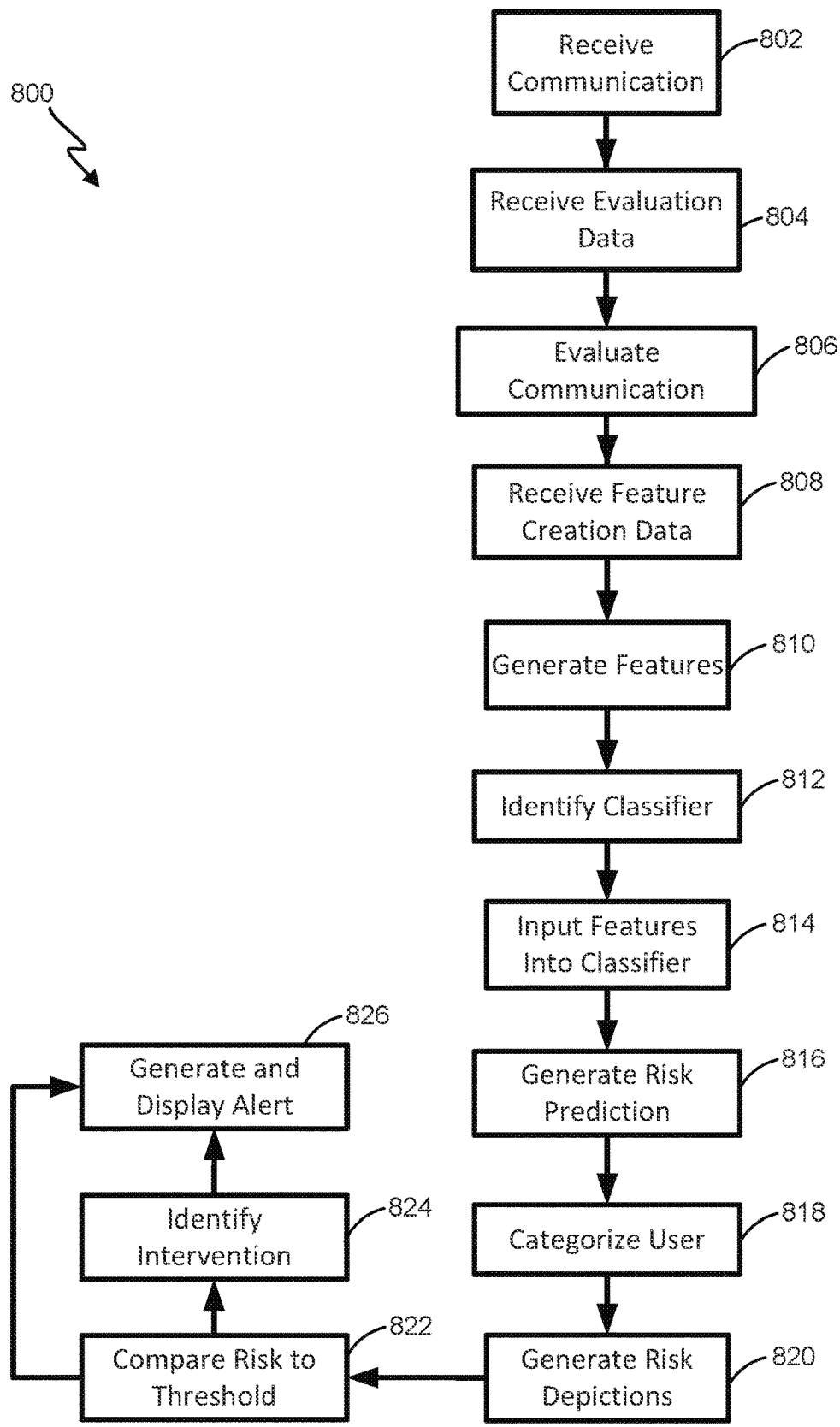
FIG. 20 is a flowchart illustrating one embodiment of a process for automatic alert triggering.

With reference now to FIG. 20, a flowchart illustrating one embodiment of a process 800 for automatic alert triggering is shown. The process 800 can be performed by all or portions of the content distribution network 100 and specifically by one or more servers 102. The process 800 begins at block 802 wherein a communication is received by the server 102 from the user device 106 the communication network 120. This communication can comprise one or several electrical signals that can identify user interactions with all or portions of the content distribution network and/or content distributed by the content distribution network 100 to the user. This communication can comprise a payload that can be, for example, a response to one or several questions or one or several question parts. In some embodiments, this payload can further identify the content and/or question giving rise to the response.

After the communication is received, the process 800 proceeds to block 804 wherein evaluation data is received. In some embodiments, the server 102 can query the database server 104 for evaluation information to evaluate the response received as a part of the communication in block 802. The memory 104 can identify this evaluation information within one of the databases, and specifically within the evaluation database 308 and can provide this evaluation information to the server 102. After the evaluation data is received, the process 800 can proceed to block 806 wherein the communication, and specifically the response contained in the communication can be evaluated. This evaluation can be performed by the response system 406 and specifically by the response processor 678 of the server 102 and can include determining whether and/or the degree to which the user correctly responded to one or several questions or question parts.

After the communication has been evaluated, the process 800 proceeds to block 808 wherein feature creation data is received and/or retrieved. In some embodiments, the feature creation data can be received and/or retrieved from the database server 104 and specifically from the event database 312 in the database server 104. In some embodiments, the server 102 can request feature creation data from the database server 104, which request can include user metadata identifying one or several attributes of the user and/or metadata associated with the provided question are content to which the response to the communication was received. The database server 104 can identify the relevant feature creation data and can provide the relevant feature creation data to the server 102. At block 810, the server 102, and specifically the feature engine 710 of the feature factory 706 can generate features according to the received feature creation data. In some embodiments, this can include the generation of one or several meaningful features based on the evaluation of the received communication, and/or in some embodiments, this can include the generation of one or several non-meaningful features. In some embodiments this can include the normalization performed by the normalization engine 708 before the generation of features by feature engine 710.

After the features have been generated, the process 800 proceeds to block 812 wherein a machine-learning algorithm is identified. In some embodiments, this can be the machine-learning algorithm which can be, for example, a model or classifier for use in generating the desired risk prediction. The machine-learning algorithm can include at least one of: a linear classifier; a Random Forrest algorithm; an Artificial Neural Network; an AdaBoost algorithm; a Naïve Bayes algorithm; Boosting Tree, and a Support Vector Machine. In some embodiments, for example, the configuration profile may identify a specific learning algorithm, model, and/or classifier in addition to specifying which features are to be used for generating the risk prediction. If such a learning algorithm, model, and/or classifier is identified, the server 102 can request this learning algorithm, model, and/or classifier from the database server 104 and specifically from the model database 309. The database server 104 can retrieve the requested learning algorithm, model, and/or classifier and can provide data associated therewith and/or the learning algorithm, model, and/or classifier to the server 102.

At block 814 some or all of the generated features are inputted into the learning algorithm, model, and/or classifier. At block 816, a risk prediction is generated by the prediction engine 716 and specifically by the classifier 718. In some embodiments, the prediction engine 716 can output a risk prediction or can output an indication that insufficient features have been provided to generate a risk prediction. After the risk prediction is generated, the process 800 proceeds to block 818 wherein the user's category is in one of several risk categories according to the risk level. In some embodiments, the categorization can be performed by the server 102 and specifically by the prediction engine 716. In some embodiments, this categorization can be performed by comparing the risk prediction to threshold values delineating between the several risk categories. Based on the result of the comparison between the risk prediction of the threshold values, the user can be identified as belonging to one of the risk categories and user metadata stored in the user profile database 301 can be updated to reflect this categorization. In embodiments in which there are insufficient features to generate a risk prediction, the user can be identified as belonging to a category indicative of having no risk prediction and/or of lacking sufficient features to generate a risk prediction.

At block 820 one or several graphical depictions of risk are generated. In some embodiments, these graphical depictions of risk can take the risk level of the user from which the communication was received in block 802, the sources of risk, change in risk over time, or the like. These graphical depictions of risk can be generated by the risk API 722 which can be a part of, or operating on the server 102. After the graphical risk depictions have been generated, the process 800 proceeds to block 822 wherein the risk prediction is compared to an alert risk threshold. In some embodiments, the alert risk threshold can delineate between instances in which the risk prediction is sufficiently high so as to warrant an intervention or remediation from instances in which the risk prediction is not sufficiently high so as to warrant intervention or remediation. The risk alert threshold can be retrieved from the database server 104, and specifically from the threshold database 310.

If it is determined that an intervention is identified based on the comparison of the risk prediction and the alert risk threshold, then the process 800 proceeds to block 824 wherein an intervention is identified. In some embodiments, intervention can be identified based on user metadata and metadata associated with the question and/or content giving rise to the communication received from the user in block 802. This intervention can be retrieved from the database server, and specifically from the content library database 303 of the database server 104.

After the intervention has been identified, or after determining that the risk prediction does not warrant an intervention, the process 800 proceeds to block 826 wherein an alert is generated and displayed and/or delivered. In some embodiments, the alert can comprise an indication of a risk level such as, for example, some of the one or several graphical depictions of risk generated in block 820. In some embodiments, the alert can comprise a user interface containing these graphical depictions of risk for the user or for a group to which the user belongs. In some embodiments, the alert can comprise an electronic communication sent from the server 102 to the user device 106 and/or supervisor device 110. This electronic communication can include code to direct the launch of the user interface and a display of the graphical risk depictions generated in block 820. In some embodiments, the alert can further be configured to deliver an indication of the intervention identified in block 824.

Figure 21:
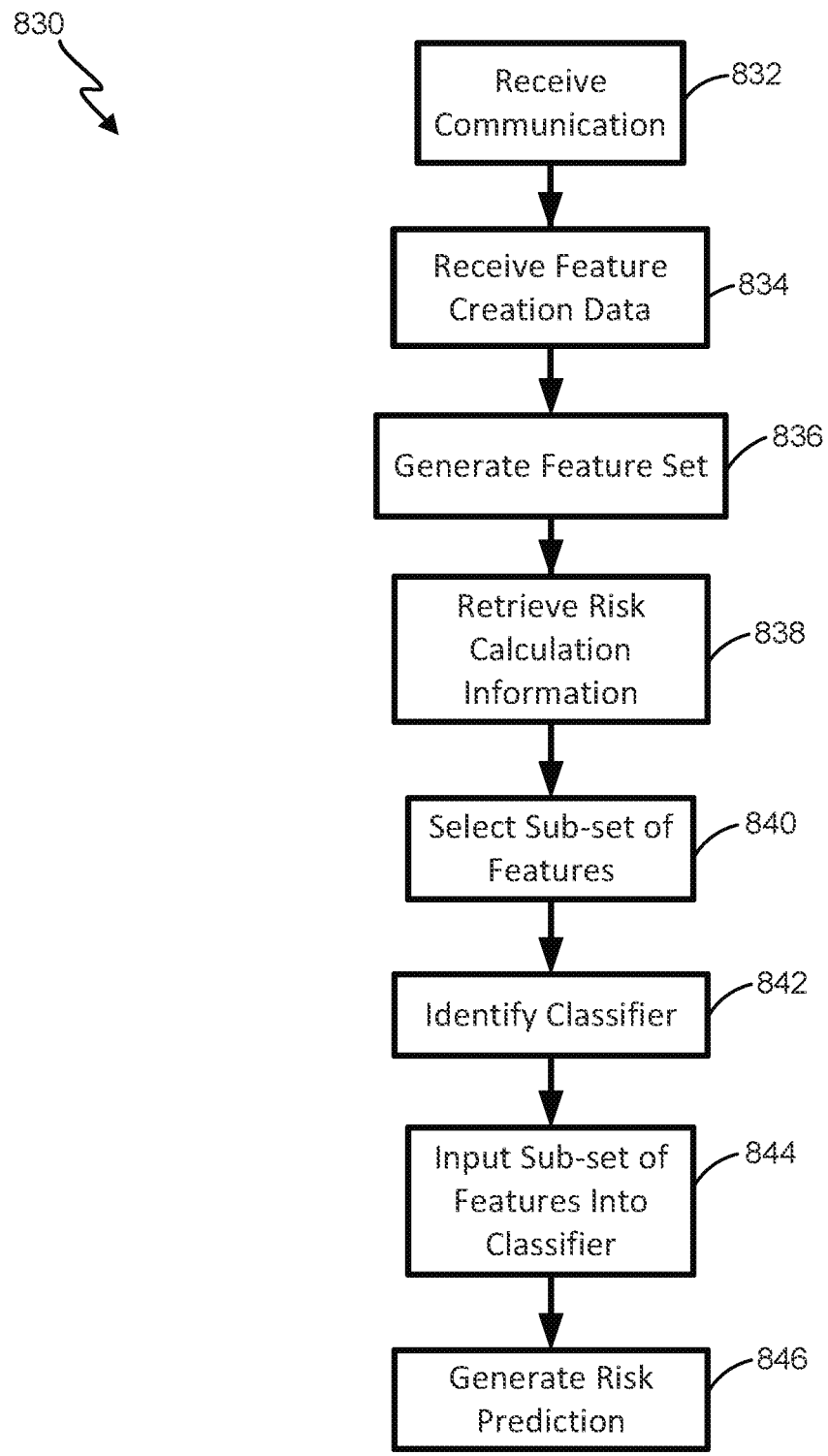
FIG. 21 is a flowchart illustrating one embodiment of a process for triggering a pre-emptive alert.

With reference now to FIG. 21, a flowchart illustrating one embodiment of a process 830 for triggering a pre-emptive alert is shown. The process 830 can be performed by all or portions of the content distribution network. The process 830 begins at block 832 wherein a communication is received by the server 102 from the user device 106 or the communication network 120. This communication can comprise one or several electrical signals that can identify user interactions with all or portions of the content distribution network and/or content distributed by the content distribution network 100 to the user. This communication can comprise a payload that can be, for example, a response to one or several questions or one or several question parts. In some embodiments, this payload can further identify the content and/or question giving rise to the response.

After the communication is received, the process 830 proceeds to block 834 wherein feature creation data is received and/or retrieved. In some embodiments, the feature creation data can be received and/or retrieved from the database server 104 and specifically from the event database 312 in the database server 104. In some embodiments, the server 102 can request feature creation data from the database server 104, which request can include user metadata identifying one or several attributes of the user and/or metadata associated with the provided question are content to which the response to the communication was received. The database server 104 can identify the relevant feature creation data and can provide the relevant feature creation data to the server 102. At block 836, the server 102, and specifically the feature engine 710 of the feature factory 706 can generate features according to the received feature creation data. In some embodiments, some or all of the generated features can be meaningful, and/or in some embodiments some or all of the features can be non-meaningful. In some embodiments this can include the normalization performed by the normalization engine 708 before the generation of features by feature engine 710.

In block 838 risk calculation information is retrieved. In some embodiments, the risk calculation information can comprise portions of the configuration profile identifying a subset of features for use in generating the risk prediction. The configuration profile and thus the risk calculation information can be identified based on one or several traits or attributes of the user as identified in the user metadata. After the risk calculation information has been retrieved, the process 830 proceeds block 840 wherein a sub-set of features is selected. In some embodiments, for example, the feature set generated in block 836 includes more features than identified in the risk calculation information for use in calculating the user's risk prediction. In such an embodiment, the sub-set of features is selected from the feature set generated in block 836, which sub-set of features coincides with the features identified in the configuration profile.

After the sub-set of features is selected, the process 830 proceeds to block 842 wherein a machine-learning algorithm is identified. In some embodiments, this can be the machine-learning algorithm which can be, for example, a model or classifier, such as a linear classifier or a probabilistic classifier, for use in generating the desired risk prediction. In some embodiments, the machine-learning algorithm, model, or classifier can comprise one of: Random Forrest algorithm; an Artificial Neural Network; an AdaBoost algorithm; a Naïve Bayes algorithm; Boosting Tree, and a Support Vector Machine. In some embodiments, for example, the configuration profile may identify a specific learning algorithm, model, and/or classifier in addition to specifying which features to be used for generating the risk prediction. If such a learning algorithm, model, and/or classifier is identified, the server 102 can request this learning algorithm, model, and/or classifier from the database server 104 and specifically from the model database 309. The database server 104 can retrieve the requested learning algorithm, model, and/or classifier and can provide data associated therewith and/or the learning algorithm, model, and/or classifier to the server 102.

After the machine-learning algorithm has been identified, the process 830 proceeds to block 844 wherein the sub-set of features is input into the machine-learning algorithm. In some embodiments, this can include the formatting or modification of the features so as to correspond with requirements of the machine-learning algorithm. After the sub-set of features has been inputted into the machine-learning algorithm, the process 830 proceeds to block 846 wherein the risk prediction is generated by the machine-learning algorithm selected in block 842. In some embodiments, after the generation of the risk prediction, the process 830 can proceed to blocks 822 through 826 of FIG. 20.

Figure 22:
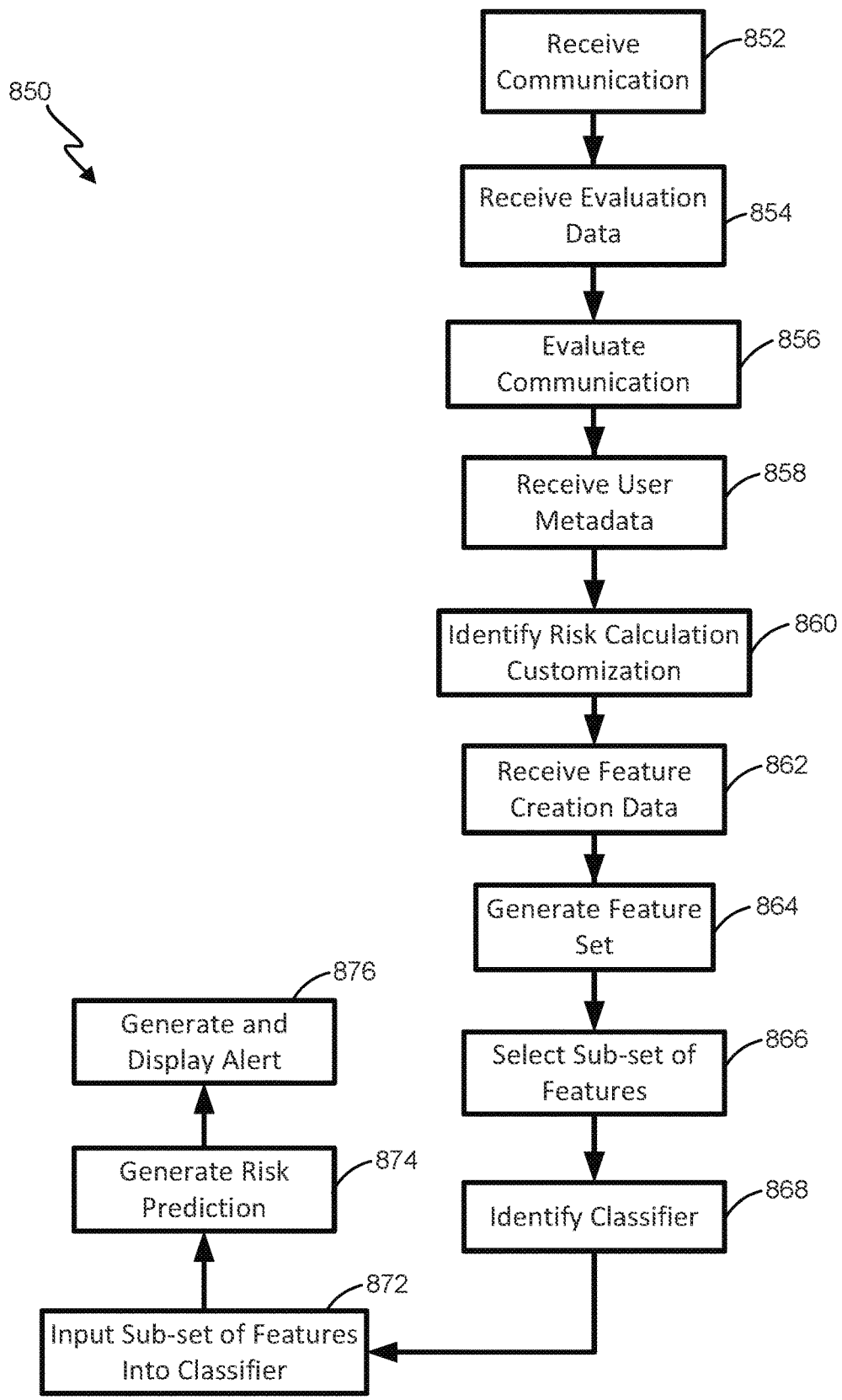
FIG. 22 is a flowchart illustrating one embodiment of a process for on-the-fly alert triggering customization.

With reference now to FIG. 22, a flowchart illustrating one embodiment of a process 850 for on-the-fly alert triggering customization is shown. The process 850 can be performed by all or portions of the content distribution network 100. The process 850 begins at block 852 wherein a communication is received by the server 102 from the user device 106 on the communication network 120. This communication can comprise one or several electrical signals that can identify user interactions with all or portions of the content distribution network and/or content distributed by the content distribution network 100 to the user. This communication can comprise a payload that can be, for example, a response to one or several questions or one or several question parts. In some embodiments, this payload can further identify the content and/or question giving rise to the response. In some embodiments, communications can be received from multiple devices, and specifically from a first user device and a second user device.

After the communication is received, the process 850 proceeds to block 854 wherein evaluation data is received. In some embodiments, the server 102 can query the database server 104 for evaluation information to evaluate the response received as a part of the communication in block 802. The memory 104 can identify this evaluation information within one of the databases, and specifically within the evaluation database 308 and can provide this evaluation information to the server 102. After the evaluation data is received, the process 850 can proceed to block 856 wherein the communication, and specifically the response contained in the communication can be evaluated. In embodiments in which communications are received from multiple devices, communications from each of the multiple devices can be evaluated, thus the communication from the first user device 106 can be evaluated and the communication from the second user device 106 can be evaluated. This evaluation can be performed by the response system 406 and specifically by the response processor 678 of the server 102 and can include determining whether and/or the degree to which the user correctly responded to one or several questions or question parts.

After the evaluation of the communication, the process 850 proceeds to block 858 wherein user metadata is received. In some embodiments, the user metadata can be received by the server 102 from the database server 104, and specifically from the user profile database 301 of the database server 104. In some embodiments, all or portions of the user metadata are unique to the user of the user device 106 and in some embodiments, all or portions of the user metadata are non-unique to the user of the user device 106. In embodiments in which the metadata are unique, the metadata can be generated based on the individual user's interactions with the content of the content distribution network 100, and in embodiments in which the metadata are non-unique, the metadata can be generated based on the individual user's belonging to a group or cohort such as, for example, a class, a school, a program, or the like. In some embodiments, non-unique user metadata can be shared by a group or cohort of users sharing at least one common attribute. In embodiments in which communications are received from multiple user devices, user metadata can be received for the user of each of the user devices 106 from which a communication is received.

After the user metadata is received, the process 850 proceeds to block 860 wherein a risk calculation customization is identified. In some embodiments, the risk calculation customization can correspond to features used for a risk prediction and/or the machine-learning algorithm used for the risk prediction. The risk calculation customization can be identified in the configuration profile which can identify a sub-set of features for use in generating the risk prediction and/or the machine-learning algorithm, model, and/or classifier for use in generating this risk prediction. In embodiments in which communications are received from multiple user devices, a configuration profile for each of the user devices 106 can identified. The configuration profile and thus the risk customization can be identified based on one or several traits or attributes of the user as identified in the user metadata.

After the risk calculation customization is generated, the process 850 proceeds to block 862, wherein feature creation data is received and/or retrieved. In some embodiments, the feature creation data can be received and/or retrieved from the database server 104 and specifically from the event database 312 in the database server 104. In some embodiments, the server 102 can request feature creation data from the database server 104, which request can include user metadata identifying one or several attributes of the user and/or metadata associated with the provided question are content to which the response to the communication was received. The database server 104 can identify the relevant feature creation data and can provide the relevant feature creation data to the server 102. At block 864, the server 102, and specifically the feature engine 710 of the feature factory 706 can generate features, and specifically a set of features according to the received feature creation data. In some embodiments this can include the normalization performed by the normalization engine 708 before the generation of features by feature engine 710. In some embodiments, the set of features generated in step 862 coincides with the features identified in the risk calculation customization, and in some embodiments, features in addition to those identified in the risk calculation customization are generated. In embodiments in which communications are received from multiple user devices 106, a set of features can be generated for communications from each of the multiple user devices 106.

After the feature set is generated, the process 850 proceeds to block 866 wherein a sub-set of features is identified and selected. In some embodiments, the sub-set of features is selected from the feature set generated in block 864, which sub-set of features coincides with the features identified in the configuration profile. In embodiments in which communications are received from multiple user devices 106, a sub-set of features can be identified from the set of features created for each of the user devices 106.

After the sub-set of features is selected, the process 850 proceeds to block 868 wherein a machine-learning algorithm is identified. In some embodiments, this can be the machine-learning algorithm which can be, for example, a model or classifier for use in generating the desired risk prediction. In some embodiments, for example, the configuration profile may identify a specific one of several learning algorithms, models, and/or classifiers in addition to specifying which features are to be used for generating the risk prediction. In some embodiments, the configuration profile can be based on portions of the user metadata that are unique to the user and/or on portions of the user metadata that are non-unique to the user. If such a learning algorithm, model, and/or classifier is identified, the server 102 can request this learning algorithm, model, and/or classifier from the database server 104 and specifically from the model database 309. In embodiments in which communications are received from multiple user devices 106, a learning algorithm can be identified for the risk prediction for each of the user devices 106, which learning algorithm can be identified based on the configuration profile of each of the user devices 106. The database server 104 can retrieve the requested learning algorithm, model, and/or classifier and can provide data associated therewith and/or the learning algorithm, model, and/or classifier to the server 102.

After the learning algorithm has been identified, the process 850 proceeds to block 872, wherein the sub-set of features is input into the machine-learning algorithm. In some embodiments, this can include the formatting or modification of the features so as to correspond with requirements of the machine-learning algorithm. In embodiments in which communications are received from multiple user devices 106, a sub-set of features selected for each of the user devices 106 from which a communication was received can be inputted into the machine-learning algorithm identified for the user associated with that user device 106 in block 868. In some embodiments, inputting the sub-set of features into the classifier can comprise: generating a feature vector for each of the features in the sub-set of features; and inputting the feature vectors into the classifier. After the sub-set of features has been inputted into the machine-learning algorithm, the process 850 proceeds to block 874 wherein the risk prediction is generated by the machine-learning algorithm selected in block 868. In embodiments in which communications are received from multiple user devices 106, this can include the generation of multiple risk predictions.

After the risk prediction is generated, the process 850 proceeds to block 876, wherein an alert is generated and displayed and/or delivered. In some embodiments, the alert can comprise an indication of a risk level such as, for example, some of the one or several graphical depictions of risk. In some embodiments, the alert can comprise a user interface containing these graphical depictions of risk for the user or for a group to which the user belongs. In embodiments in which communications are received from multiple user devices 106, this can include the generating and sending of an alert to some or all of the user devices 106 from which a communication was received in block 852. In some embodiments, the alert can comprise an electronic communication sent from the server 102 to the user device 106 and/or supervisor device 110. This electronic communication can include code to direct the launch of the user interface and a display of the graphical risk depictions. In some embodiments, the alert can further be configured to deliver an indication of the intervention identified in block 824.

Figure 23:
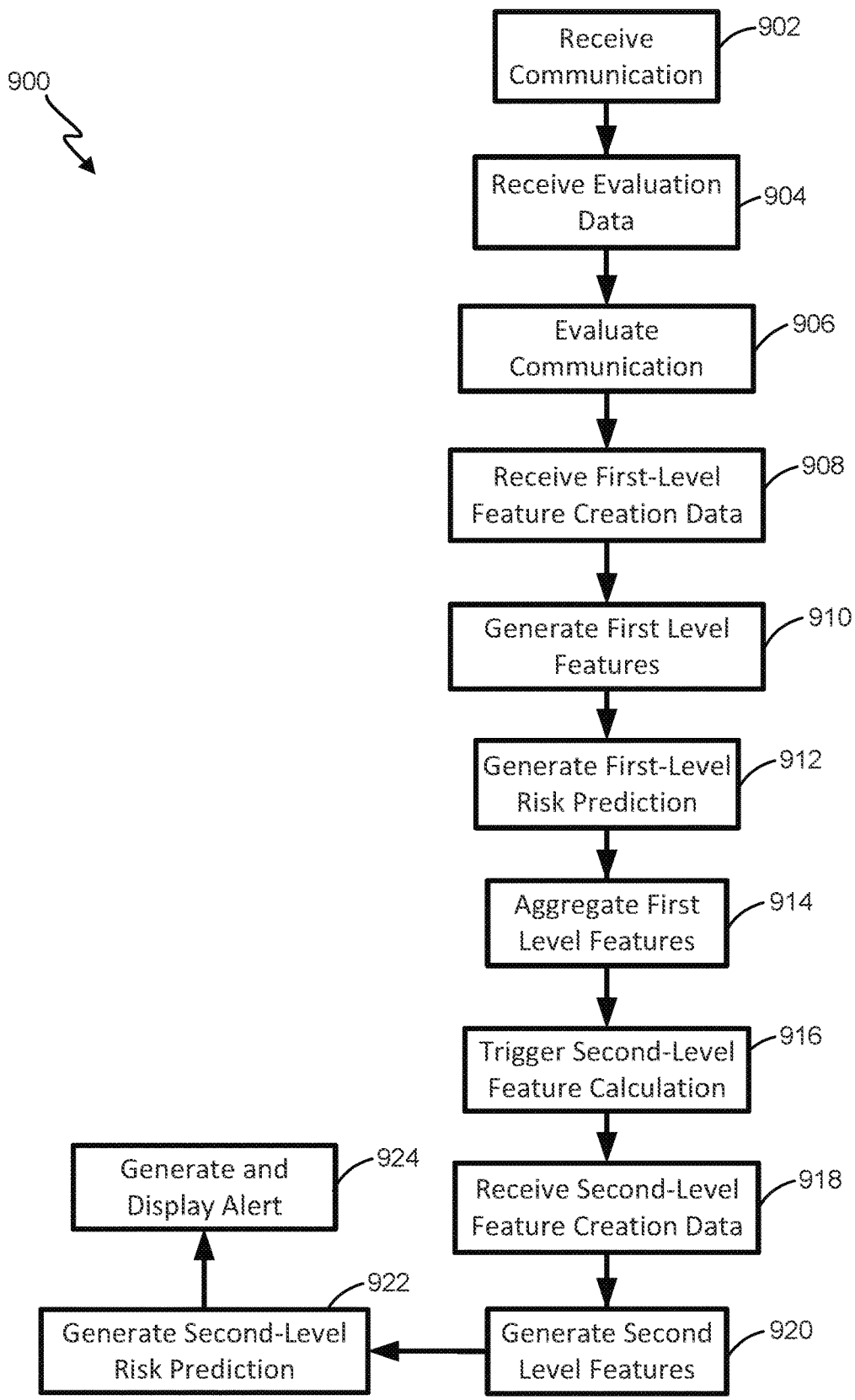
FIG. 23 is a flowchart illustrating one embodiment of a process for user-independent second-level machine-learning alert triggering.

With reference now to FIG. 23, a flowchart illustrating one embodiment of a process 900 for user-independent second-level machine-learning alert triggering is shown. The process 900 can be performed by all or portions of the content distribution network 100 and specifically by the server 102. The process 900 begins at block 902 wherein a communication is received by the server 102 from at least one user device 106, and specifically from a first user device and a second user device via the communication network 120. This communication can comprise one or several electrical signals that can identify user interactions with all or portions of the content distribution network and/or content distributed by the content distribution network 100 to the user. This communication can comprise a payload that can be, for example, a response to one or several questions or one or several question parts. In some embodiments, this payload can further identify the content and/or question giving rise to the response.

After the communication is received, the process 900 proceeds to block 904 wherein evaluation data is received. In some embodiments, the server 102 can query the database server 104 for evaluation information to evaluate the response received as a part of the communication in block 902. The memory 104 can identify this evaluation information within one of the databases, and specifically within the evaluation database 308 and can provide this evaluation information to the server 102. In some embodiments, this can include identifying first evaluation data for evaluating the communication received from the first user device and identify second evaluation data for evaluating the communication received from the second user device. After the evaluation data is received, the process 900 can proceed to block 906 wherein the communications, and specifically the responses contained in the communications can be evaluated. This evaluation can be performed by the response system 406 and specifically by the response processor 678 of the server 102 and can include determining whether and/or the degree to which the users correctly responded to one or several questions or question parts.

After the communications have been evaluated, the process 900 proceeds to block 908 wherein first-level feature creation data is received and/or retrieved. In some embodiments, the first-level feature creation data can be received and/or retrieved from the database server 104 and specifically from the event database 312 in the database server 104. In some embodiments, the server 102 can request first-level feature creation data from the database server 104, which request can include user metadata identifying one or several attributes of the users and/or metadata associated with the provided questions or content to which the responses to the communication was received. The database server 104 can identify the relevant first-level feature creation data and can provide the relevant first-level feature creation data to the server 102. At block 910, the server 102, and specifically the feature engine 710 of the feature factory 706 can generate first-level features according to the received first-level feature creation data. In some embodiments this can include the normalization performed by the normalization engine 708 before the generation of features by feature engine 710. In some embodiments, a first set of first-level features can be generated for communications received from the first user device and a second set of first-level features can be generated for communications received from the second user device.

After the first-level features have been generated, the process 900 proceeds to block 912 wherein first-level risk predictions are generated, and specifically wherein a first first-level risk prediction is generated based on the first set of first-level features generated for communications received from the first user device and a second first-level risk prediction is generated based on the second set of first-level features generated for communications received from the second user device. In some embodiments, the generation of the first-level predictions can include the inputting of the first-level features into a machine-learning algorithm, model, and/or classifier that can reside within the prediction engine 716 of the server 102.

After the first-level risk predictions have been generated, the process 900 proceeds to block 914 wherein first level features are aggregated. In some embodiments, for example, the first-level features can be aggregated for individuals from whose communications the first-level features were generated and/or the first-level features can be aggregated for groups of individuals sharing at least one common attribute from whose communications the first-level features were generated. In some embodiments, first-level features can be aggregated in the database server 104 and specifically within the event database 312.

As the first-level features are aggregated, an attribute of the aggregation of first level features can be compared to a threshold or trigger or generation of second-level features. In some embodiments, this trigger can be based on an amount of lapsed time since the start of aggregation of first-level features and/or since the last generation of second-level features, and in some embodiments, this trigger can be based on a number of aggregated first-level features. In embodiments in which first-level features are aggregated for a period of time followed by creation of second-level features, first level features can be aggregated over a series of sequential predetermined periods of time. In some embodiments, a set of second-level features can be generated at the conclusion of the periods of time in the series of sequential predetermined periods of time. In some embodiments, the triggering of the second-level feature calculation can include comparing the amount of lapsed time to the threshold and/or comparing the number of aggregated first-level features to the threshold. If the special has been met or exceeded, then second-level feature calculation can be triggered.

After the triggering of second-level feature calculation, the process 900 proceeds to block 918 wherein second-level feature creation data is retrieved or received. In some embodiments, the second-level feature creation data can be retrieved from the database server 104 by the server 102, and can be specifically retrieved from the event database 312 by the server 102. In some embodiments, the second-level feature creation data can include instructions for the creation and/or generation of second-level features from the first level features generated from or based on the digital communications received from the user devices 106 in block 902.

After the second-level feature creation data has been received, the process 900 proceeds to block 920 wherein second-level features are generated. In some embodiments, second-level features can be generated according to the second-level feature creation data retrieved in block 919 by the feature factory 706 and specifically by the feature engine 710 of the feature factory 706. The second-level features can be generated from first-level features generated from communications received from a single user device or from first-level features generated from communications received from multiple user devices. The generated second-level features can be stored in the database server 104 and specifically within the event database 312 of the database server 104 and/or in the user profile database 301 of the database server 104.

After the second-level features have been generated, the process 900 proceeds block 922 wherein a second level risk prediction is generated. In some embodiments, the second-level risk prediction can be generated by inputting some or all of the second-level features into the prediction engine 716 and specifically into the classifier 718 of the prediction engine 716. In some embodiments, the generation of the second-level risk prediction can include the identifying of a set of second-level features for inputting into the prediction engine 716. In some embodiments, this set of second-level features can include second-level features generated from first level features generated from communications received from multiple user devices. In such an embodiment, the set of second-level features can be selected based on at least one common attribute of users from whose communications the first-level features, and ultimately the second-level features are generated. In some embodiments, this set of second-level features can then be inputted into the prediction engine 716 which can generate a risk prediction that is nonspecific to the user of the first user device as the risk prediction is based off of second-level features ultimately generated from communications from multiple user devices 106.

In some embodiments, the generation of the risk prediction can include the identification of an anomaly within a set of second-level features. In such an embodiment, generating the risk prediction includes identifying a set of second-level features that include second-level features generated ultimately based on communications from one or more user devices such as, for example, the first user device and the second user device. As discussed above, this set of second-level features can be identified based on a shared attribute of the users of the user devices. After the set of second-level features is identified, one or several similar second-level feature sets can be identified. These one or several similar second-level feature sets can share the same common attribute as shared by users for whom the set of second-level features is identified. However, these one or several similar second-level feature sets can be associated with other user devices and/or with first level features generated based on communications from other user devices.

After the similar second-level feature sets have been identified, an anomaly in the second-level feature set can be identified. This anomaly can be identified through a comparison of the second-level feature set and the one or several similar second-level feature sets. This comparison can be performed by the server 102.

After the second-level risk prediction is generated, the process 900 can proceed to block 924 wherein an alert is generated and displayed and/or delivered. In some embodiments, this can include indicating the risk based on the identified anomaly, which risk is nonspecific to any individual user, but is rather specific to the group of users for whom second-level features in the set of second-level features were generated. In some embodiments, the alert can comprise an indication of a risk level such as, for example, some of the one or several graphical depictions of risk generated. In some embodiments, the alert can comprise a user interface containing these graphical depictions of risk for the user or for a group to which the user belongs. In some embodiments, the alert can comprise an electronic communication sent from the server 102 to the user device 106 and/or supervisor device 110. This electronic communication can include code to direct the launch of the user interface and a display of the graphical risk depictions.

Figure 24:
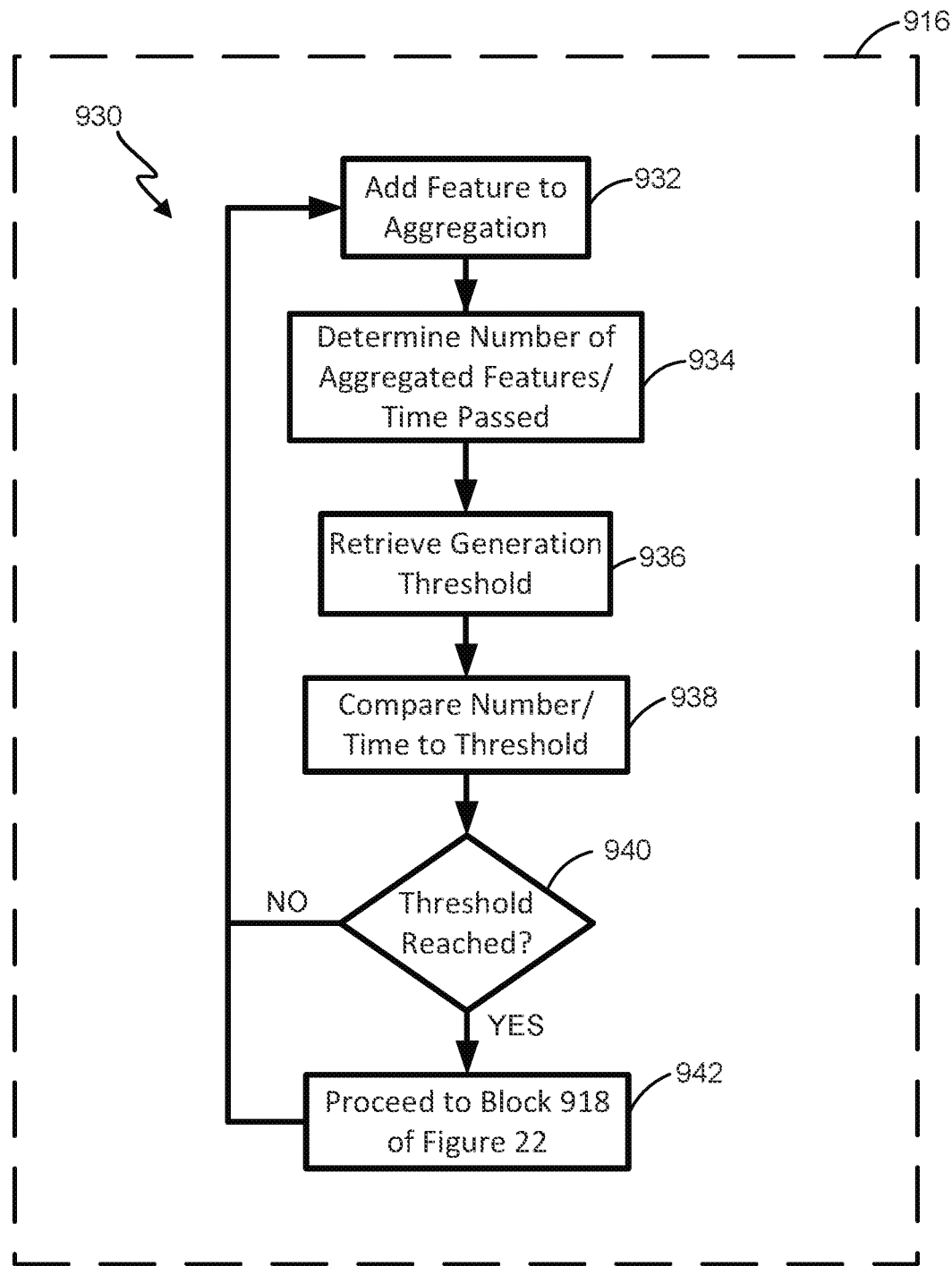
FIG. 24 is a flowchart illustrating one embodiment of a process for triggering second-level feature generation.

With reference now to FIG. 24, a flowchart illustrating one embodiment of a process 930 for triggering second-level feature generation is shown. The process 930 can be performed as a part of, or in the place of block 916 of FIG. 23. The process 930 can be performed by the content distribution network 100 and/or components thereof including the server 102. The process 930 begins at block 932, wherein a first-level feature is added to a feature aggregation. In some embodiment, this feature aggregation can be an aggregation for an individual from whose communications the first-level features were generated and/or this feature aggregation can be an aggregation for a group of individuals sharing at least one common attribute and from whose communications the first-level features were generated. In some embodiments, first-level features can be aggregated in the database server 104 and specifically within the event database 312.

After the feature has been added to the aggregation, the process 930 proceeds to block 934, wherein a number of aggregated features and/or the amount of passed time since the most recent second-level feature generation was triggered. In some embodiments, for example, a timer can be started after the triggering of the second-level feature generation. When this timer reaches a threshold value, then another second-level feature generation can be triggered. Alternatively, in some embodiments a count is reset after the triggering of the second-level feature generation. This count is incremented when a first-level feature is added to the aggregation associated with the content. When the count reaches or exceeds a threshold value, then the new second-level feature generation is triggered and the count can reset. In some embodiments, the value of this count and/or the value of this timer is determined by the server 102 and step 934.

After the number of aggregated features and/or the amount of passed time has been determined, the process 930 proceeds to block 936 wherein a generation threshold is retrieved. In some embodiments, the generation threshold can delineate between instances in which a generation of second-level features is indicated and instances in which a generation of second-level features is not indicated. The generation threshold can be retrieved from the database server 104 and specifically from the threshold database 310.

After the generation threshold has been retrieved, the process 930 proceeds to block 938 wherein numbers and/or the timer is compared to the generation threshold. Then the process 930 proceeds to decision state 940 wherein it is determined that threshold has been reached. If it is determined that the threshold has not been reached, then the process 930 returns to block 932 and continues as outlined above. Alternatively, if it has been determined that the threshold has been reached and that the second-level feature generation is indicated, then the timer and/or the count can reset and the process 930 continues to block 942 and proceeds to block 918 of FIG. 23. In some embodiments, the process 930 further returns to block 932 and continues as outlined above with the aggregation of new first-level features.

Figure 25:
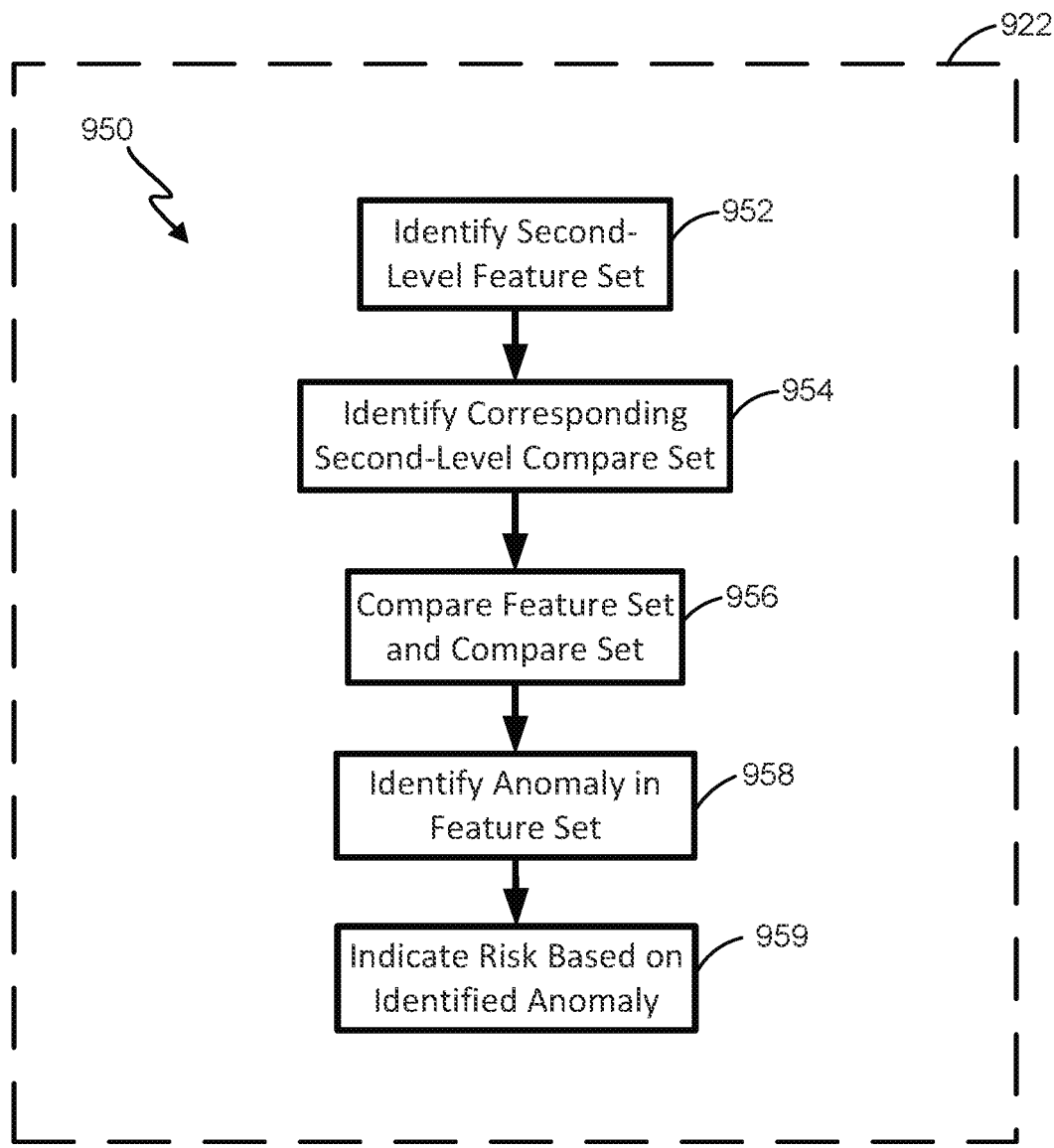
FIG. 25 is a flowchart illustrating one embodiment of a process for generating second-level risk predictions.

With reference now to FIG. 25, a flowchart illustrating one embodiment of a process 950 for generating second-level risk predictions is shown. The process 950 can be performed as a part of or in the place of the step of block 922 of FIG. 23. The process 950 begins a block 952 wherein a second-level feature set is identified. This second-level feature set includes second-level features generated ultimately based on communications from one or more user devices such as, for example, the first user device and the second user device. As discussed above, this set of second-level features can be identified based on a shared attribute of the users of the user devices. The second-level feature set can be identified by the server 102.

After the second-level feature set has been identified, the process 950 proceeds to block 954 wherein a corresponding second-level comparison set, also referred to herein as an similar second-level feature set is identified. These one or several similar second-level feature sets can share the same common attribute as shared by users for whom the set of second-level features is identified. However, these one or several corresponding second-level feature sets can be associated with other user devices and/or with first level features generated based on communications from other user devices. These one or several similar second-level feature sets can be identified from a plurality of second-level feature sets stored in the database server 104 and specifically in the event database 312 of the database server 104. These one or several similar second-level feature sets can be identified via comparison of the one or several shared attributes making the users associated with the second-level feature set identified in block 952 to one or several traits or attributes associated with some or all of the plurality of second-level feature sets stored in the database server 104. This comparison can be performed by the server 102.

After the similar second-level feature set has been identified, the process 950 proceeds block 956 wherein the feature set identified in block 952 is compared to the one or several corresponding second-level feature sets identified in block 954. Based on this comparison, an anomaly in the second-level feature set identified in block 952 can be identified. In some embodiments, an anomaly can be identified when all or portions of the second-level feature set deviates from all or portions of the corresponding similar second-level feature set by more than a threshold value or threshold percentage. In some embodiments, the identification the anomaly can thus include a determination of a delta value characterizing the difference between all or portions of the second-level feature set and all or portions of the corresponding similar second-level feature set, comparing this delta value to an anomaly threshold value which can be retrieved from the threshold database 310, and identifying an anomaly in the delta value meets or exceeds the anomaly threshold value. Based on the comparison performed in block 956, an anomaly can be identified in some embodiments in block 958. If the anomaly is identified, then, as indicated in block 959, a risk value is indicated based on the identified anomaly. In some embodiments, this risk value can increase based on the number of anomalies identified in the comparison and/or based on the magnitude of one or several anomalies identified in the comparison. After the risk has been indicated, then the process 950 can terminate and/or proceed to block 924 of FIG. 23.

Figure 26:
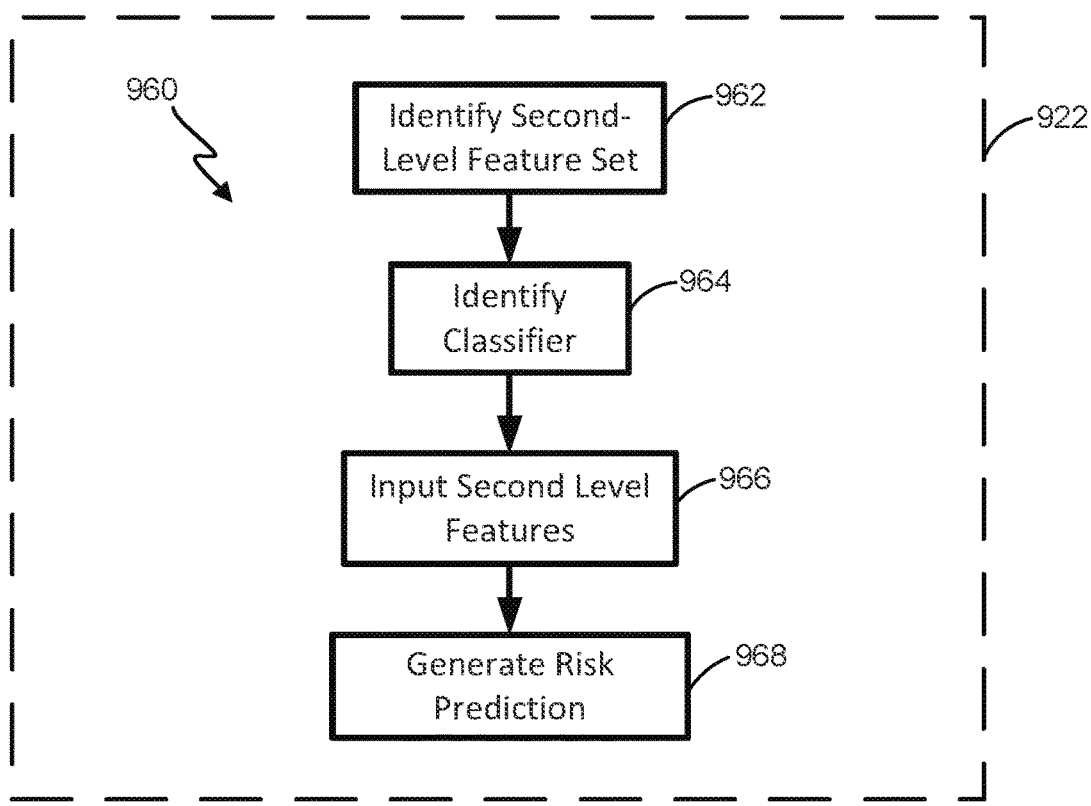
FIG. 26 is a flowchart illustrating one embodiment of another process for generating second-level risk predictions.

With reference now to FIG. 26, a flowchart illustrating one embodiment of a process 960 for generating second-level risk predictions is shown. The process 960 can be performed as a part of or in the place of the step of block 922 of FIG. 23. The process 960 begins a block 962 wherein a second-level feature set is identified. This second-level feature set includes second-level features generated ultimately based on communications from one or more user devices such as, for example, the first user device and the second user device. As discussed above, this set of second-level features can be identified based on a shared attribute of the users of the user devices. The second-level feature set can be identified by the server 102.

After the second-level feature set is identified, the process 960 proceeds to block 964 wherein a machine-learning algorithm, model, and/or classifier is identified. In some embodiments, the machine-learning algorithm, model, and/or classifier can be identified that is trained to generate a risk prediction based on second-level features, and specifically based on the second-level features in the identified second-level feature set. In some embodiments, the machine-learning algorithm, model, and/or classifier can be identified from one of a plurality of machine-learning algorithms, models, and/or classifiers stored in the database server 104 and specifically within the model database 309 of the database server 104.

After the classifier has been identified, the process 960 proceeds to block 966 wherein the second-level features in the identified second-level feature set are inputted into the machine-learning algorithm, model, and/or classifier. In some embodiments, this can include generating a feature vector for each of the features in the second-level feature set; and inputting the feature vectors into the machine-learning algorithm, model, and/or classifier. After the second-level features in the identified second-level feature set are inputted into the machine-learning algorithm, model, and/or classifier, the process 960 proceeds to block 968 wherein a risk prediction is generated. In some embodiments, the risk prediction can be generated by the implementation and/or execution of code associated with and/or forming the machine-learning algorithm, model, and/or classifier. The machine-learning algorithm, model, and/or classifier can output the risk prediction. After the risk has been indicated, then the process 950 can terminate and/or proceed to block 924 of FIG. 23.

Figure 27:
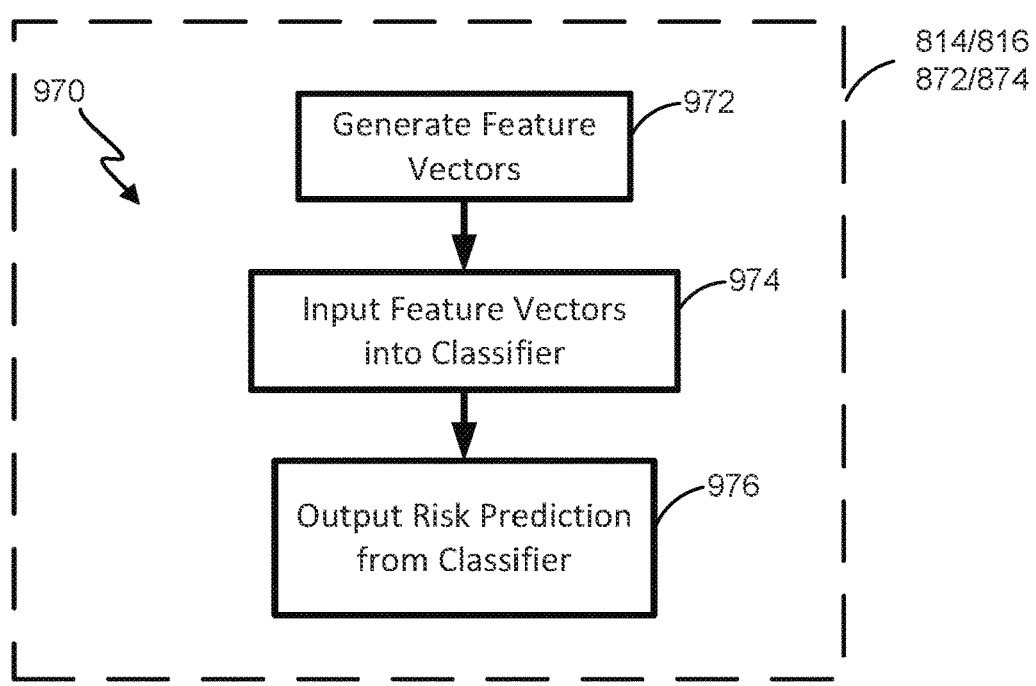
FIG. 27 is a flowchart illustrating one embodiment of a process for inputting features into the prediction engine.

With reference now to FIG. 27, a flowchart illustrating one embodiment of a process 970 for inputting features into the prediction engine 716, and specifically into the machine-learning algorithm, model, and/or classifier is shown. The process 970 begins at block 972 wherein feature vectors are generated. In some embodiments, a feature vector can be generated for each and/or for one or several of the features in a set of features and/or in the subset of features to be inputted into the prediction engine 716. These feature vectors can comprise n-dimensional vectors of the numerical features. The feature vectors can be generated by the feature factory 706.

After the feature vectors have been generated, the process 970 proceeds to block 974, wherein the feature vectors are inputted into the prediction engine 716, and specifically into the machine-learning algorithm, model, and/or classifier. After the feature vectors are inputted into the prediction engine 716, and specifically into the machine-learning algorithm, model, and/or classifier, the prediction engine 716, and specifically into the machine-learning algorithm, model, and/or classifier can operate according to its training to output a risk prediction.

Figure 28:
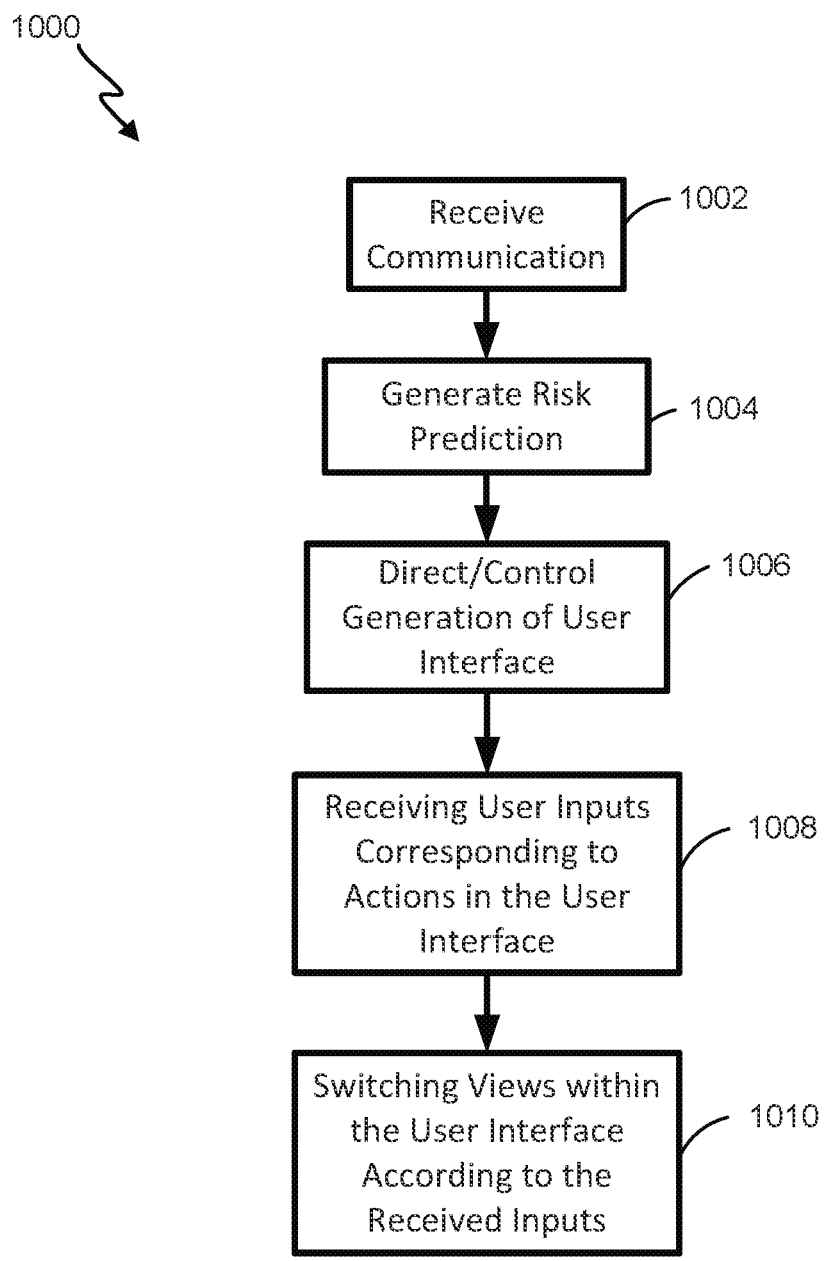
FIG. 28 is a flowchart illustrating one embodiment of a process for delivery of a triggered alert.

With reference now to FIG. 28, a flowchart illustrating one embodiment of a process 1000 for delivery of a triggered alert is shown. The process 1000 can be performed by all or portions of the content distribution network 100, and specifically by the server 104 and the presentation system 408 thereof.

The process 1000 begins at block 1002, wherein a communication is received by the server 102 from at least one user device 106, and specifically from a first user device and a second user device via the communication network 120. This communication can comprise one or several electrical signals that can identify user interactions with all or portions of the content distribution network and/or content distributed by the content distribution network 100 to the user. This communication can comprise a payload that can be, for example, a response to one or several questions or one or several question parts. In some embodiments, this payload can further identify the content and/or question giving rise to the response.

After the communication has been received, the process 1000 proceeds block 1004 wherein a risk prediction is generated. In some embodiments, the risk prediction can be generated by the server 102 and specifically by the feature factory 706 and/or the prediction engine 716. In some embodiments, generating the risk prediction can include receiving evaluation data, evaluating the communication, generating one or several features based on the received communication, generating one or several feature vectors from the generated features, inputting the generated one or several feature vectors into the prediction engine 716, and outputting a risk prediction from the prediction engine 716.

After the risk prediction has been generated, the process 1000 proceeds block 1006 wherein generation of the user interface is directed and/or controlled. In some embodiments, this can include generating one or several control signals of the server and sending those one or several control signals to a device that can include the user device and/or they can be different than the user device 106, and specifically to a supervisor device 110. In some embodiments, these one or several control signals can direct the I/O subsystem 526 of the recipient device to generate and display a user interface which can include a cohort view, a sub-cohort view, and an individual view. In some embodiments, the server can direct and/or control generation of the user interface with at least one of: the risk API 722; the algorithm monitoring API 724, and the interface engine 726.

The cohort view can relate to a plurality of users belonging to a common cohort in such as, for example, a common class, course, or the like. The cohort view can include at least one graphical depiction of a risk prediction for a set of at least some of a plurality of users in that cohort. In some embodiments, the at least one graphical depiction of the risk prediction for the set of at least some of the plurality of users in the cohort includes: a cohort window that can identify a current breakdown of users in the cohort into a plurality of risk-based sub-cohorts, and a trend window that can display a depiction of the time-dependent change to a size of the risk-based sub-cohorts. In some embodiments, the trend window can display the depiction of the time-dependent change to the size of the risk-based sub-cohorts over a sliding temporal window. In some embodiments, the trend window can automatically update as the size of the risk-based sub-cohorts changes and as the sliding temporal window shifts with the passage of time.

The sub-cohort view can relate to a subset of the plurality of users belonging to a common cohort. This subset can be identified based on a shared common trait of users in the subset such as, for example, a shared risk categorization. The sub-cohort view can include at least one graphical depiction of a risk prediction for at least one of the users in the cohort and/or in the sub-cohort. The at least one graphical depiction of the risk prediction for the at least one of the users in the cohort and/or in the sub-cohort can include: a graphical depiction of a risk category associated with the identified sub-cohort, an identification window containing information identifying the at least one of the users in the sub-cohort; a time-dependent risk window displaying risk status over a period of time, and a risk bar identifying a current risk level.

The individual view can relate to a single user that can, for example belong to the cohort and/or to the sub-cohort. In the individual view, information relating to the risk of that individual user can be provided. In some embodiments, the individual view can include at least one graphical depiction of risk sources for the user for whom the individual view is generated. The at least one graphical depiction of risk sources for the user for whom the individual view is generated can include: a time-dependent risk window that can display risk status over a period of time, and a source window that can identify sources of risk and parameters characterizing those sources of risk.

After the direction and/or control of the generation of the user interface, the process 1000 proceeds block 1008 wherein one or several user inputs corresponding to actions of the user in the user interface are received. In some embodiments, these user inputs can be received initially by the I/O subsystem 526 of the device including the user device 106 and/or the supervisor device 110. These inputs can be converted to one or several electrical signals and/or communications and can be sent to the server 102 via the communication network 120. The server can receive these electrical inputs.

After the user inputs have been received, the process 1000 proceeds to block 1010 wherein views within the user interface are switched and/or are directed or controlled to switch according to the received user inputs. In some embodiments, this can include the generation and/or sending of information from the server 102 to the device including the user device 106 and/or the supervisor device 110 directing the user interface to switch from one of the cohort view, the sub-cohort view, and the individual view to another of the cohort view, the sub-cohort view, and the individual view. The steps of block 1008 and 1010 can be repeated until the user terminates interaction with the user interface.

Figure 29:
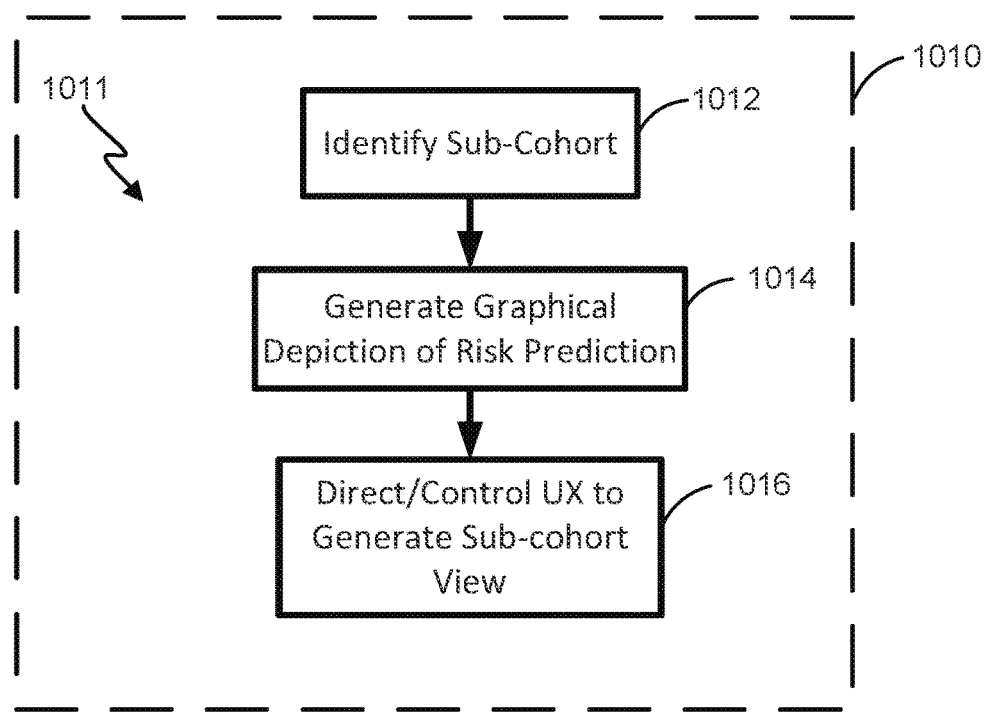
FIG. 29 is a flowchart illustrating one embodiment of a process for switching views within the user interface.

With reference now to FIG. 29, a flowchart illustrating one embodiment of a process 1011 for switching views within the user interface, and specifically for switching to the sub-cohort view from the cohort view is shown. The process 1011 can be performed in the place of, or as a part of the step of block 1010 of FIG. 28. The process 1011 begins at block 1012, wherein a sub-cohort is identified. In some embodiments, this step can include receiving an input at the server 102 from the device including the user device 106 and/or the supervisor device 110 identifying a display sub-cohort. After the sub-cohort has been identified, the process 1011 proceeds to block 1014, wherein a graphical depiction of the risk prediction relevant to the sub-cohort view is generated. In some embodiments, this can include generating the at least one graphical depiction of the risk prediction for the at least one of the users in the display sub-cohort. After the graphical depiction of the risk prediction has been generated, the process 1011 proceeds to block 1016, wherein the generation of the sub-cohort view is directed and/or controlled. In some embodiments, this can include the generation of one or several control signals by the server 102, and specifically by at least one of: the risk API 722; the algorithm monitoring API 724, and the interface engine 726, and sending these one or several control signals to the device which can include the user device 106 and/or the supervisor device 110. In some embodiments, these one or several control signal can direct the device, and specifically the I/O subsystem 526 of the device to generate and provide or display the sub-cohort view and the generated at least one graphical depiction of the risk prediction for the at least one of the users in the sub-cohort.

Figure 30:
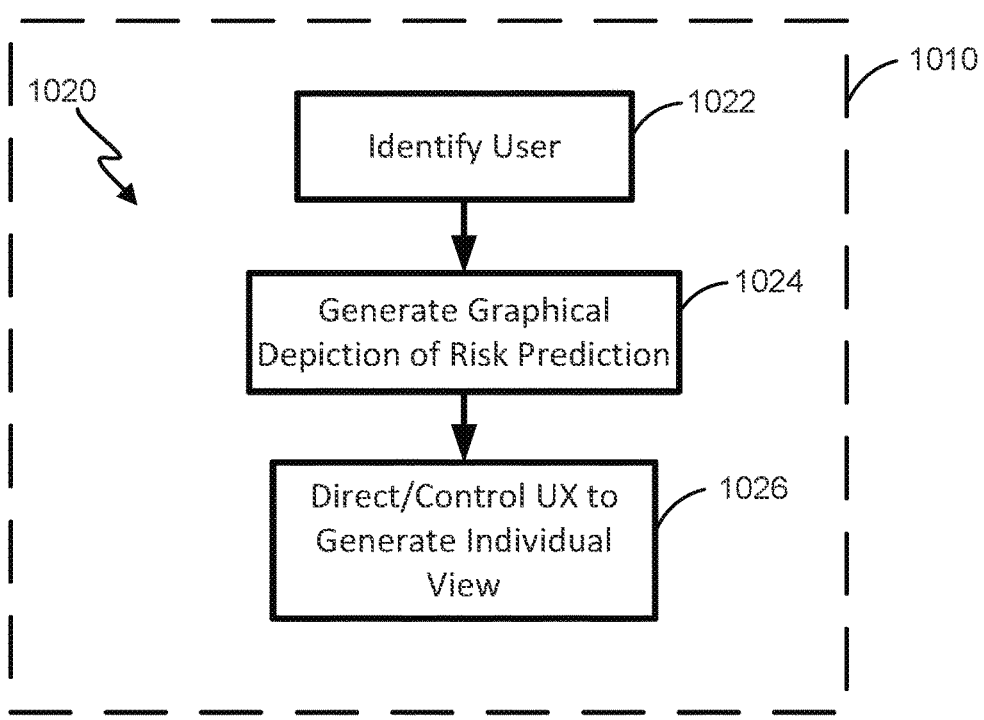
FIG. 30 is a flowchart illustrating one embodiment of another process for switching views within the user interface.

With reference now to FIG. 30, a flowchart illustrating one embodiment of a process 1020 for switching views within the user interface, and specifically for switching to the individual view is shown. The process 1020 can be performed in the place of, or as a part of the step of block 1010 of FIG. 28. The process 1020 begins at block 1022, wherein an individual, also referred to herein as a first user, is identified. In some embodiments, this step can include receiving an input at the server 102 from the device including the user device 106 and/or the supervisor device 110 identifying the individual. After the individual has been identified, the process 1020 proceeds to block 1024, wherein a graphical depiction of the risk prediction relevant to the individual view is generated. In some embodiments, this can include generating the at least one graphical depiction of the risk of the individual, the risk over time of the individual, and/or of risk sources for the identified individual. After the graphical depiction of the risk prediction has been generated, the process 1020 proceeds to block 1026, wherein the generation of the individual view is directed and/or controlled. In some embodiments, this can include the generation of one or several control signals by the server 102, and specifically by at least one of: the risk API 722; the algorithm monitoring API 724, and the interface engine 726, and sending these one or several control signals to the device which can include the user device 106 and/or the supervisor device 110. In some embodiments, these one or several control signals can direct the device, and specifically the I/O subsystem 526 of the device to generate and provide or display the individual view and the generated at least one graphical depiction of the risk level of the individual, the risk level over time of the individual, and/or of risk sources for the identified individual for the individual.

Figure 31:
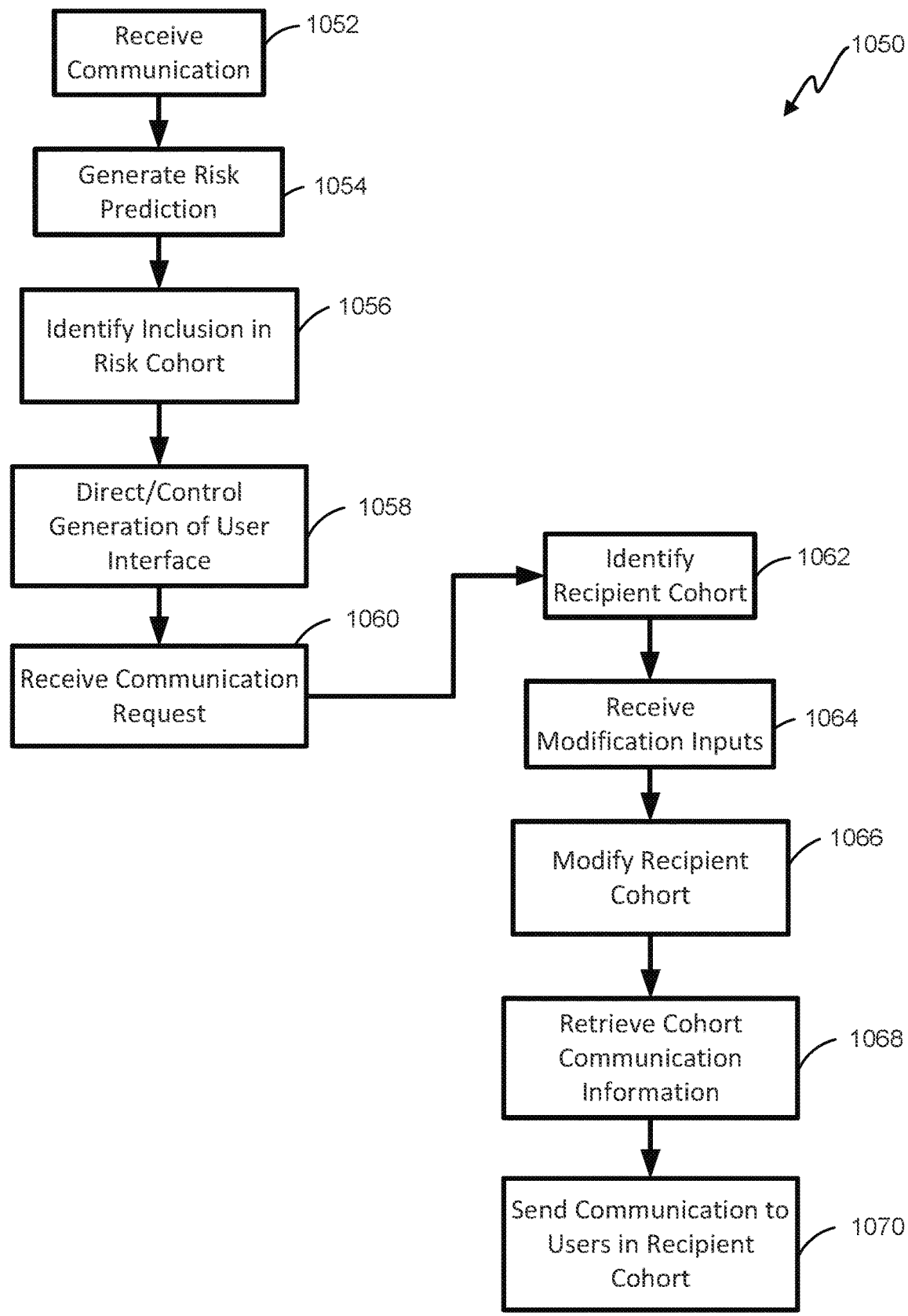
FIG. 31 is a flowchart illustrating one embodiment of a process for automated customized cohort communication.

With reference now to FIG. 31, a flowchart illustrating one embodiment of a process 1050 for automated customized cohort communication is shown. The process 1050 can be performed by the server 102 and/or components thereof. The process 1050 begins at block 1052, wherein communications are received by the server 102 from at least one user device 106, and specifically from a first user device and a second user device via the communication network 120. This communication can comprise one or several electrical signals that can identify user interactions with all or portions of the content distribution network and/or content distributed by the content distribution network 100 to the user. This communication can comprise a payload that can be, for example, a response to one or several questions or one or several question parts. In some embodiments, this payload can further identify the content and/or question giving rise to the response.

After the communication has been received, the process 1050 proceeds block 1054 wherein a risk prediction is generated. In some embodiments, the risk prediction can be generated by the server 102 and specifically by the feature factory 706 and/or the prediction engine 716. In some embodiments, generating the risk prediction can include receiving evaluation data, evaluating the communication, generating one or several features based on the received communication, generating one or several feature vectors from the generated features, inputting the generated one or several feature vectors into the prediction engine 716, and outputting a risk prediction from the prediction engine 716. In embodiments in which communications are received from a plurality of user devices 106 and specifically from a first user device and a second user device, a risk prediction can be generated from communications received from each of the user devices such that a first risk prediction is generated from one or several communications received from the first user device and a second risk prediction is generated from one or several communications from the second user device.

After the generation of the risk prediction, the process 1050 proceeds to block 1056 wherein a relevant risk cohort is determined for the generated risk prediction. In some embodiments, these risk cohorts can be standard, predetermined cohorts, and in some embodiments, these cohorts can be customized by a user. In some embodiments, for example, the cohorts can be customized by the user by the changing of boundaries of the cohorts, the creation of one or several new cohorts, the creation of one or several sub-cohorts, or the like. In some embodiments, this can include identifying the user associated with the generated risk prediction as belonging to one or several risk categories, also referred to herein as risk cohorts. In some embodiments, this can include placing the user in a group identified as at risk, placing the user in a group identified as having an intermediate risk, or placing the user in a group identified as having a low risk. In some embodiments, the determination of the relevant risk cohort can include a comparison of the generated risk prediction to one or several thresholds that delineate between risk cohorts. These thresholds can be retrieved from the threshold database 312 of the comparison of the generated risk prediction to these one or several thresholds that can be performed by the server 102. In embodiments in which risk predictions were generated for multiple user devices 106, each of the users is associated with one of the user devices 106 that can be identified as belonging to a risk cohort based on the generated risk prediction. Thus, in embodiments in which the first risk prediction was generated from communications from the first user device and the second risk prediction was generated from communications from the second user device, the user associated with the first user device can be identified as belonging to a risk cohort and the user associated with a second user device can be identified as belonging to a risk cohort. In some embodiments, both the user associated with the first user device and the user associated with a second user device can be identified as belonging to the same risk cohort or, the user associated with the first user device can be identified as belonging to a different risk cohort than the user associated with the second user device. Thus, in one embodiments, the user associated with the first user device can be identified as belonging to a first risk cohort that can be associated with a first risk level and the user associated with the second user device can be identified as belonging to a second risk cohort that can be associated with a second risk level. The identification of user inclusion in a risk cohort can be stored in the database server 104, and specifically in the user profile database 301 of the database server 104.

After identification of inclusion in one or several risk cohorts, the process 1050 proceeds to block 1058 wherein generation of the user interface is directed and/or controlled. In some embodiments, this can include generating one or several control signals of the server and sending those one or several control signals to a device that can include the user device and/or they can be different than the user device 106, and specifically to a supervisor device 110. In some embodiments, these one or several control signals can direct the I/O subsystem 526 of the recipient device to generate and display a user interface which can include a cohort view, a sub-cohort view, and an individual view. In some embodiments, the user interface can further include one or several communication views which can, for example, allow generation and sending of one or several communications to users including users belonging to one or several recipient cohorts. In some embodiments, the user interface can include a graphical depiction of the one or several risk cohorts, and specifically of the first risk cohort and/or the second risk cohort. In some embodiments, this graphical depiction can indicate the relative size of the risk cohorts, the number of users in each of the relative risk cohorts, sources of risk associated with each of the risk cohorts, or the like. In some embodiments, the server can direct and/or control generation of the user interface with at least one of: the risk API 722; the algorithm monitoring API 724, and the interface engine 726.

After the directing and controlling of generation of the user interface, the process 1050 can proceed to block 1060 wherein a communication request is received. In some embodiments, the communication request can be received by the server 102 from the device which can be, for example the user device 106 and/or the supervisor device 110. In some embodiments, the communication request can be received from a device other than the first user device and the second user device. In some embodiments, this communication request can be received by the device via the I/O subsystem 526 and can be sent to the server 102 via the communication network 120.

In some embodiments, the communication request can include communication content for inclusion in the communication to be sent to the recipient cohort. This content can include, for example, customized content generated by the user of the device sending the communication request, one or several interventions or remediations which can be generated by the user of the device sending the communication request or which can be generated by the server 102 according to a remediation or intervention protocol or algorithm.

After the communication request has been received, the process 1050 proceeds block 1062 wherein a recipient cohort is identified. In some embodiments, the recipient cohort can be identified based on information received in the communication request, which information can identify one or several individuals for receipt of the communication and/or one or several groups of individuals linked by common trait or attribute for receipt of the communication.

In some embodiments communication requests can include information identifying, for example, one or several risk cohorts as the recipient cohort. In some embodiments, the recipient cohort can comprise the first risk cohort, in some embodiments, the recipient cohort can comprise the second risk cohort, and in some embodiments, the recipient cohort can comprise the first and second risk cohorts. The server 102 can extract information identifying the recipient cohort from the received communication and can thus identify the recipient cohort.

After the recipient cohort has been identified, the process 1050 proceeds block 1064 wherein one or several modification inputs is received. In some embodiments, these modification puts can comprise a modification to the recipient cohort such as, for example, the identification of one or several users in the recipient cohort for removal from the recipient cohort and/or the identification of one or several users not in the recipient cohort for inclusion in the recipient cohort. Modification inputs can be received by the server 102 from the device which can include, for example, the user device 106 and/or the supervisor device 110. In some embodiments, the modification inputs can be received by the device via the I/O subsystem 526 and can be sent to the server 102 via the communication network 120.

After the modification inputs have been received, the process 1050 proceeds to block 1066 wherein the identified recipient cohort is modified according to the received modification inputs. In some embodiments, this can include the addition of one or several recipients to the recipient cohort and/or the removal of one or several recipients from the recipient cohort. After the recipient cohort has been modified, the process 1050 proceeds to block 1068, wherein communication information for the identified recipient cohort, including modifications to the identified recipient cohort, is received and/or retrieved. In some embodiments, this indication can be automatically received and/or retrieved by the server 102 from the database server 104 and specifically from the user profile database 301 of the database server 104.

After the cohort communication information has been received and/or retrieved, the process 1050 proceeds to block 1070 wherein the communication is sent to users in the recipient cohort. In some embodiments, this can include sending the communication to, for example, the first user device and/or the second user device.

In some embodiments, for example, the communication information can identify a device different than the device from which communications were received from which a risk prediction was generated for receipt of communications according to the process 1050. Thus, for example, in one embodiment, the user of the second user device may send a communication to the server 102 from which a risk prediction is generated, but the communication information for that user may indicate receipt of communications from the server 102 at another user device 106 such as, for example, at a fourth user device. In some embodiments, this fourth user device can be linked to the user via the communication information that can be stored in, for example, the user profile database. In such an embodiment, the communication can be sent to devices including, for example, the first user device and/or the fourth user device.

Figure 32:
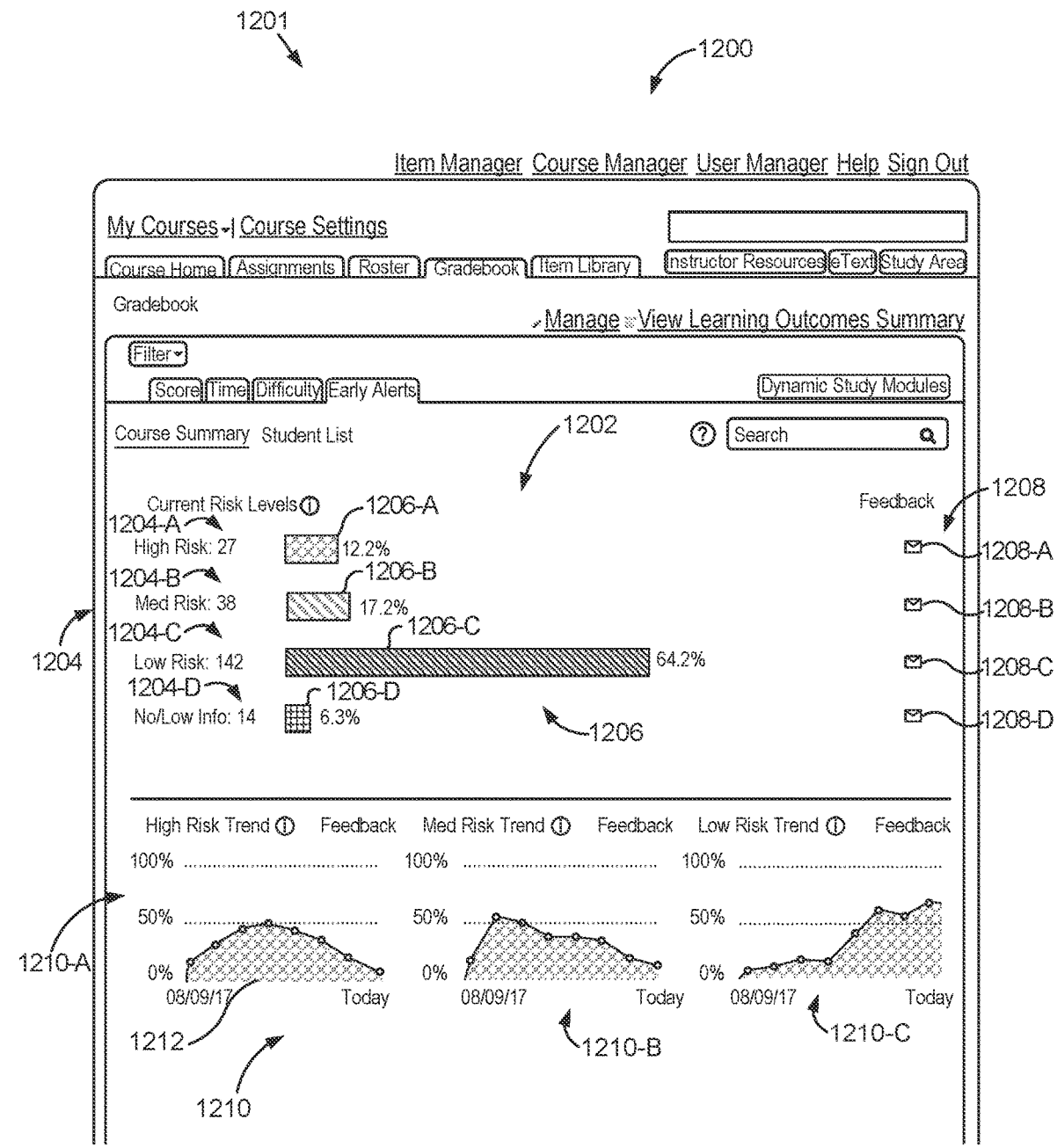
FIG. 32 is an exemplary illustration of one embodiment of cohort view a user interface.

With reference now to FIG. 32, an exemplary illustration of one embodiment of cohort view 1200 is shown. The cohort view 1200 includes a cohort window 1202. The cohort window can identify a breakdown of users in the cohort, which cohort can include, for example, a class, a course of study, or the like, into a plurality of sub-cohorts 1204. In some embodiments, these sub-cohorts 1204 can be risk-based sub-cohorts. As depicted in FIG. 32, the sub-cohorts 1204 include a first sub-cohort 1204-A, also identified as a high risk sub-cohort, a second sub-cohort 1204-B, also identified herein as a medium risk sub-cohort, a third sub-cohort 1204-C, also identified as a low risk sub-cohort, and a third sub-cohort 1204-D for user for which insufficient data is present to generate a risk prediction. In some embodiments, some or all of these sub-cohorts 1204 can be associated with an indicator 1206 of the breakdown of users in each of the sub-cohorts 1204 and/or the relative or absolute size of each of the sub-cohorts 1204. This indicator can comprise or several bars, or the like. As depicted in FIG. 32, the indicator 1206 can include a first indicator 1206-A associated with the first sub-cohort 1204-A, a second indicator 1206-B associated with the second sub-cohort 1204-B, a third indicator 1206-C associated with the third sub-cohort 1204-C, and a fourth indicator 1204-D associated with the fourth sub-cohort 1206-D. in some embodiments, the user can switch from the cohort view 1200 to a sub-cohort view 1250 by the manipulation of one of the portions of the cohort window 1202 associated with a desired one of the sub-cohorts 1204 such as, for example, the indicator 1206 associated with the desired one of the sub-cohorts 1204.

In some embodiments, the cohort window 1202 can include one or several communication icons 1208, and specifically as depicted in FIG. 32, the cohort window 1202 can include a first communication icon 1208-A associated with the first sub-cohort 1204-A, a second communication icon 1208-B associated with the second sub-cohort 1204-B, a third communication icon 1208-C associated with a third sub-cohort 1204-C, and a fourth communication icon 1208-D associated with the fourth sub-cohort 1204-D. In some embodiments, the manipulation of one or more of the communication icons 1208 can result in the generation and sending of a communication request as indicated in block 1060 of FIG. 31.

The cohort view 1200 can further include a trend window 1210 that can display a depiction of the time-dependent change to a size of one or several of the sub-cohorts 1204. Specifically, the trend window 1210 includes a first trend window 1210-A associated with the first sub-cohort 1204-A, a second trend window 1210-B associated with the second sub-cohort 1204-B, and a third trend window 1210-C associated with the third sub-cohort 1204-C. In some embodiments, the trend window 1210 can depict the time-dependent change the size of one or several of the sub-cohorts 1204 over a sliding temporal window. In some embodiments, this sliding temporal window can be indicated along, for example, the horizontal axis of the trend window 1210. In some embodiments, these trend windows 1210 can automatically update as the size of the sub-cohorts 1204 changes and/or as time passes and the temporal window accordingly shifts. In some embodiments, the view of the user interface 1201 can change from the cohort view 1200 to the sub-cohort view 1250 by manipulation of one of the trend windows 1210 associated with a desired sub-cohort 1204.

Figure 33:
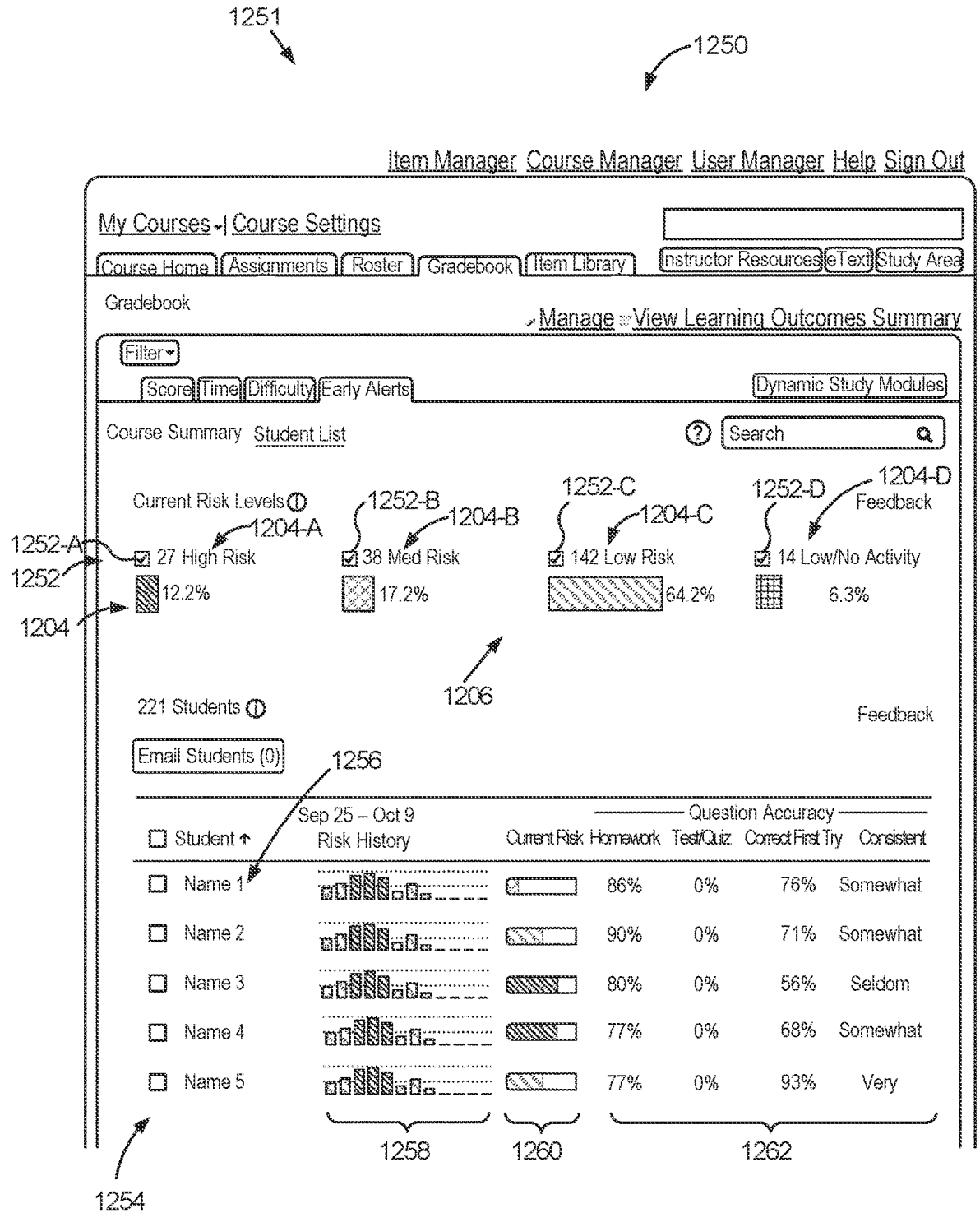
FIG. 33 is an illustration of a first embodiment of a sub-cohort view the user interface.
Figure 34:
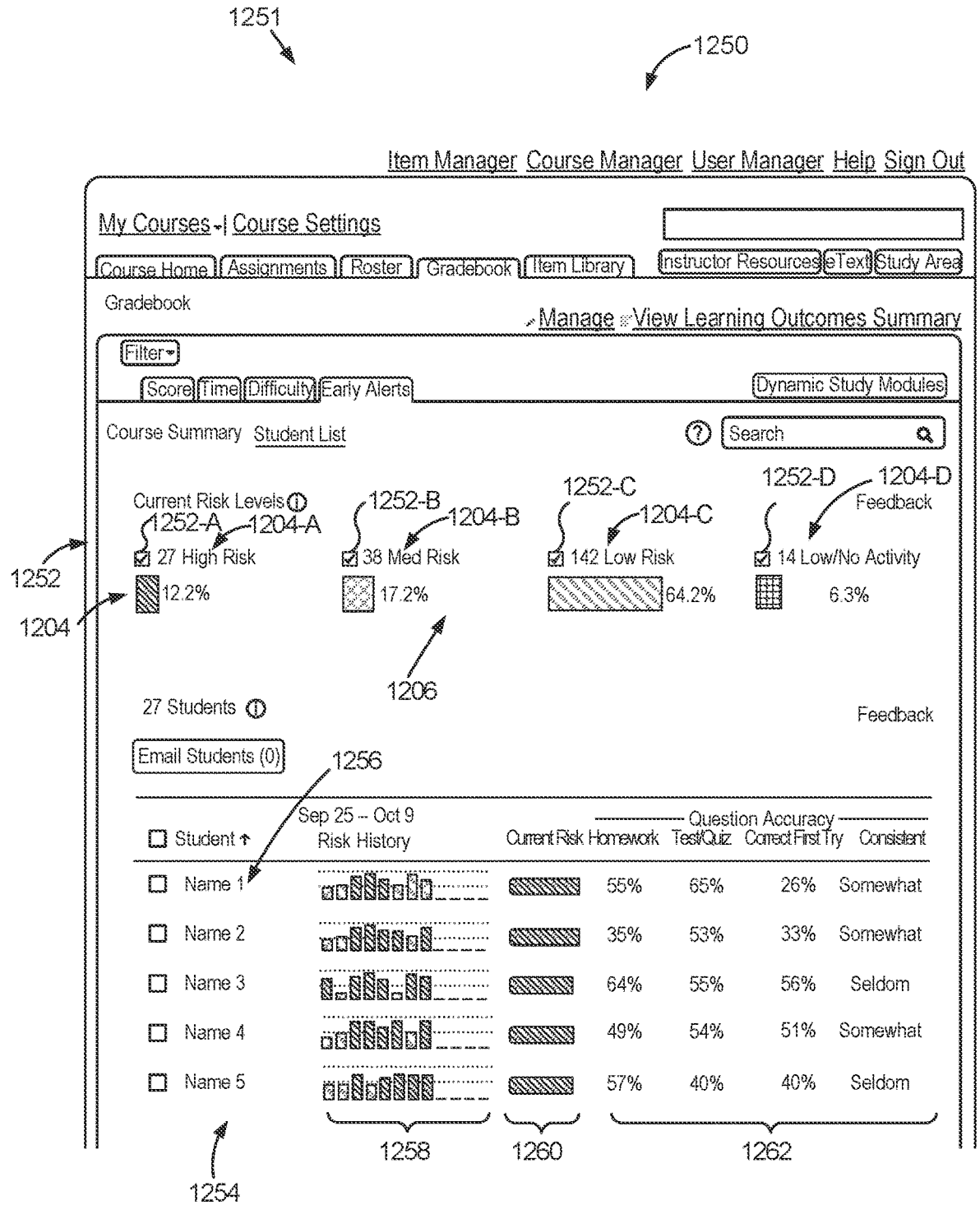
FIG. 34 is an illustration of a second embodiment of the sub-cohort view the user interface.

With reference now to FIGS. 32 and 33, illustrations of embodiments of the sub-cohort view 1250 are shown. In the embodiment of FIG. 33, the sub-cohort view 1250 depict information relating to all of the sub-cohorts 1204, whereas in the embodiment of FIG. 34, the sub-cohort view 1250 depict information relating to one of the sub-cohorts, and specifically to the first sub-cohort 1204-A. The sub-cohort view 150 can include an indicator 1206 of the break in users in each of the sub-cohorts 1204 and/or the relative or absolute size of each of the sub-cohorts 1204. In some embodiments, this indicator can further include a source indicator 1252 which can identify the specific one or several sub-cohorts 1204 for which the sub-cohort view 1250 is generated. This can include a first source indicator 1252-A, a second source indicator 1252-B, a third source indicator 1252-C, and a fourth source indicator 1252-D. As seen in FIG. 33, the source indicator 1252 indicates that the sub-cohort view 1250 includes data from each of the sub-cohorts 1204 and, as seen in FIG. 34, the source indicator 1252 indicates that the sub-cohort view 1250 includes data from the first sub-cohort 1204-A.

The sub-cohort view 1250 can further include an identification window 1254. The identification window 1254 can include a list 1256, also referred to herein as the student list, of users in the sub-cohort 1204 from which the sub-cohort view 1250 includes data. The list 1256 can identify the names of one or several users in the sub-cohort 1204, a time-dependent window 1258 displaying risk status of each of the users in the sub-cohort 1204 over a period of time, a risk bar 1260 identifying a current risk level of each of the users in the sub-cohort 1204, and a source window configured to identify one or several sources of risk and/or parameters characterizing those sources of risk for each of the users in the sub-cohort. In some embodiments, an input can be provided directing a change in the user interface 1251 view from the sub-cohort view 1250 to the individual view 1280 by manipulation of portions of the identification window 1254 relevant to the user for whom the individual view 1280 is desired.

Figure 35:
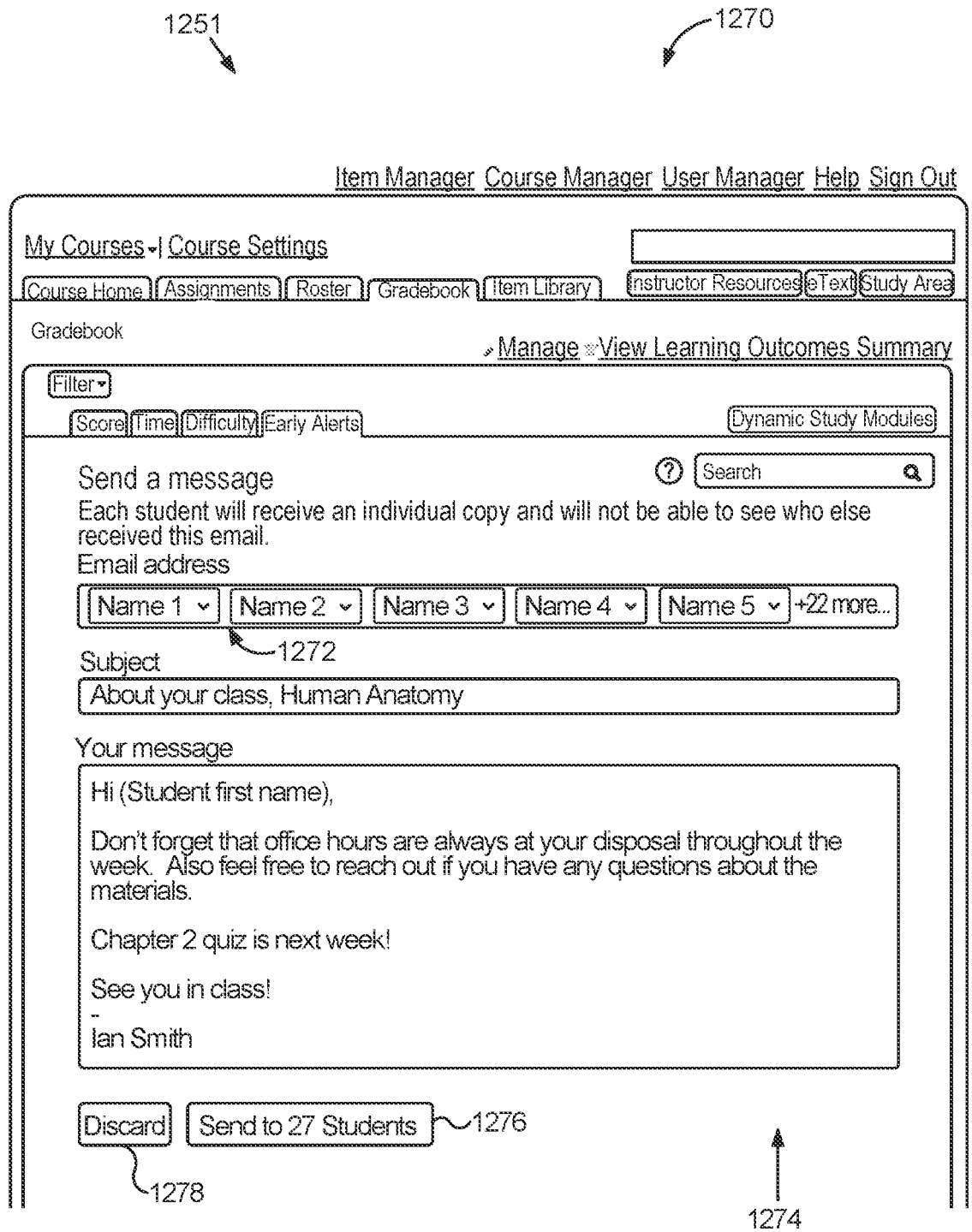
FIG. 35 is an illustration of one embodiment of a communication view of the user interface.

With reference now to FIG. 35, an illustration of one embodiment of a communication view 1270 of the user interface 1251 is shown. In some embodiments, the user interface 1251 can be controlled to display the communication view 1270 when one or several of the communication icons 1208 in, for example, the cohort view 1200 are manipulated. In some embodiments, the communications can include a recipient panel 1272 that can identify the one or several recipients of the communication. The recipient panel 1272 can be further configured to allow the addition of one or several new recipients and/or to remove one or several recipients. The communication view can further include a content panel 1274 wherein the content of the communication can be inputted and/or can be displayed, a send icon 1276, the manipulation of which send icon 1276 can cause the sending of the communication generated in the communication view 1270, and a discard button, the manipulation of which can cause the discarding of the communication generated in the communication view 1270.

With reference now to FIG. 36, an illustration of one embodiment of the individual 1280 view of the user interface 1201 is shown. The individual view 1280 can include information relating to a user, and specifically can include information relating to risk levels for that user. Specifically, the individual view 1280 can include a user time-dependent window 1282 displaying risk status of the user for whom the individual view 1280 is generated over a period of time. The individual view can further include a source window 1284 configured to identify one or several sources of risk and/or parameters characterizing those sources of risk for the user for whom the individual view 1280 is generated. In some embodiments, the individual view 1280 can further include information relating to one or several interventions and/or remediations that can be provided to the user for whom the individual view 1280 is generated based on the sources of risk identified in the source window 1284. In some embodiments, a parameter of each source of risk can be compared to a threshold value, which threshold value can be retrieved from the threshold database 310. If the parameter of one of the sources of risk meets or exceeds the threshold, then an intervention can be triggered. In some embodiments, the content library database 303 can comprise a plurality of interventions that can be each linked to one or more of the sources of risk. In some embodiments, an intervention can be selected from this plurality of interventions and can be recommended in the individual view.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein, the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read-only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

The invention claimed is:

1. A non-transitory computer-readable storage medium having instructions stored thereon that, when executed by at least one processor, cause the at least one processor to implement operations comprising:
   receiving, via a network, first user inputs from a first user device associated with a first user, the first user inputs indicative of responses submitted by the first user via the first user device to educational content presented via the first user device;
   generating a first level feature set for the first user based on the first user inputs received from the first user device;
   receiving, via the network, second user inputs from a second user device associated with a second user, the second user inputs indicative of responses submitted by the second user via the second user device to educational content presented via the second user device;
   generating a first level feature set for the second user based on the second user inputs received from the second user device;
   identifying a shared attribute in the first level feature set for the first user and the first level feature set for the second user;
   generating a second level feature set based on the first level feature set for the first user and the first level feature set for the second user responsive to identifying the shared attribute;
   processing the second level feature set using a machine learning algorithm to generate an output of the machine learning algorithm;
   identifying a risk that is non-specific to the first user of the first user device and non-specific to the second user of the second user device based on the output of the machine learning algorithm; and
   causing an indication of the risk that is non-specific to the first user of the first user device and non-specific to the second user of the second user device to be presented on a user interface.

2. The computer-readable medium of claim 1, wherein:
   identifying the shared attribute comprises determining that the first user and the second user are part of a group of students in a class; and
   causing the indication of the risk to be presented on the user interface comprises causing information regarding risk levels associated with the group of students in the class to be presented on the user interface.

3. The computer-readable medium of claim 2, wherein causing the information regarding the risk levels associated with the group of students in the class to be presented on the user interface comprises causing a graphical depiction of the risk levels associated with the group of students in the class to be presented on the user interface.

4. The computer-readable medium of claim 2, wherein causing the information regarding the risk levels associated with the group of students in the class to be presented on the user interface comprises causing the information regarding the risk levels associated with the group of students in the class to be presented via a third user device associated with a third user.

5. The computer-readable medium of claim 1, wherein processing the second level feature set using the machine learning algorithm comprises processing the second level feature set using at least one of a random forest algorithm, an adaptive boosting algorithm, a naïve Bayes algorithm, a boosting tree algorithm, or a support vector machine algorithm.

6. The computer-readable medium of claim 1, identifying the risk that is non-specific to the first user of the first user device and non-specific to the second user of the second user device based on the output of the machine learning algorithm comprises identifying an anomaly in the second level feature set.

7. The computer-readable medium of claim 1, wherein generating the first level feature set for the first user and generating the first level feature set for the second user comprises generating the first level feature set for the first user and generating the first level feature set for the second user based on at least one of an average correct on first try percentage, an average test score, or an average homework score for the first user and for the second user.

8. The computer-readable medium of claim 1, wherein:
   generating the second level feature set comprises generating the second level feature set based on the first level feature set for the first user, the first level feature set for the second user, and a first level feature set for a third user; and
   generating the second level feature set comprises aggregating the first level feature set for the first user, the first level feature set for the second user, and the first level feature set for the third user over a period of time.

9. A computer-implement method, comprising:
   receiving first user inputs from a first user device associated with a first user, the first user inputs indicative of responses submitted by the first user via the first user device to educational content presented via the first user device;
   generating a first level feature set for the first user based on the first user inputs received from the first user device;

receiving second user inputs from a second user device associated with a second user, the second user inputs indicative of responses submitted by the second user via the second user device to educational content presented via the second user device;

generating a first level feature set for the second user based on the second user inputs received from the second user device;

receiving third user inputs from a third user device associated with a third user, the third user inputs indicative of responses submitted by the third user via the third user device to educational content presented via the third user device;

generating a first level feature set for the third user based on the third user inputs received from the third user device;

generating a second level feature set based on the first level feature set for the first user, the first level feature set for the second user, and the first level feature set for the third user;

processing the second level feature set using a machine learning algorithm to generate an output of the machine learning classifier;

identifying a risk that is non-specific to the first user of the first user device and non-specific to the second user of the second user device based on the output of the machine learning algorithm; and causing an indication of the risk that is non-specific to the first user of the first user device and non-specific to the second user of the second user device to be presented on a user interface.

10. The method of claim 9, wherein generating the second level feature set based on the first level feature set for the first user, the first level feature set for the second user, and the first level feature set for the third user comprises generating the second level feature set responsive to identifying a shared attribute in the first level feature set for the first user, the first level feature set for the second user, and the first level feature set for the third user.

11. The method of claim 10, wherein:
identifying the shared attribute comprises determining that the first user, the second user, and the third user are part of a group of students in a class; and
causing the indication of the risk to be presented on the user interface comprises causing information regarding risk levels associated with the group of students in the class to be presented on the user interface.

12. The method of claim 11, wherein causing the information regarding the risk levels associated with the group of students in the class to be presented on the user interface comprises causing a graphical depiction of the risk levels associated with the group of students in the class to be presented on the user interface.

13. The method of claim 11, wherein causing the information regarding the risk levels associated with the group of students in the class to be presented on the user interface comprises causing the information regarding the risk levels associated with the group of students in the class to be presented via a fourth user device associated with a teacher of the class.

14. The method of claim 9, wherein identifying the risk that is non-specific to the first user of the first user device and non-specific to the second user of the second user device based on the output of the machine learning algorithm comprises identifying an anomaly in the second level feature set.

15. The method of claim 9, wherein generating the first level feature set for the first user, generating the first level feature set for the second user, and generating the first level feature set for the third user comprises generating the first level feature set for the first user, generating the first level feature set for the second user, and generating the first level feature set for the third user based on at least one of an average correct on first try percentage, an average test score, or an average homework score for the first user, for the second user, and for the third user.

16. The method of claim 9, wherein generating the second level feature set comprises aggregating the first level feature set for the first user, the first level feature set for the second user, and the first level feature set for the third user over a period of time.

17. A system comprising:
one or more processors; and
one or more non-transitory computer readable storage media having instructions stored thereon that, when executed by the one or more processors, cause the one or more processors to implement operations comprising:
receiving first user inputs from a first user device associated with a first user, the first user inputs indicative of responses submitted by the first user via the first user device to educational content presented via the first user device;
generating a first level feature set for the first user based on the first user inputs received from the first user device;
receiving second user inputs from a second user device associated with a second user, the second user inputs indicative of responses submitted by the second user via the second user device to educational content presented via the second user device;
generating a first level feature set for the second user based on the second user inputs received from the second user device;
generating a second level feature set based on the first level feature set for the first user and the first level feature set for the second user;
processing the second level feature set using a machine learning algorithm to generate an output of the machine learning algorithm;
identifying a risk that is non-specific to the first user of the first user device and non-specific to the second user of the second user device based on the output of the machine learning algorithm; and
causing an indication of the risk that is non-specific to the first user of the first user device and non-specific to the second user of the second user device to be presented on a user interface.

18. The system of claim 17, wherein generating the second level feature set based on the first level feature set for the first user and the first level feature set for the second user comprises generating the second level feature set responsive to identifying a shared attribute in the first level feature set for the first user and the first level feature set for the second user.

19. The system of claim 18, wherein:
identifying the shared attribute comprises determining that the first user and the second user are part of a group of students in a class; and
causing the indication of the risk to be presented on the user interface comprises causing information regarding risk levels associated with the group of students in the class to be presented on the user interface.

20. The system of claim 19, wherein causing the information regarding the risk levels associated with the group of students in the class to be presented on the user interface comprises causing a graphical depiction of the risk levels associated with the group of students in the class to be presented on the user interface.

* * * * *